US011402213B2

(12) United States Patent
Xu et al.

(10) Patent No.: US 11,402,213 B2
(45) Date of Patent: Aug. 2, 2022

(54) TECHNIQUES FOR DETERMINING A CURRENT LOCATION OF A MOBILE DEVICE

(71) Applicant: INTEL CORPORATION, Santa Clara, CA (US)

(72) Inventors: Xianchao Xu, Beijing (CN); Jiqiang Song, Beijing (CN); Liwei Ma, Beijing (CN); Ke Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 965 days.

(21) Appl. No.: 16/081,129

(22) PCT Filed: Mar. 30, 2016

(86) PCT No.: PCT/CN2016/077802
§ 371 (c)(1),
(2) Date: Aug. 30, 2018

(87) PCT Pub. No.: WO2017/166089
PCT Pub. Date: Oct. 5, 2017

(65) Prior Publication Data
US 2019/0094027 A1 Mar. 28, 2019

(51) Int. Cl.
*G01C 21/00* (2006.01)
*G01C 21/16* (2006.01)
(Continued)

(52) U.S. Cl.
CPC .............. *G01C 21/165* (2013.01); *G01S 5/16* (2013.01); *G01S 19/48* (2013.01); *G05D 1/028* (2013.01);
(Continued)

(58) Field of Classification Search
CPC ......... G01C 21/165; G01C 21/00; G01S 5/16; G01S 19/48; G06N 3/04; G06N 20/00;
(Continued)

(56) References Cited

U.S. PATENT DOCUMENTS

| 11,069,082 B1* | 7/2021 | Ebrahimi Afrouzi ..... G06T 7/70 |
| 2006/0181546 A1* | 8/2006 | Jung .................. G09B 19/0046 345/619 |
| 2007/0005795 A1* | 1/2007 | Gonzalez .............. G06F 16/289 709/232 |

(Continued)

FOREIGN PATENT DOCUMENTS

| CN | 103278170 A | 9/2013 |
| CN | 104537709 A | 4/2015 |

(Continued)

OTHER PUBLICATIONS

International Search Report dated Dec. 28, 2016 for International Patent Application No. PCT/CN2016/077802.
(Continued)

*Primary Examiner* — Shardul D Patel
(74) *Attorney, Agent, or Firm* — Compass IP Law PC

(57) ABSTRACT

Various embodiments are directed to techniques for determining a current location of a mobile device. An apparatus includes a SLAM candidate component to identify a first candidate key frame matching a current captured frame by a first degree from an interval-based key frame set with key frames selected on a recurring interval from multiple earlier captured frames captured by mobile device camera of surroundings within a defined area, a CNN candidate component to identify a second candidate key frame matching the current captured frame.

25 Claims, 26 Drawing Sheets

(51) Int. Cl.
| | |
|---|---|
| *G05D 1/02* | (2020.01) |
| *G06T 7/73* | (2017.01) |
| *G06T 7/246* | (2017.01) |
| *G01S 5/16* | (2006.01) |
| *G01S 19/48* | (2010.01) |
| *G06N 3/04* | (2006.01) |
| *G06N 20/00* | (2019.01) |

(52) U.S. Cl.
CPC ......... *G05D 1/0246* (2013.01); *G05D 1/0274* (2013.01); *G06N 3/04* (2013.01); *G06T 7/248* (2017.01); *G06T 7/74* (2017.01); *G06N 20/00* (2019.01)

(58) Field of Classification Search
CPC . G06T 7/74; G06T 7/248; G06T 2207/20084; G05D 1/0246; G05D 1/0274; G05D 1/028
USPC .................................................. 701/213, 469
See application file for complete search history.

(56) References Cited

U.S. PATENT DOCUMENTS

2010/0321406 A1\* 12/2010 Iwase ................... G11B 27/105
345/638
2017/0195654 A1\* 7/2017 Powers ................. G01J 1/4204

FOREIGN PATENT DOCUMENTS

| TW | 200744763 A | 12/2007 |
|---|---|---|
| TW | 201203975 A | 1/2012 |
| TW | 201419786 A | 5/2014 |

OTHER PUBLICATIONS

Taiwanese and English Translation of Taiwan First Office Action for Patent Application No. 106105773, dated Sep. 8, 2020, 7 pages.
International Search Report and Written Opinion for PCT Patent Application No. PCT/CN2016/077802, dated Dec. 28, 2016, 6 pages.

\* cited by examiner

FIG. 17A      GRAPHICS PROCESSOR COMMAND FORMAT 3900
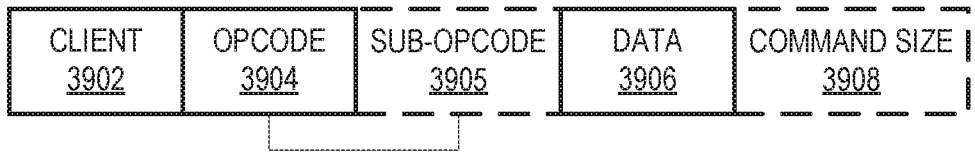
FIG. 17B      GRAPHICS PROCESSOR COMMAND SEQUENCE 3910
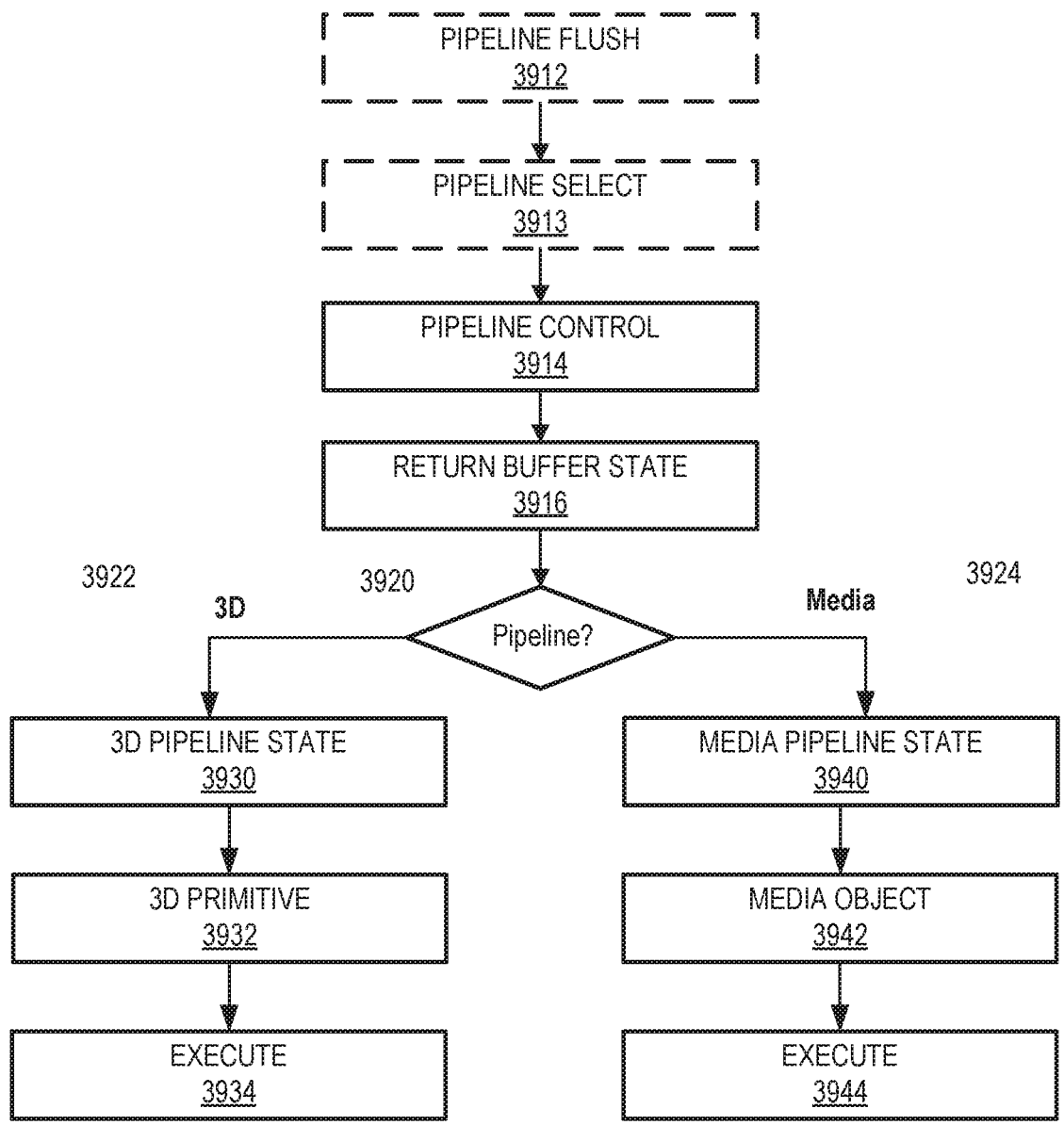

TECHNIQUES FOR DETERMINING A CURRENT LOCATION OF A MOBILE DEVICE

CROSS-REFERENCE TO RELATED APPLICATIONS

This application is a national phase claiming the benefit of and priority to International Patent Application No. PCT/CN2016/077802, entitled "TECHNIQUES FOR DETERMINING A CURRENT LOCATION OF A MOBILE DEVICE" filed Mar. 30, 2016, which is hereby incorporated by reference in its entirety.

BACKGROUND

Devices capable of determining their own current location within a geographic or other physical area are becoming increasingly commonplace. Many of such devices employ a combination of triangulation techniques and wireless signals received from positioning satellites and/or stationary wireless access points to derive a current location. However, such approaches are often limited in their degree of accuracy and/or may be thwarted by various conditions that block and/or distort wireless signals.

In an effort to improve the ability of devices to determine their own current location, more use has recently been made of identifying a current location by identifying objects in the surroundings of such devices. However, such approaches often require large databases and considerable processing resources to identify objects, and then to correlate the identified objects to the current location.

BRIEF DESCRIPTION OF THE DRAWINGS

FIG. 17A illustrates a graphics processor command format, according to an embodiment.

FIG. 17B illustrates a graphics processor command sequence, according to an embodiment.

DETAILED DESCRIPTION

Figure 1A:
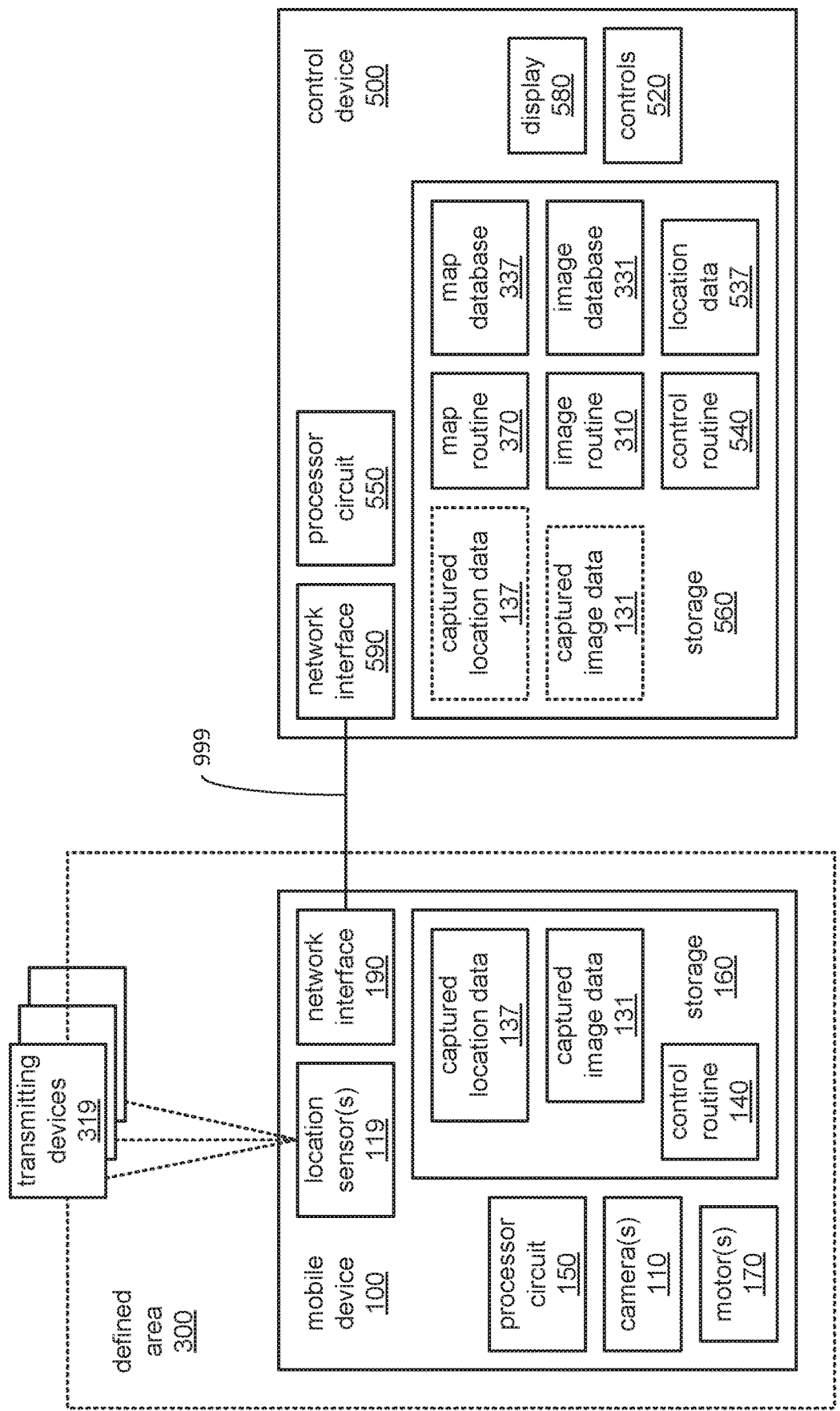
FIGS. 1A and 1B each illustrate an example embodiment of a locating system.

Various embodiments are generally directed to techniques for determining a current location of a mobile device based on matching currently captured frames of imagery to one or more previously captured and stored key frames that may each be correlated to a location along a map. More specifically, a combination of simultaneous localization and mapping (SLAM) and convolution neural network (CNN) algorithms may be used to initially generate separate sets of key frames from frames of imagery captured by at least one camera of the mobile device as the mobile device is moved along pathways that make up a map of a defined area, such as a room, a building interior, a predetermined geographic area, etc. The map of the defined area may also be generated as both sets of key frames are generated, and each key frame within each set may be correlated to a location along a pathway of the map. Each such location within the map may additionally be correlated to an identifier of a physical location within the defined area, such as global positioning satellite (GPS) coordinates, coordinates of locations relative to two or more wireless access points within a room or floor of a building, coordinates derived from the use of accelerometers and/or gyroscopes, etc. Upon completion of generating the map and/or each of the separate sets of key frames, frames of imagery that are subsequently captured by the at least one camera of the mobile device may then be compared to the key frames within the separate sets of key frames. In such comparisons, corresponding ones of the SLAM and CNN algorithms may be used to identify key frames that are deemed to be the closest matches to those capture frames. Those identified key frames may then be correlated to locations on the map and/or to identifiers of physical locations within the defined area.

The mobile device may be self propelled (e.g., motorized with wheels to move itself about) or may be carried about by another device and/or by a person. The mobile device may be equipped with one or more cameras to recurringly capture images of the surroundings of the mobile device as the mobile device is moved about within the defined area. Various approaches may be used to incorporate the one or more cameras into the mobile device to enable capturing images in more than one direction from the current position of the mobile device. In some embodiments, the mobile device may also be equipped with any of a variety of types of location sensors, such as one or more radio frequency (RF) receivers that may receive signals from multiple positioning satellites orbiting the Earth and/or multiple stationary position devices (e.g., wireless access points), one or more accelerometers and/or one or more gyroscopes to provide inertial guidance, and/or readers of barcodes and/or RFID tags that may be positioned at various locations within the defined area. In some embodiments, the mobile device may be equipped with a wireless network interface to enable communication between the mobile device and one or more other devices, such as a control device that may wirelessly control the movements of the mobile device and/or wirelessly receive the frames of imagery captured by the one or more cameras of the mobile device.

In some embodiments, there may be a distinct learning mode in which the mobile device may be moved about within the defined area as part of generating the map and the separate sets of key frames. More specifically, during such movement in such a learning mode, the frames of imagery recurringly captured by the one or more cameras may be used to generate the two separate sets of key frames. More specifically, the SLAM algorithm may select a subset of the frames captured by each of the one or more cameras to become key frames based on a recurring interval, such as every Nth captured frame or after each instance of the mobile device having traveled a specific distance (e.g., after each foot of travel) within the defined area. Additionally, the CNN algorithm may select a different subset of the frames captured by each of the one or more cameras to become key frames based on a degree of difference of each captured frame from all previously selected key frames. As a result of using such different criteria to select captured frames to become key frames, the two separate sets of key frames that are generated may differ considerably from each other. More specifically, an interval-based set of key frames may be generated by the SLAM algorithm that differs considerably from a difference-based set of key frames that may be generated by the CNN algorithm.

Also during such movement in such a learning mode, a series of pathways may be derived that, together, define the map. Some aspects of the map, including locations of pathway intersections where loops in the map are closed, may be derived through use of key frames taken from the two separate sets of key frames as those sets are still being generated. As the pathways are derived, each captured frame that is selected to become a key frame in one or both of the sets of key frames may be correlated to a location along one of the pathways of the map. Other aspects of the map, including directions and/or lengths of pathways, may be derived through use of the one or more location sensors based on any of a variety of sensing technologies. Where possible, in some embodiments, locations along one or more of the pathways of the map may be associated with an identifier of a physical location within the defined area. Overall, in generating the map, it may be deemed desirable to make use of both key frames and the location sensors in generating the map. This may be due to limitations in the degree of positioning accuracy that may be achievable through use of the location sensors, alone.

In some embodiments, the learning mode may end automatically based on an automated determination that there are no more new pathways of the map to be derived. By way of example, if a sufficiently long period of time elapses, a sufficiently lengthy distance has been traveled by the mobile device, and/or a sufficiently large quantity of frames of imagery have been captured since the last time a captured frame was selected to become a key frame by the CNN algorithm, then the learning mode may be automatically terminated.

While not in a learning mode, and as the mobile device moves about within the defined area, each frame of imagery of the surroundings of the mobile device that is captured by each of the one or more cameras may be compared by both the CNN and SLAM algorithms against the key frames stored in their respective sets of key frames. Candidate matches to a captured frame are may be found in either or both of the two sets of key frames. Then, a determination may be made as to which key frame of the one or more candidate matches from each of the two sets of key frames is closest to the captured frame. That key frame selected from among candidates from the two sets of key frames may then be correlated to a location on the map, which may also be correlated to a physical location within the defined area.

As will be explained in greater detail, such use of CNN and SLAM algorithms together may allow each to complement the other in a manner resulting in an overall improvement in the mobile device determining its current location. The differing criterion by which each of the CNN and SLAM algorithms select captured frames to become key frames in their respective sets of key frames may result in each of the two sets of key frames compensating for so called "blind spots" that the other may have along one or more pathways of the map. Thus, such use of candidate matches from both the two sets of key frames may serve to reduce instances in which there is no matching key frame for a captured frame. With such a reduction in instances in which there is no matching key frame for a captured frame, the effectiveness of using the matching of captured frames to key frames to determine the current position of the mobile device within the defined area may be improved. Further, with such an improvement, the effectiveness of other functions that use indications of the current location of the mobile device as an input may also be improved.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A illustrates a block diagram of an embodiment of a locating system 1000 incorporating a mobile device 100 moving about within a defined area 300, a control device 500, and/or multiple transmitting devices 319. In the locating system 1000, the mobile device 100 recurringly captures frames of imagery of its surroundings as it moves about within the defined area 300, and relays those captured frames to the control device 500. The control device 500 recurringly compares the captured frames to key frames within two separate sets of key frames to identify matching key frames that the control device 500 correlates to locations along one or more pathways of a map of the defined area 300. In some embodiments, the mobile device 100 may also recurringly receive wireless signals from the one or more transmitting devices 319, and may relay data concerning those signals to the control device 500. In various embodiments, the control device 500 may recurringly use the correlations of matched key frames along one or more pathways of the map and/or the data concerning signals received from the one or more transmitting devices 319 to recurringly determine the current physical location of the mobile device 100 within the defined area 300.

As depicted, at least the mobile device 100 and the control device 500 may exchange data concerning frames of imagery, signals received from the one or more transmitting devices 319, results of matches and/or correlations made therewith, etc. through a network 999. However, one or more of these devices may also exchange other data entirely unrelated to determining a current location of the mobile device 100 with each other and/or with still other devices (not shown) via the network 999. In various embodiments, the network 999 may be a single network possibly limited to extending within a single building or other relatively limited area, a combination of connected networks possibly extending a considerable distance, and/or may include the Internet. The network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the mobile device 100 may incorporate a processor circuit 150, a storage 160, one or more cameras 110, and/or a network interface 190 to couple the mobile device 100 to the network 999. In embodiments in which the locating system 1000 includes the one or more transmitting devices 319, the mobile device 100 may additionally incorporate one or more location sensors 119 to receive signals transmitted by the one or more transmitting devices 319. In embodiments in which the mobile device 100 is self-propelled such that the mobile device 100 is capable of moving about within the defined area 300 under its own power, the mobile device 100 may incorporate one or more motors 170 to effect such movement. The storage 160 may store a control routine 140, captured image data 131 and/or captured location data 137. The control routine 140 may each incorporate a sequence of instructions operative on the processor circuit 150 to implement logic to perform various functions.

The one or more cameras 110 may include any of a variety of image capturing devices and/or an array of image capturing devices to capture frames of imagery of the surroundings of the mobile device 100 within at least the defined area 300. By way of example, a single camera 110 or an array of cameras 110 may be rotatably mounted to a frame or casing of the mobile device in a manner in which the single camera 110 or the array of cameras 110 is caused to rotate about a vertical axis (and/or another axis) to capture frames making up a panoramic view of the surroundings of the mobile device 100. By way of another example multiple cameras 110 may be arranged in a circular assembly in which each is given pointed in a different direction to be given a different view of the surroundings of the mobile device 100 in a manner that obviates the need to rotate any of the multiple cameras 110.

As previously discussed, in some embodiments, the one or more location sensors 119 (if present) may include radio frequency (RF) and/or other type(s) of receivers that receive signals transmitted by the one or more transmitting devices 319. In such embodiments, the one or more transmitting devices 319 may be any of a variety of devices that transmit signals useable with triangulation and/or other techniques to determine the current location of the mobile device 100. By way of example, the one or more transmitting devices 319 may be positioning satellites orbiting the Earth, such that the one or more transmitting devices 319 may be located well outside the defined area 300. Alternatively, the one or more transmitting devices 319 may be stationary transmitting devices (e.g., wireless access points of a network), such that the one or more transmitting devices may be located within the defined area 300, or at least in the vicinity thereof.

Figure 2:
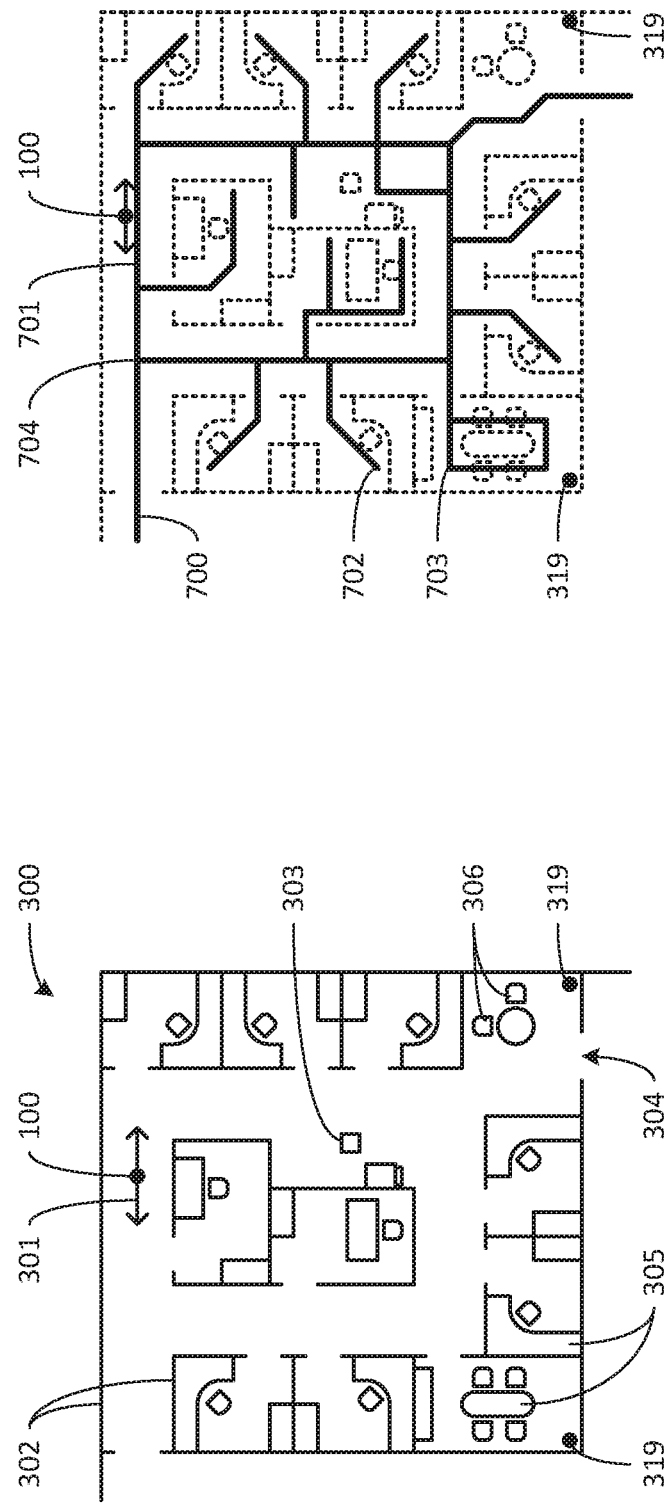
FIG. 2 illustrates generating a map as a mobile device is moved about in a defined area according to an embodiment.

FIG. 2 illustrates an example of defined area 300 that incorporates two of the transmitting devices 319. More specifically, FIG. 2 illustrates a portion of a floor of an office building, including walls 301, a post 302, entrances 303, tables and/or desks 304, and chairs 305. As depicted, the two transmitting devices 319 may each be positioned in a separate corner of this example define area 300, and the mobile device 100 may currently be positioned at a location along a open path between one of the walls 301 and one of the cubicles. FIG. 2 also illustrates an example of a map 700 of pathways 701 that may be generated as mobile device 100 is moved along such opens paths, as well as into and out of open areas within each of the cubicles, of this example defined area 300. As depicted, pathways 701 of the map 700 may include dead ends 702, bends 703, and intersections 704 at which a loop of a pathway of the map 700 may be closed. As a result of the provision of the example pair of transmitting devices 319 within this example defined area 300, the mobile device 100 may receive signals emanating from each of these two transmitting devices 319. Any of a variety of triangulation or other techniques may then be used to correlate portions of the map 700 to physical locations within the defined area 300.

Returning to FIG. 1A, it should be noted that embodiments are possible in which the one or more transmitting devices 319 are components of a network (e.g., the network 999) that transmit and receive signals as part of engaging in wireless communications. In such embodiments, the mobile device 100 may not incorporate the one or more location sensors 119, at all, and may employ the network interface 190 to receive the signals emanating from the one or more transmitting devices 319 in lieu of incorporating the one or more location sensors 119. Indeed, in such embodiments, the mobile device 100 and the control device 500 may communicate through the one or more of the transmitting devices 319. However, as has been discussed, regardless of what type of devices the one or more transmitting devices 319 are and/or regardless of what sort of signals emanate therefrom, it may be that the use of signals emanating from the one or more transmitting devices 319 to determine the current location of the mobile device 100 is somewhat limited in accuracy and/or such use of those signals may be thwarted by weather conditions and/or the presence of structures that block, distort and/or degrade those signals.

Alternatively or additionally, the one or more location sensors 119 (if present) may include one or more readers to read any of a variety of marking devices that may be distributed at various locations throughout the defined area 300, such as barcode stickers, magnets or radio frequency identification (RFID) tags. By way of example, such marking devices may be applied to and/or incorporated into the flooring within the defined area 300 to enable the mobile device 100 to obtain a clear indication of being currently located at a specific marked location. However, as those skilled in the use of such marking devices will readily recognize, there may be situations in which such use of such marking devices may not be desirable and/or may not be feasible. By way of example, the defined area 300 may be too large to be cost effectively covered by such marking devices with sufficient density to be useful.

Also alternatively or additionally, the one or more location sensors 119 (if present) may include one or more motion sensors to employ various techniques to detect motion, speed of motion, direction of motion, changes in speed, changes in direction, etc., such as a speedometer, an odometer, one or more accelerometers, a gyroscope, one or more proximity detectors, etc. More specifically, the one or more location sensors 119 may incorporate the ability to measure a distance that the mobile device 100 has traveled in any one direction and/or a distance between the mobile device 100 and an object in its surroundings within the defined area 300. Alternatively or additionally, the one or more sensors 119 may incorporate the ability to detect a current compass heading and/or a current direction of movement based on inertial guidance provided by a gyroscope. Also alternatively or additionally, the one or more sensors 119 may incorporate the ability to detect the direction of the force of gravity in addition to or in lieu of detecting other accelerations and/or changes in acceleration. However, as will be recognized by those skilled in the art, without some form of correlation of at least a starting point to a physical location within the defined area 300, such detection of motion may provide too incomplete a set of data from which to determine the current location of the mobile device 100.

Thus, as previously discussed, despite the possible inclusion of the one or more location sensor(s) 119, it may still be deemed desirable to employ the capturing of frames of imagery of the surroundings of the mobile device 100 to determine the current location of the mobile device 100 within the defined area 300. Still, it may be that the one or more location sensors 199, based on any of a variety of techniques and/or technologies, may be used to augment such use of captured frames of imagery. By way of example, triangulation of signals received from the one or more transmitting devices 319 may be employed to verify that the mobile device 100 is still within the defined area 300, or is at least in the vicinity of the defined area 300. By way of another example, the detection of marking devices may be employed to confirm whether the mobile device 100 has reached an entrance to the defined area 300 and/or has reached one of a limited quantity of specific physical locations within the defined area 300. However, the frames of imagery captured by the one or more cameras 110 may be primarily relied upon for determining a current location within much of the defined area 300.

As previously discussed, in some embodiments, the mobile device 100 may be self propelled such that it may employ the one or more motors 170 (if present) to effect such movement. This may be the case in embodiments in which the mobile device 100 is a self-propelled robot, a vehicle, etc. The one or more motors 170 may include one or more of electrical, internal combustion, steam-based, wound spring and/or other types of motor that provide rotary and/or linear forms of mechanical motion. In some of such embodiments, the one or more motors 170 may be drivingly coupled to one or more wheels, tracks, mechanical walking components and/or other components of the mobile device 100 that engage a floor, rails, tracks and/or other structure within the defined area 300 to move the mobile device 100 about therein. Alternatively or additionally, at least one of the one or more motors 170 may be operated to drive steering components to enable a change in direction of the movement of the mobile device 100 within the defined area 300. Still other forms of self propulsion based on any of a variety of components that may incorporated into the mobile device 100 will occur to those skilled in the art.

Alternatively or additionally, the mobile device 100 may be moved about within the defined area 300 by being carried by another device (not shown) or a person (not shown). By way of example, the mobile device 100 may be mounted to a vehicle that travels within the defined area 300. Alternatively or additionally, the mobile device 100 may be strapped to and/or otherwise carried by a person (e.g., the mobile device 100 may be a body-worn device, a smartphone, a tablet computer, a notebook computer, etc.).

In executing the control routine 140, the processor circuit 150 may be caused to operate the one or more cameras 110 to recurringly capture frames of imagery of the surroundings of the mobile device 100. The processor circuit 150 may temporarily store such captured frames within the storage 160 as at least a portion of the captured image data 131. The processor circuit 150 may also recurringly operate the network interface 190 to transmit ones of the captured frames within the captured image data 131 to the control device 500. In embodiments in which the mobile device 100 incorporates the one or more location sensors 119, the processor circuit 150 may be caused by its execution of the control routine 140 to operate the one or more location sensors 119 to recurringly capture at least some indication of the current location of the mobile device 100 within the limits of whatever technology is employed by the one or more location sensors 119. The processor circuit 150 may temporarily store such captured indications of the current location within the storage 160 as at least a portion of the captured location data 137. The processor circuit 150 may also recurringly operate the network interface 190 to transmit portions of the captured location data 137 to the control device 500. In embodiments in which the mobile device 100 is self-propelled, the processor circuit 150 may be caused by its execution of the control routine 140 to operate the network interface 190 to receive commands from the control device 500 to move about within at least the defined area 300. In such embodiments, the processor circuit 150 may then operate the one or more motors 170 to effect those commands.

In various embodiments, the control device 500 may incorporate a processor circuit 550, a storage 560, and/or a network interface 590 to couple the control device 500 to the network 999. In embodiments in which the control device 500 supports manual operation to control and/or monitor the mobile device 100, the control device 500 may additionally incorporate one or both of manually-operable controls 520 and a display 580. The storage 560 may store at least a portion of the captured image data 131, at least a portion of the captured location data 137, an image routine 310, a map routine 370, an image database 331, a map database 337, location data 537 and a control routine 540. Each of the image routine 310, the map routine 370 and the control routine 540 may each incorporate a sequence of instructions operative on the processor circuit 550 to implement logic to perform various functions.

In executing the control routine 540, the processor circuit 550 may operate the network interface 590 to recurringly receive at least portions of the captured image data 131 from the mobile device 100 via the network 999, and may also thereby recurringly receive at least portions of the captured location data 137. The processor circuit 550 may then store one or both in the storage 560. In embodiments in which the mobile device 100 is self-propelled, the processor circuit 550 may be caused by its execution of the control routine 550 to operate the network interface 590 to transmit commands to the mobile device 100 via the network 999 to move about the defined area 300. In embodiments where such commands are provided by manual input from an operator, the processor circuit 550 may be additionally caused by its execution of the control routine 540 to operate the controls 520 and/or the display 580 to provide a user interface by which such an operator may provide those commands.

In executing the image routine 310, the processor circuit 550 may be caused to employ both a SLAM algorithm and a CNN algorithm to create two separate sets of key frames within the image database 331. As previously discussed, each set of key frames may be made up of captured frames of imagery of the surroundings of the mobile device 100 as the mobile device 100 is initially moved about the defined area 300 during a learning mode to build up the two sets of key frames. As also discussed, following such a learning mode, the two separate sets of key frames may then be used in comparisons to newly captured frames of imagery of the surroundings of the mobile device 100 as part of determining the current location of the mobile device 100 within the defined area 300. In so doing, the processor circuit 550 may be caused to employ both the SLAM and CNN algorithms to perform such comparisons to identify the key frame from among the two sets of frames that most closely matches a current captured frame.

In executing the map routine 370, the processor circuit 550 may be caused to generate a map 700 of pathways corresponding to open paths along which the mobile device 100 is able to move within the defined area 300 within the map database 337 as the two sets of key frames are generated within the image database 331. As captured frames are selected to become key frames, and are thusly added to one or both of the sets of key frames, each of those selected frames may be correlated to a location along one of the pathways within the map 700 that is being defined as the map database 337 is being generated. Stated differently, the two sets of key frames and the pathways of the map 700 may be generated side-by-side such that the image database 331 and the map database 337 are generated side-by-side with each key frame of one or both of the two sets of key frames being correlated to a location along a pathway of the map 700. As previously discussed, following a learning mode in which such side-by-side generation of the two sets of key frames and the map 700 occur, the correlation between each key frame and a location along a pathway may be used to determine the current location of the mobile device 100 within the map 700.

Additionally, in executing the map routine 370, the processor circuit 550 may be caused to use whatever type of captured location data 137 that is received from the mobile device 100 to correlate locations along pathways of the map 700 to physical locations within the defined area 300 during the learning mode. Depending on the level of detail provided in the captured location data 137, which necessarily depends on the limits of the techniques used within the mobile device 100 to generate the captured location data 137, the correlation to physical locations may be as specific as sets of coordinates or as non-specific as indications of a change in direction having occurred at a location along one of the pathways of the map 700 that may be correlated to a key frame. Regardless of quality or quantity of the captured location data 137 that is received from the mobile device 100, as comparison of key frames to captured frames of imagery of the surroundings of the mobile device 100 leads to determinations of the current location of the mobile device 100, the processor circuit 550 may store an indication of at least the most current such determination within the storage 560 as the location data 537.

Figure 1B:
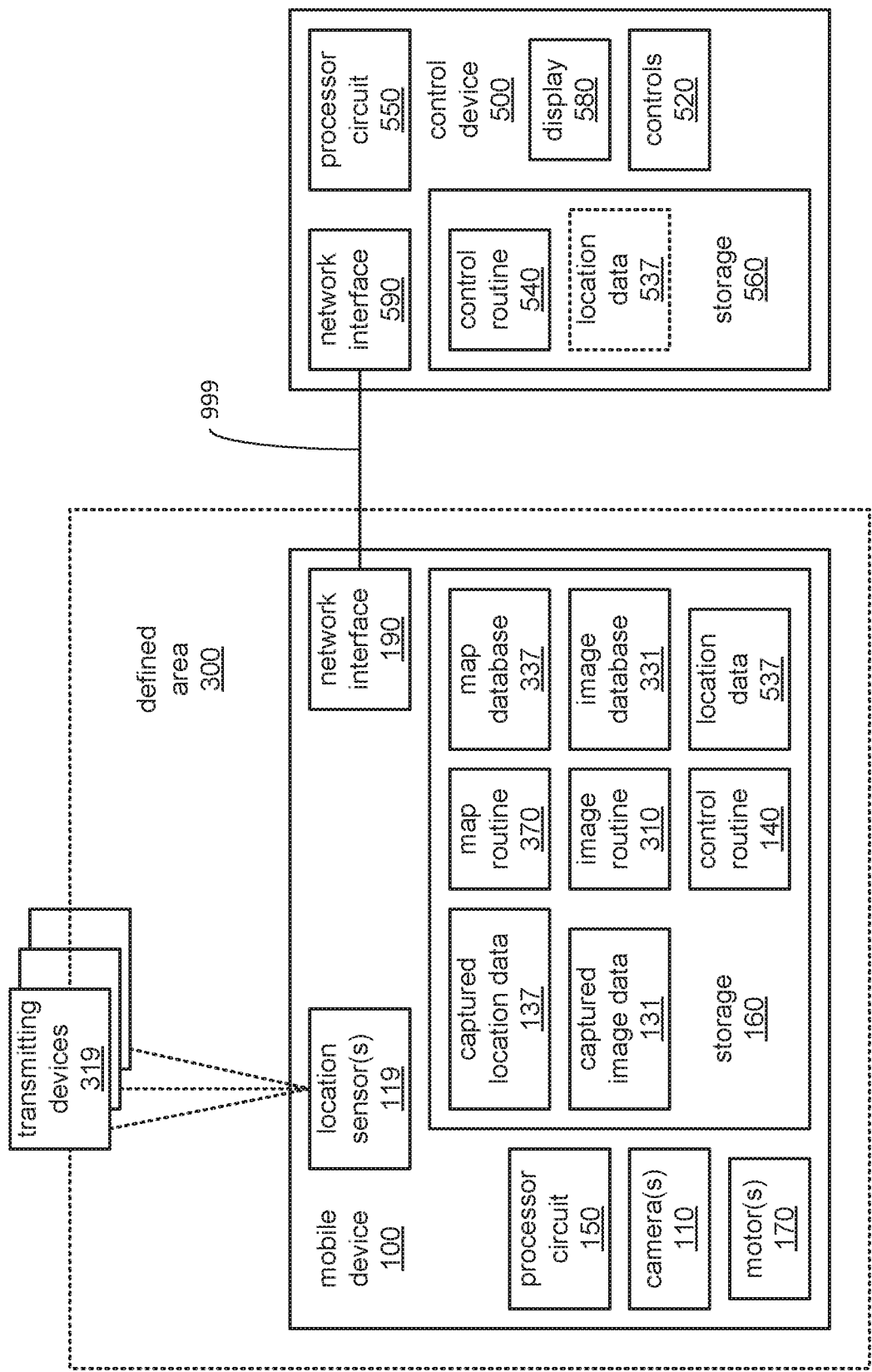

FIG. 1B illustrates a block diagram of an alternate embodiment of the locating system 1000 incorporating alternate embodiments of the mobile device 100 and of the control device 500. As depicted, in this alternate embodiment of the locating system 1000, it is the processor circuit 150 of the mobile device 100 that executes the image routine 310 and the map routine 370, rather than the processor circuit 550 of the control device 500. Thus, the routines 310 and 370 are operable on the processor circuit 150 to implement logic to generate the image database 330 and the map database 370 within the mobile device 100 in the alternate embodiment of the locating system 1000 of FIG. 1B, instead of within the control device 500 as in the embodiment of the locating system 1000 of FIG. 1A. Correspondingly, following generation of the databases 331 and 337, the processor circuit 150 may be caused to use the databases 331 and 337 to determine the current location of the mobile device 100 within the mobile device 100, and may thereby be further caused to transmit the location data 537 to the control device 537 in this alternate embodiment of FIG. 1B, instead of the processor circuit 550 being caused to determine the current location of the mobile device 100 as in the embodiment of FIG. 1A.

Figure 3A:
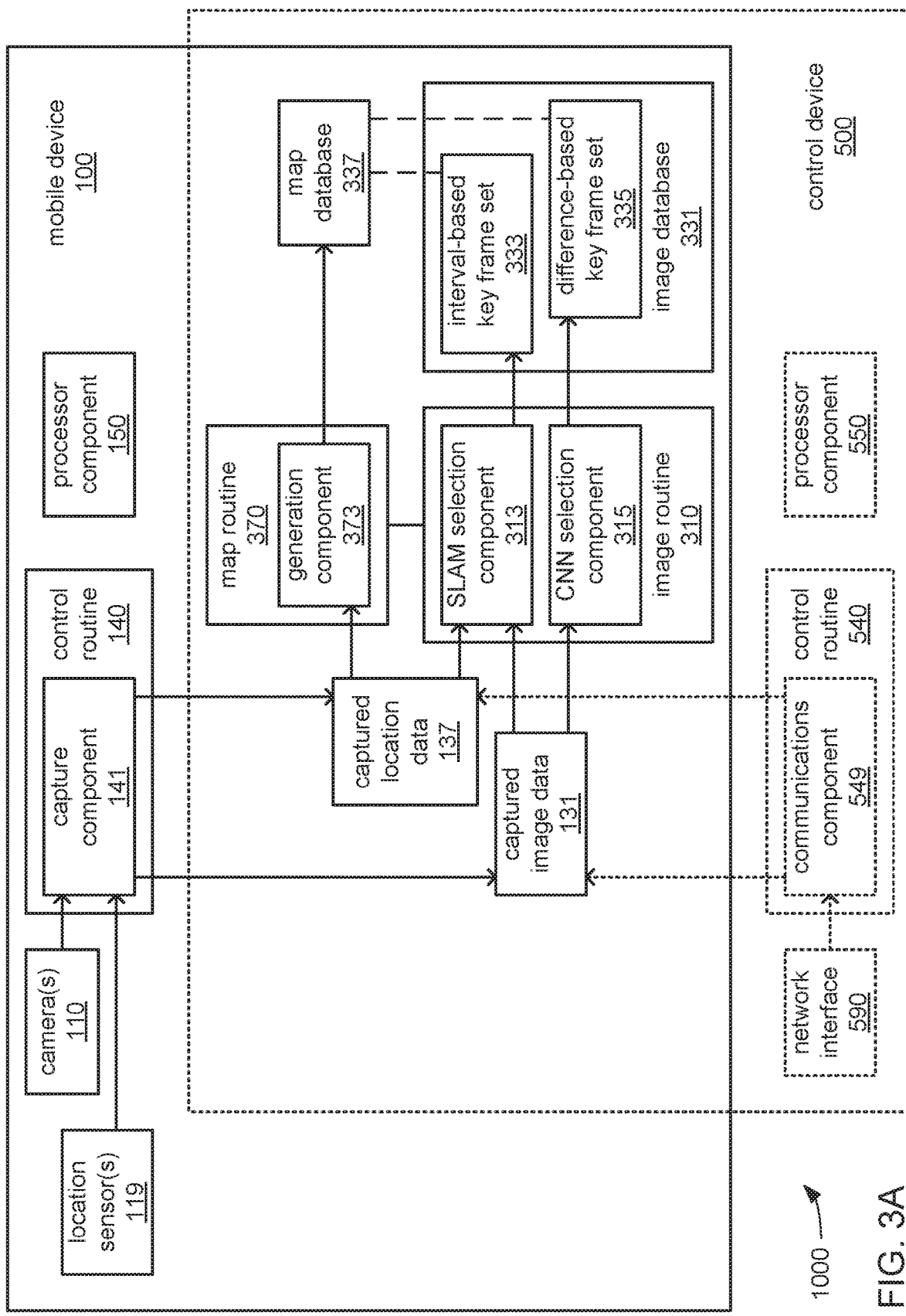
FIGS. 3A and 3B, together, illustrate generating two separate sets of key frames according to an embodiment.
Figure 3B:
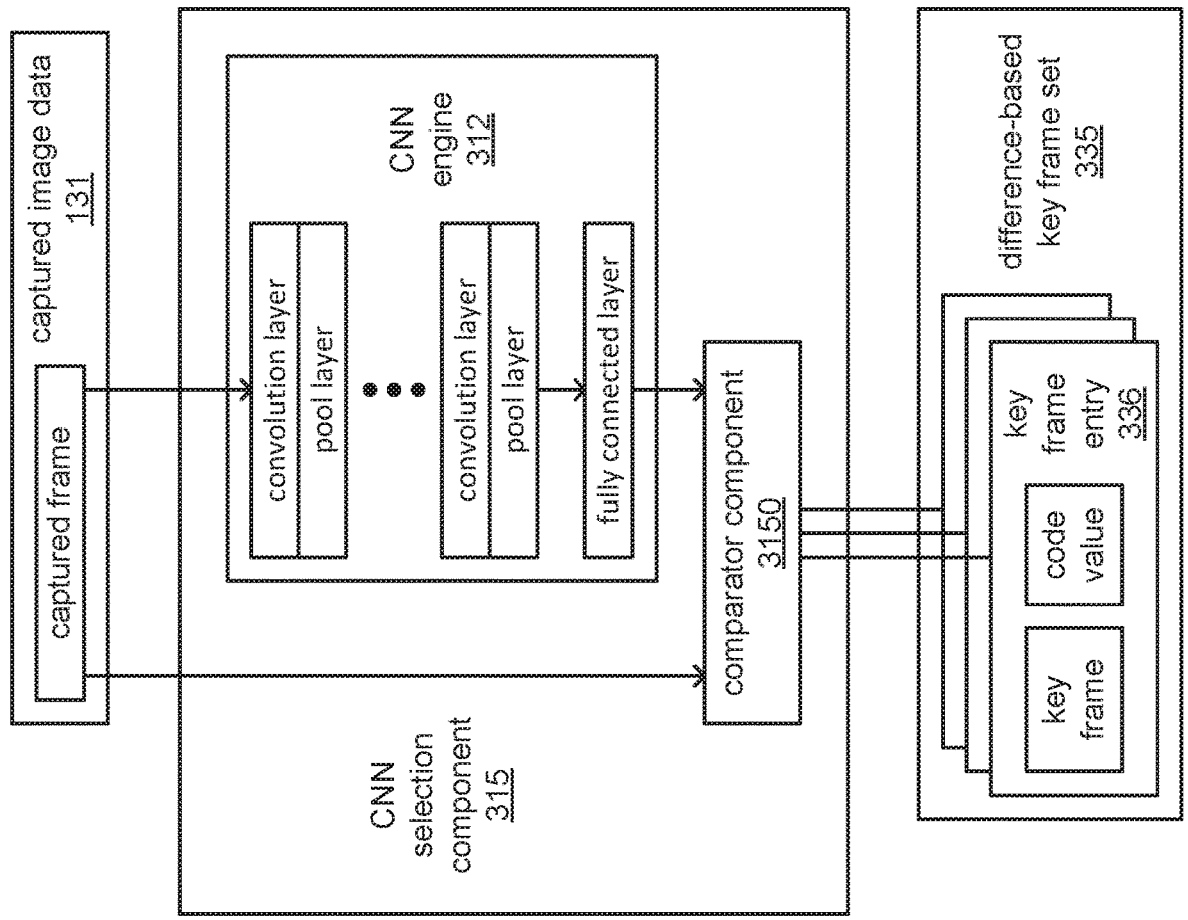

FIGS. 3A-B, together, illustrate an example of generating two separate sets of key frames in the embodiment of the locating system 1000 of either FIG. 1A or FIG. 1B in greater detail. More specifically, FIG. 3A depicts aspects of the generation of an interval-based key frame set 333 and a difference-based key frame set 335 of the image database 331, along with the map database 337, within either the mobile device 100 or the control device 500. FIG. 3B depicts aspects of the use of a convolution neural network (CNN) to generate the difference-based key frame set 335.

As recognizable to those skilled in the art, the control routine 140, the image routine 310, the map routine 370, and control routine 540, including the components of which each is composed, are selected to be operative on whatever type of processor or processors that are selected to implement applicable ones of the processor circuits 150 or 550. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor circuits 150 and/or 550. Where one or more device drivers are included, those device drivers may provide support for any of a variety of other components, whether hardware or software components, of the mobile device 100 and/or the control device 500.

Turning to FIG. 3A, in various embodiments and as depicted, both the map routine 370 and the image routine 310 may be executed by the processor circuit 150 of the mobile device 100 or by the processor circuit 550 of the control device 500. If executed by the processor circuit 150 within the mobile device 100, then the captured image data 131 from which the image routine 310 generates the image database 331 may be received from the one or more cameras 110, and the captured location data 137 from which the map routine 370 generates the map database 337 may be received from the one or more location sensors 119. As depicted, the control routine 140 executed by the processor circuit 150 of the mobile device 100 may incorporate a capture component 141. The capture component 141 may operate the one or more cameras 110 and/or the one or more location sensors 119 to recurringly retrieve captured images and/or captured indications of the current location of the mobile device 100, respectively. The capture component 141 may recurringly store the captured images as the captured image data 131 for use as an input to the image routine 310, and/or may recurringly store the captured indications of the current location of the mobile device 100 as the captured location data 137 for use as an input to the map routine 370.

However, if the image routine 310 and the map routine 370 are executed by the processor circuit 550 within the control device 500, the captured image data 131 from which the image routine 310 generates the image database 331 and the captured location data 137 from which the map routine 370 generates the map database 337 may be received from the mobile device 100 through the network 999 via the network interface 590. As depicted, the control routine 540 executed by the processor circuit 550 of the control device 500 may incorporate a communications component 549. The communications component 549 may operate the network interface 590 to recurringly retrieve portions of the captured image data 131 and/or the captured location data 137 from the mobile device 100 via the network 999. The communications component 549 may recurringly store the captured images as the captured image data 131 for use as an input to the image routine 310, and/or may recurringly store the captured indications of the current location of the mobile device 100 as the captured location data 137 for use as an input to the map routine 370.

As depicted, the image routine 310 may incorporate a SLAM selection component 313 for execution by the processor circuit 150 or 550 to generate the interval-based key frame set 333 made up of ones of the captured frames that are selected to be key frames at a recurring interval as the mobile device 100 is moved about the defined area 300. As previously discussed, the recurring interval may be an interval of time, an interval of distance traveled, etc. By way of example, during a learning mode in which the mobile device 100 is moved about the defined area 300, the SLAM select component 313 may select one of the captured frames of the captured image data 131 to become a key frame of the interval-based key frame set 333 upon each instance of a predetermined interval of time elapsing (e.g., a predetermined fraction of a second or a predetermined quantity of seconds), or upon each instance of a predetermined quantity of frames being captured. Alternatively, where the mobile device 100 incorporates an odometer and/or other mechanism to measure a distance traveled, the SLAM select component 313 may select a captured frame upon each instance of the mobile device 100 having traveled a predetermined interval of distance (e.g., a predetermined number of meters, feet, etc.). In embodiments in which the interval is associated with movement of the mobile device 100, the SLAM selection component 313 may monitor for indications of movement in the captured location data 137 (e.g., indications of distance traveled).

As depicted, the image routine 310 may also incorporate a CNN selection component 315 for execution by the processor circuit 150 or 550 to generate the difference-based key frame set 335 made up of ones of the captured frames that are selected to be key frames as a result of being sufficiently different from all of the captured frames that were previously selected to be key frames of the difference-based key frame set 335. Stated differently, the CNN selection component 315 compares each new captured frame in the captured image data 131 to all of the key frames within the difference-based key frame set 335, and selects a newly captured frame to become another of the key frames if it is sufficiently different from all of the key frames that are already included in the difference-based key frame set 335. Still more precisely, for each newly captured frame, a code value is derived that is descriptive of the contents of the imagery of that newly captured frame, and this code value is compared to the code values of all of the key frames already included in the difference-based key frame set 335 to determine if the code value of the newly captured frame is different from all of those code values to a degree that exceeds a predetermined threshold of difference. If so, then the newly captured frame is selected to be added as another key frame in the difference-based key frame set 335.

As depicted in FIG. 3B, the CNN selection component 315 may include the depicted example implementation of a CNN engine 312 to generate the code values for each newly captured frame within the captured image data 131. It should be noted that the logic of the CNN engine 312 may be implemented with instructions operative on the processor circuit 150 or 550, or the logic of the CNN engine 312 may be implemented with hardware digital logic components (e.g., one or more programmable arrays of transistors and/or logic gates). As familiar to those skilled in the art the CNN engine 312 may implement multiple interspersed convolution layers and pool layers in a manner that emulates aspects of the neural networks of a portion of the human visual system. Each convolution layer may implement many parallel instances of a filter configured to determine whether a particular visual feature is present within each of numerous overlapping locations made up of multiple pixels within a newly captured frame. The result is akin to a convolving of the filter about the two-dimensional matrix of the pixels that make up the frame, but where the filter is applied in many overlapping locations within the frame in parallel. Each pool layer may implement parallel instances of subsampling between convolution layers in a manner that effectively provides multiple parallel instances of pyramid processing. To a limited degree, each pool layer enables the distribution of indications of features having been found between different locations within the frame to allow those indications to be employed as inputs to the use of filters to find other features at other locations in subsequent convolution layers.

The quantity of convolution layers and pool layers may vary among possible implementations of the CNN engine 312, as may the size of simulated neurons within each layer. With each additional convolution layer, numerous instances of another filter to detect another feature are implemented, leading to the generation of more indications of whether and/or where each such feature has been detected. Through multiple ones of interspersed convolution layers and pool layers, a code value is generated that is indicative of what features have been found and where within the frame. As depicted, a single fully connected layer that enables some degree of globalizing of the locations at which features were found, and/or other logic may be employed to reduce the dimensional complexity of the code value generated by the multiple convolution and pool layers. In some embodiments, the reduction may be from a code value representing coordinates of a point in three dimensions down to a code value that represents coordinates of a point in only one or two dimensions.

As also depicted in FIG. 3B, the CNN selection component 315 may also include a comparator component 3150 to compare the dimensionally reduced code value generated by the CNN engine 312 for each newly captured frame of imagery of the surroundings of the mobile device 100 to the earlier generated reduced dimension code values earlier generated for each key frame of the difference-based key frame set 335. As depicted, the difference-based key frame set 335 may be made up of key frame entries 336, and a single key frame may be stored within each of the key frame entries 336 along with the corresponding code value generated by the CNN engine 312. As the code values compared by the comparator component 3150 may each represent a point in multiple dimensions, the comparator component 3150 may determine whether the code value of a newly captured frame is sufficiently different from the code values of all of the key frames of the difference-based key frame set 335 by deriving the Euclidean distance between the code value of the newly captured frame and the code values of each of those key frames, and then comparing each Euclidean distance to a threshold distance. If none of the Euclidean distances exceed the threshold, then the newly captured frame is not deemed sufficiently different from all of the other key frames within the difference-based key frame set 335, and is not selected by the comparator component 3150 to be added to the difference-based key frame set 335.

Returning to FIG. 1A, as depicted, the map routine 370 may incorporate a generation component 373 for execution by the processor circuit 150 or 550 to generate the map database 337 from the captured location data 137. As previously discussed, various embodiments of the mobile device 100 may or may not incorporate the one or more location sensors 119 and/or other components that employ any of a variety of techniques to recurringly capture indications of the current location of the mobile device 100 as the mobile device 100 is moved about the defined area 300. As also previously discussed, in embodiments in which there is the capture of such indications, those indications may be lacking in accuracy such that the determinations of the current location of the mobile device 100 made by use of captured frames of imagery of the surroundings of the mobile device 100 may be more precise. Again, by way of example, the captured location data 137 may include coordinates of the current location of the mobile device 100 arrived at through triangulation and/or other techniques based on signals received from the one or more transmitting devices 319. However, coordinates may denote relatively large portion of the defined area 300. Alternatively or additionally, for example, the captured location data 137 may include indications of motion and/or change in motion through the use of one or more forms of inertial guidance, such as accelerometers, gyroscopes, speedometers, odometers, distance measuring to one or more objects, etc. However, there may be no reliable indication of the location of the starting point of the movement of the mobile device 100 within the defined area 100. Thus, in various embodiments, there may be no captured location data 137 to augment what can be gleaned concerning the location of the mobile device 100 from the captured frames of imagery of the surroundings of the mobile device 100, or there may be captured location data 137 made up of indications of the mobile device 100 that are relatively sparse and/or lacking in accuracy.

As previously discussed, the map database 337 describing the map 700 of the defined area 300 may be generated at least partially simultaneously with the image database 331. As each of the SLAM selection component 313 and the CNN selection component 315 of the image routine 310 select a captured frame to become a key frame, each of the SLAM selection component 313 and the CNN selection component 315 may provide an indication thereof to the generation component 373 of the map routine 370. The generation component 373 may incorporate indications of the locations along the one or more pathways 701 of the map 700 at which each key frame within either of the sets of key frames 333 and 335 is captured. In embodiments in which there is no captured location data 137, or in which the captured location data 137 is relatively sparse in indications of the location of the mobile device 100 from which to generate the map database 337, the indications received by the map routine 370 of each instance of selecting a captured frame to become a key frame in either of the sets of key frames 333 or 335 may provide the majority or all of the information on which the map 700 is based. As will be described in greater detail, in such embodiments, it may be information gleaned from captured frames that enables the detection of locations in the map 700 at which an intersection 704 may exist such that a loop in a pathway 701 of the map 700 may be closed.

However, in embodiments in which the generation component 373 is provided with the captured location data 137 as an input, and/or in which the captured location data 137 includes a greater quantity and/or a greater variety of indications of the location of the mobile device 100 at various times within the defined area 300, the map 700 may correlate indications of physical locations within the defined area 300, indications of lengths of pathways 701, indications of changes in direction, etc. to at least some of the locations at which key frames were captured. Further, the generation component 373 may be able to identify one or more intersections 704 in the map 700 solely from the captured location data 137.

Figure 4:
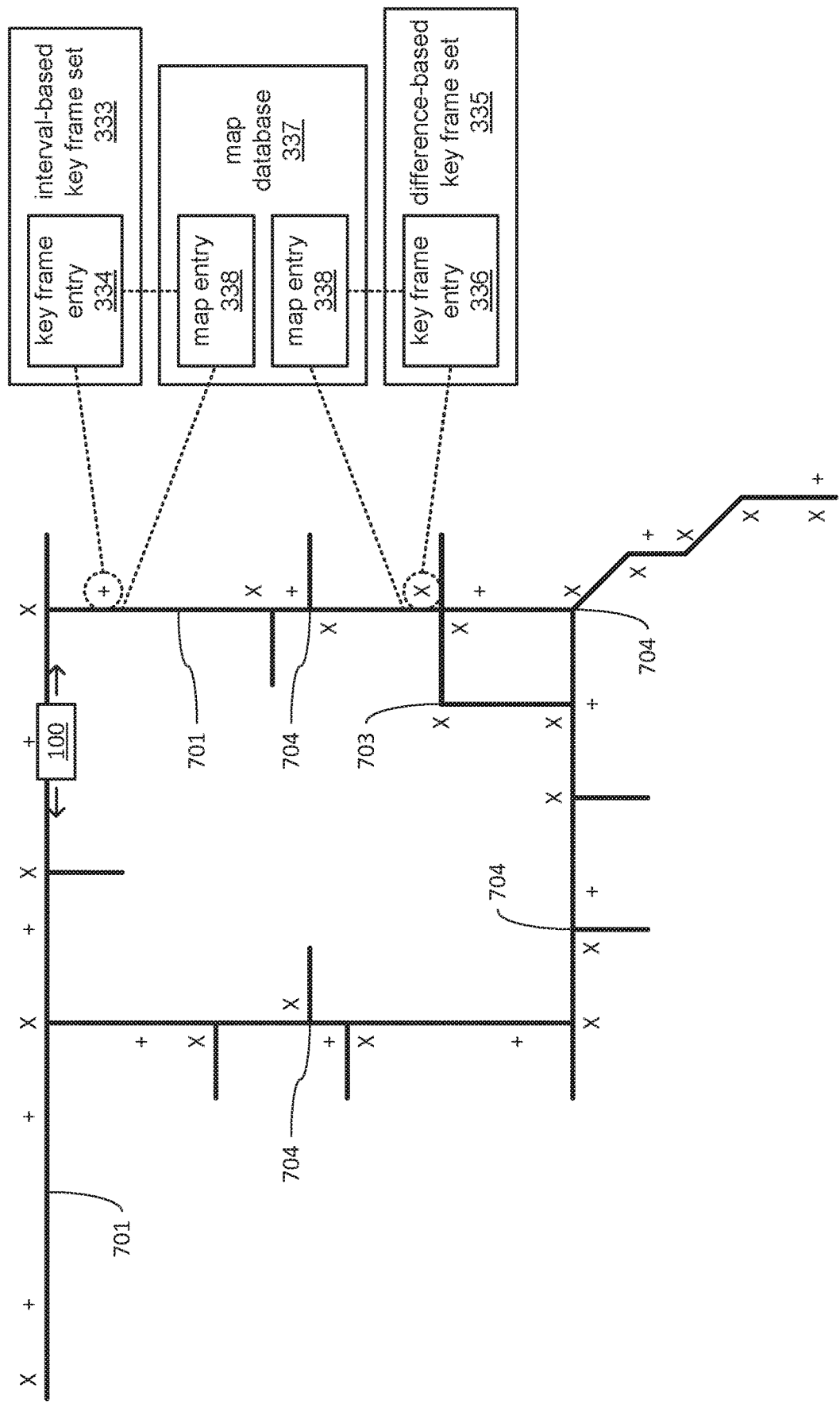
FIG. 4 illustrates correlations between an image database of key frames selected from captured frames and a map database according to an embodiment.

FIG. 4 depicts an enlarged portion of the example map 700 of FIG. 2 to illustrate aspects of the generation of the map 700, including correlations of locations along pathways 701 of the map 700 at which key frames of both of the sets of frames 333 and 335 were captured by the one or more cameras 110 of the mobile device 100. In FIG. 4, "+" signs are positioned at the locations along the pathways 701 of the map at which key frames of the interval-based key frame set 333 were captured, and "X" signs are positioned at the locations along the pathways 701 at which key frames of the difference-based key frame set 335 were captured.

From the depicted example of relatively consistent spacing in the distribution of "+" signs in FIG. 4, it is possible to recognize the manner in which the SLAM selection component 313 may have selected captured frames to become key frames of the interval-based key frame set based on a predetermined selected interval of distance traveled along various pathways 701. It is also possible to see how such an approach to selecting captured frames may result in blind spots in the interval-based key frame set 333 such that there are no key frames thereof that coincide with where some of the intersections 704 and/or other features in the pathways 701 of the map 700 are located. In contrast, from the depicted example of distribution of "X" signs in FIG. 4, it is possible to recognize the manner in which the CNN selection component 315 may have more of a tendency to select captured frames that correspond to such features to become key frames of the difference-based key frame set 335. Such a distribution by the CNN selection component 315 may arise from differences in appearance between lengths of pathways 701 that do not include such features as intersections 704, and the locations at which such features as intersections 704 are present. As the CNN selection component 315 selects captured frames to become key frames based on differences in their imagery from all previously selected key frames, the CNN selection component 315 may have a tendency to select captured frames to become key frames that were captured at intersections 704 and/or at other locations that have a relatively unique appearance. However, as is also evident from the depicted positions of the "X" signs in FIG. 4, such criteria for selecting key frames may result in blind spots in the difference-based key frame set 335 that may include relatively large portions of pathways 701 that are lacking in unique appearance features.

Thus, from a review of the relative positions of "+" signs and "X" signs in FIG. 4, it can be appreciated that each of the two sets of key frames 333 and 335 may include key frames at locations within the map 700 that fill the blind spots of the other. Thus, an advantageously more complete coverage of locations along each of the pathways 701 of the map 700 may be realized by combining the use of the two sets of key frames 333 and 335, thereby taking advantage of the differences in which key frames are selected for each. However, it should be noted that, from a few depicted instances of "+" signs and "X" signs in relatively close proximity, there can be instances in which the location at which a captured frame is selected to become a key frame of one of the sets of key frames 333 and 335 may closely coincide with the location at which a captured frame is selected to become a key frame of the other of the sets of key frames 333 and 335, such that it is possible that a single captured frame may be selected to become a key frame within both sets of key frames 333 and 335.

Also depicted in FIG. 4 are aspects of the correspondences generated and maintained between the map and the locations thereon at which the key frames were captured. As depicted, and as previously discussed in connection with FIG. 3B, the difference-based key frame set 335 generated by the CNN selection component 315 may be made up of multiple key frame entries 336 that may each store a key frame selected by the CNN selection component 315 and a code value generated by the CNN engine 312. Correspondingly, and as also depicted, the interval-based key frame set 333 generated by the SLAM selection component 313 may be made up of multiple key frame entries 334 that may each store a key frame selected by the SLAM selection component 313. Also, correspondingly, and as also depicted, the map database 338 by the generation component 373 may be made up of multiple map entries 338 that may each store an indication of a portion of a pathway 701 of the map 700, and at least a subset of which may each store an indication of where a key frame selected by either of the SLAM selection component 313 or the CNN selection component 315 was captured. Thus, as depicted each of the key frame entries 334 and each of the key frame entries 336 may be correlated to a map entry 338, thereby enabling each key frame to be associated with a location within the map 700.

As has also been discussed, in some embodiments and depending on the specificity of any captured location data 137 that may have been received and used by the generation component 373 of the map routine 370, at least some of the map entries 338 may be correlated to specific physical locations within the defined area 300. As a result, it may be that at least a subset of the key frame entries 334 and/or 336 are able to be associated with such specific physical locations.

Returning to FIG. 3A, in embodiments where one or more of the map database 337, the interval-based key frame set 333 and the difference-based key frame set 335 are generated during a distinct learning mode, the learning mode may be automatically ended in response to one or more detected conditions. Specifically, and as previously discussed, if a predetermined amount of time elapses during the learning mode, a predetermined distance is traveled by the mobile device 100 during the learning mode, or a predetermined quantity of frames are captured during the learning mode without another captured frame having been determined by the CNN selection component 315 to be sufficiently different from all of the key frames within the difference-based key frame set 331 to be selected for addition thereto. Alternatively or additionally, in embodiments in which the control device 500 supports the provision of a user interface via the controls 520 and/or display 580, the user interface may enable the operator of the control device 500 to enter a command to end the learning mode.

Figure 5A:
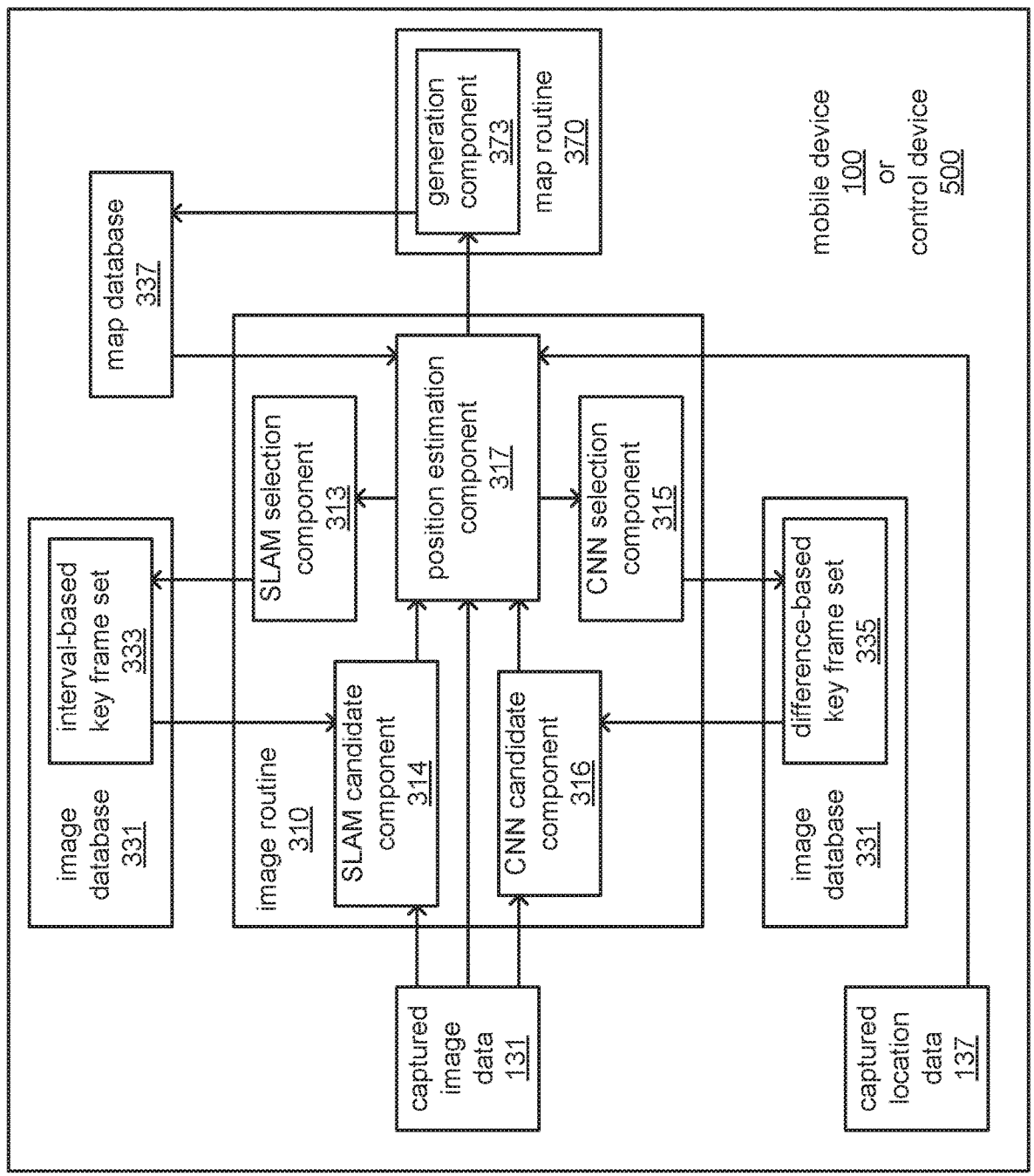
FIGS. 5A and 5B, together, illustrate using two separate sets of key frames to determine a current location of a mobile device according to an embodiment.
Figure 5B:
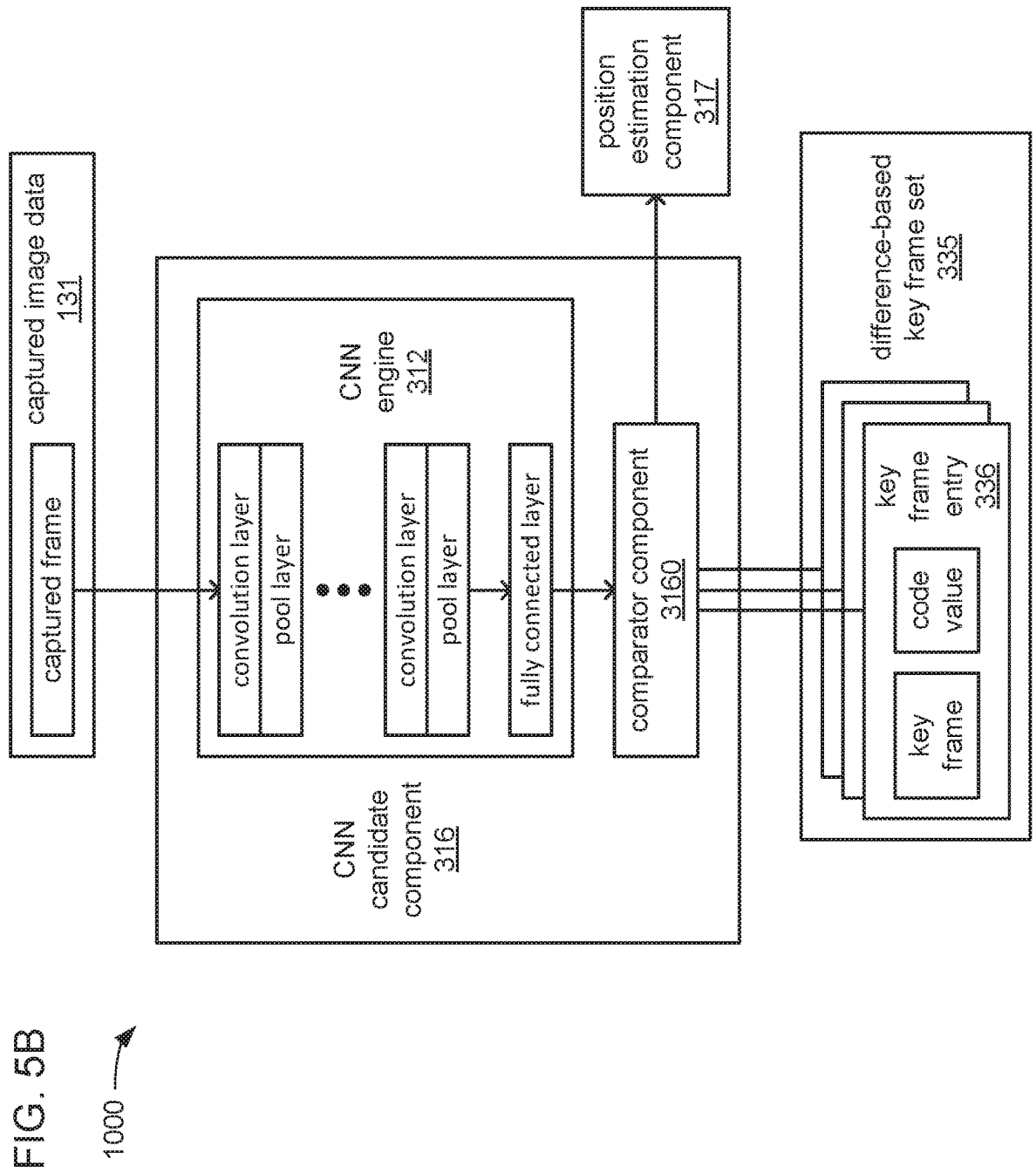

FIGS. 5A-B, together, illustrate an example of using the two sets of key frames 333 and 335 in the embodiment of the locating system 1000 of either FIG. 1A or FIG. 1B to determine the current location of the mobile device 100 in greater detail. More specifically, FIG. 5A depicts aspects of identifying candidate key frames that may match a newly captured key frame from the interval-based key frame set 333 and from the difference-based key frame set 335 of the image database 331 within either the mobile device 100 or the control device 500. FIG. 5B depicts aspects of the use of a convolution neural network (CNN) to select such candidate key frames from the difference-based key frame set 335.

Turning to FIG. 5A, as again depicted, both the map routine 370 and the image routine 310 may be executed by the processor circuit 150 of the mobile device 100 or by the processor circuit 550 of the control device 500. Again, depending on whether these routines 310 and 370 are executed by the processor circuit 150 within the mobile device 100 or by the processor circuit 550 within the control device 500, the captured image data 131 and the captured location data 137 may be provided either directly or indirectly from the one or more cameras 110 and the one or more location sensors 119. However, unlike FIG. 3A, which specifically depicted these aspects, FIG. 5A does not depict these aspects for sake of visual clarity.

As depicted, the image routine 310 may incorporate a SLAM candidate component 314 for execution by the processor circuit 150 or 550 to select one or more candidate key frames from among the key frames of the interval-based key frame set 333 that are found to be relatively similar to a newly captured frame such that the newly captured frame and the one or more candidate key frames may be of roughly the same location along a pathway 701 of the map 700. In various embodiments, the SLAM candidate component 314 may retrieve the newly captured frame from the captured image data 131 and may use any of various algorithms to compare the newly captured frame to key frames of the interval-based key frame set 333, including and not limited to, scale-invariant feature transform (SIFT). Regardless of the specific algorithm to perform the comparisons, the selected algorithm may be configured with a predetermined threshold defining a minimum degree of similarity between the newly captured frame and the key frames of the interval-based key frame set 333 that must be met for a key frame thereof to be selected as a candidate key frame. If any of the key frames within the interval-based key frame set 333 are similar enough to the newly captured frame for the threshold to be met, then the SLAM candidate component 314 may provide the one or more candidate key frames found to be so similar to a position estimation component 317 of the image routine 310.

As depicted, the image routine 310 may also incorporate a CNN candidate component 316 for execution by the processor circuit 150 or 550 to correspondingly select one or more candidate key frames from among the key frames of the difference-based key frame set 335 that are found to be relatively similar to the newly captured frame such that the newly captured frame and the one or more candidate key frames may be of roughly the same location along a pathway 701 of the map 700. As depicted in FIG. 5B, the CNN candidate component 316 may use the same CNN engine 312 earlier depicted in FIG. 3B. Again, the CNN engine 312 may be employed to generate a reduced dimension code value from the newly captured frame retrieved from the captured image data 131. A comparator component 3160 of the CNN candidate component 316 may then compare that code value associated with the newly captured frame to code values that are associated with key frames of the difference-based key frame set 335. It may that, like the comparator component 3150 of the CNN selection component 315, the comparator component 3160 of the CNN candidate component 316 may derive the Euclidean distance between the point coordinates represented by the code value of the newly captured frame and the point coordinates represented by the code values of each of the key frames of the difference-based key frame set 335. The comparator component 3160 may then similarly compare each Euclidean distance to a threshold distance. However, the comparator component 3160 may select key frames to be among the one or more candidate key frames where the Euclidean distance corresponding to those key frames is less than the threshold such that those selected key frames have a minimum degree of similarity to the newly captured frame. In some embodiments, the threshold Euclidean distance employed by the comparator component 3160 to select one or more key frames of the difference-based key frame set 335 to be candidate key frames may be the same as the threshold Euclidean distance employed by the comparator component 3150 to select captured frames to add to the difference-based key frame set 335. If any of the key frames within the difference-based key frame set 335 are similar enough to the newly captured frame for the corresponding Euclidean distance to be less than the Euclidean distance threshold, then the CNN candidate component 316 may provide the one or more candidate key frames found to be so similar to the position estimation component 317 of the image routine 310.

Returning to FIG. 5A, if neither of the SLAM candidate component 314 or the CNN candidate component 316 are able to identify any candidate key frames, then a presumption may be made that the mobile device 100 has been moved to a location within the defined area 300 at which no frame of imagery has been previously captured and selected to become a key frame. This may be an indication that there is still more of the defined area 300 to be added to the map 700, and the newly captured frame may be considered for being added to one or both of the sets of key frames 333 and 335. Specifically, and referring back to FIG. 3A, the SLAM selection component 313 may be triggered to determine whether the interval criterion that determines when to select captured frames to be key frames has been met to select the newly captured frame to become a new key frame in the interval-based key frame set 333. Also, the CNN selection component 315 may be triggered to determine whether the degree of difference between the newly captured frame and all of the key frames within the difference-based key frame set 335 is sufficient to select the newly captured frame to become a new key frame in the difference-based key frame set 335. Regarding this determination of whether to add the newly captured frame to the difference-based key frame set 335, it is important to note that while the Euclidean distance threshold employed by the comparator component 3160 to identify candidate key frames may be the same Euclidean distance threshold employed by the comparator component 3150 to select captured frames to become key frames in some embodiments, other embodiments are possible in which these two Euclidean distances may be different. If the newly captured frame is selected to become a key frame of either of the sets of key frames 333 or 335, then the map routine 370 may be caused to add to the map 700. Specifically, the generation component 373 of the map routine 370 may add another map entry 338 to the map database 337 that corresponds to the location at which the newly captured frame (now a new key frame) was captured, and which may include whatever indication of location may be available within the captured location data 137 (in embodiments in which the captured location data 137 exists).

Alternatively, if either of the SLAM candidate component 314 or the CNN candidate component 316 is able to identify one or more candidate key frames, then a presumption may be made that the mobile device 100 has been moved to a location within the defined area 300 that is at least relatively close to a location at which an image was previously captured that was then selected and stored as a key frame in one or both of the sets of key frames 333 and 335. The position estimation component 317 of the image routine 310 may analyze the manner in which the newly captured frame differs from each of the candidate key frames that may be provided by one or both of the SLAM candidate component 314 and the CNN candidate component 316 to first identify the one of the candidate key frames that differs the least in its perspective (in both angle and distance) from the perspective of the newly captured frame to identify the one of the candidate key frames that was captured at a location that is closer to the location of the newly captured frame than any of the other candidate key frames. Upon identifying the closest candidate key frame, the position estimation component 317 may then derive an estimate of the difference in location between the newly captured frame and the closest candidate key frame. This estimate may then be used to determine the current location of the mobile device 100 relative to the location associated with where the closest candidate frame was captured. In embodiments in which there is also the captured location data 137 available, an indication in the captured location data 137 of the current location of the mobile device 100 may be retrieved by the position estimation component 317 and used as an additional input to determine the current location of the mobile device 100. The current location of the mobile device 100 may then be stored within the storage 160 or 560 as the location data 537.

The fact of having been able to identify at least one candidate key frame to use in determining the current location of the mobile device 100 may be an indication of whether or not a closure of a loop among the pathways 701 of the map 700 has been found. By way of example, it may be that the mobile device 100 has discovered an intersection 704 by following one or more pathways 701 back to a point along an earlier traversed portion of a pathway 701. The estimation component 317 may additionally analyze the path taken by the mobile device 100 to arrive at its current location in comparison to the map 700 maintained within the map database 337 to determine whether or not a loop closure has just been found. If the path that has been taken by the mobile device 100 to arrive at its current location was already known to lead to the current location, then no new loop closure has been found. However, if the path that has been taken by the mobile device 100 to arrive at its current location was not already known to lead to the current location, then a new loop closure has been found, and the position estimation component 317 may trigger the generation component 373 of the map routine 370 to update the map database 337 to include the new loop closure.

In various embodiments, the processor circuits 150 and/or 550 may include any of a wide variety of commercially available processors. Further, one or more of these processor circuits may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 160 and/or 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of the network interfaces 190 and/or 590 may employ any of a wide variety of signaling technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor circuits (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
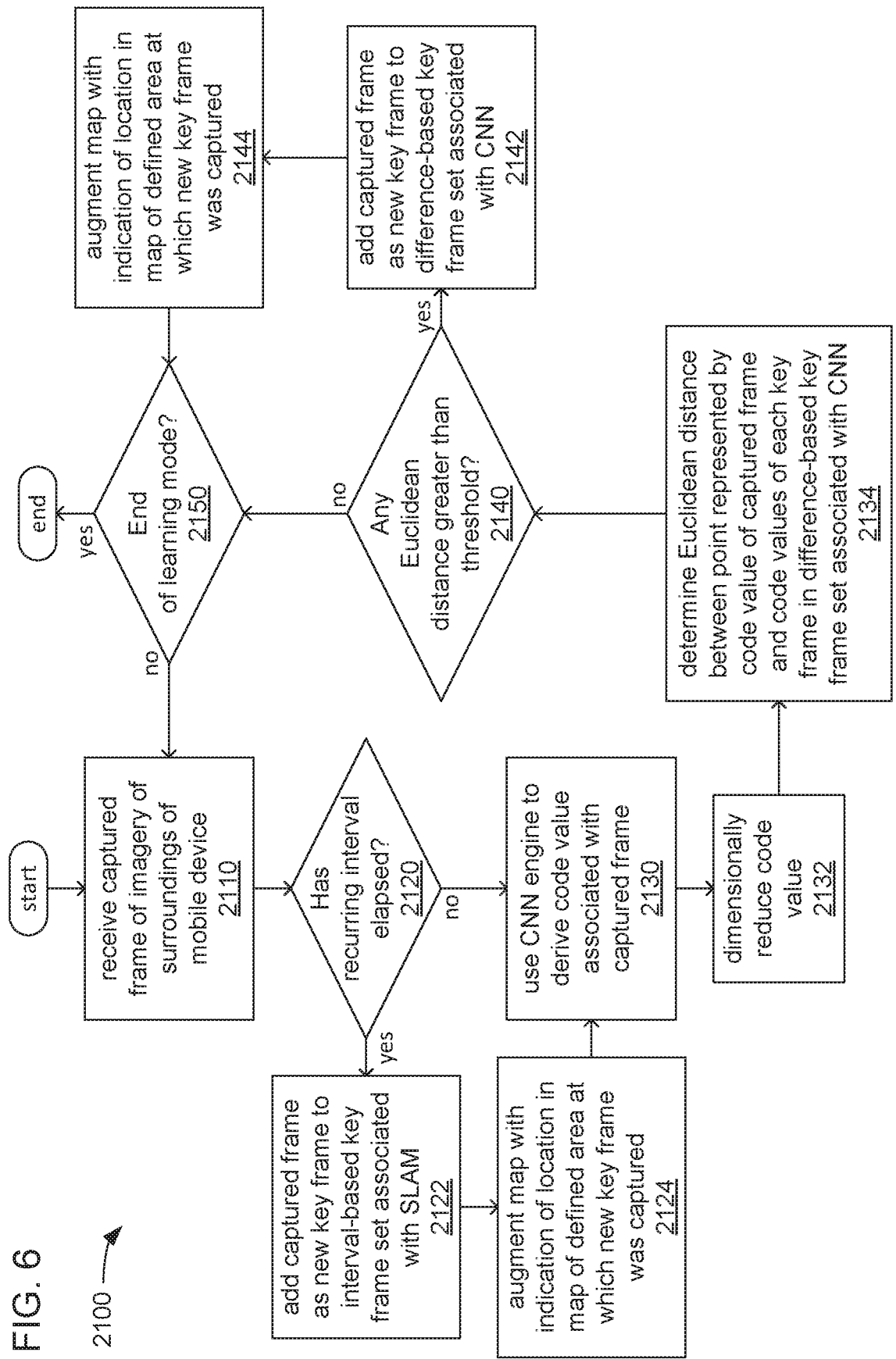
FIG. 6 illustrates a logic flow according to an embodiment.

FIG. 6 illustrates an embodiment of a logic flow 2100. The logic flow 2100 may be representative of some or all of the operations executed by one or more embodiments described herein. More specifically, the logic flow 2100 may illustrate operations performed by one or both of the processor circuits 150 and 550 in executing one or more of the control routine 140, the image routine 310, the map routine 370 and the control routine 540, and/or performed by other component(s) of the mobile device 100 or the control device 500. In particular, the logic flow 2100 is focused on operations to generate portions of a map of a defined area and two separate sets of key frames correlated to locations along pathways of the map.

At 2110, a processor circuit of either a mobile device or a control device (e.g., the processor circuit 150 of the mobile device 100 or the processor circuit 550 of the control device 500) receives a captured frame of imagery of the surroundings of the mobile device within a defined area (e.g., a frame of imagery captured of a location within the defined area 300 and stored as a portion of the captured image data 131). As has been discussed, the captured frame may be captured as the mobile device is moved through the defined area, either under its own power or as a result of being carried.

At 2120, the processor circuit may make a check of whether a recurring interval of time, distance traveled by the mobile device, quantity of frames captured, etc. has elapsed. If such an interval has elapsed, then at 2122, the captured frame may be selected by the processor circuit to become a new key frame added to an interval-based key frame set associated with the use of an implementation of SLAM.

Then, at 2124, the processor circuit may augment a map of the defined area that is described in a map database (e.g., the map 700 described in the map database 337) with an indication of the location in the map at which the new key frame was captured. As has been discussed, in embodiments in which location data indicative of the current location of the mobile device within the defined area is also captured (e.g., the captured location data 137), then such captured location data may be used to additionally correlate the location in the map at which the new key frame was captured to a physical location within the defined area.

At 2130, either following an augmentation of the map at 2124, or a determination of the recurring interval as having not elapsed at 2120, the processor circuit may use a CNN engine (e.g., the CNN engine 312) to derive a code value associated with and indicative of the contents of the captured frame. As previously discussed, the CNN engine may be implemented either as instructions executable by the processor circuit or as hardware-based digital logic. At 2132, either a fully connected layer of the CNN engine or other logic may be used by the processor circuit to dimensionally reduce the code value (e.g., from a value representing coordinates of a point in three dimensions to a value representing coordinates of a point in only one or two dimensions).

At 2134, the processor circuit may determine the Euclidean distances between the coordinates of the point represented by the code value associated with the captured frame and the coordinates of the points represented by the code values associated with each key frame in the difference-based key frame set associated with use of an implementation of CNN (such as, the CNN engine 312). At 2140, the processor circuit may make a check of whether any of the Euclidean distances determined at 2134 are greater than a threshold Euclidean distance for selecting captured frames to become key frames. If, at 2140, any of those Euclidean distances exceed that threshold, then the captured frame may be selected by the processor circuit to become a new key frame added to the difference-based key frame set associated with the use of CNN. Then, at 2144, the processor circuit may augment the map with an indication of the location in the map at which the new key frame was captured. Again, in embodiments in which location data indicative of the current location of the mobile device within the defined area is also captured, such captured location data may be used to additionally correlate the location in the map at which the new key frame was captured to a physical location within the defined area.

At 2150, either following an augmentation of the map at 2144, or a determination of none of the Euclidean distances exceeding the threshold at 2140, the processor circuit may make a check of whether a current learning mode has ended. As has been discussed, in embodiments in which there is a distinct learning mode to generate the map and image databases before making use of them to determine a current location of the mobile device, such a learning mode may be ended through a command provided by an operator of the control device (e.g., through operation of the user interface provided by the controls 520 and/or the display 580). Alternatively, as has also been discussed, such a learning mode may also be ended automatically in response to a predetermined condition having been met, such as a predetermined amount of time having elapsed, a predetermined distance having been traveled by the mobile device, or a predetermined quantity of frames having been captured since the last time a captured frame was found to be sufficiently different from all of the key frames within the difference-based key frame set to be selected to be added thereto as a new key frame. If such a learning mode has not ended at 2150, then the processor circuit may receive another captured frame at 2110.

Figure 7A:
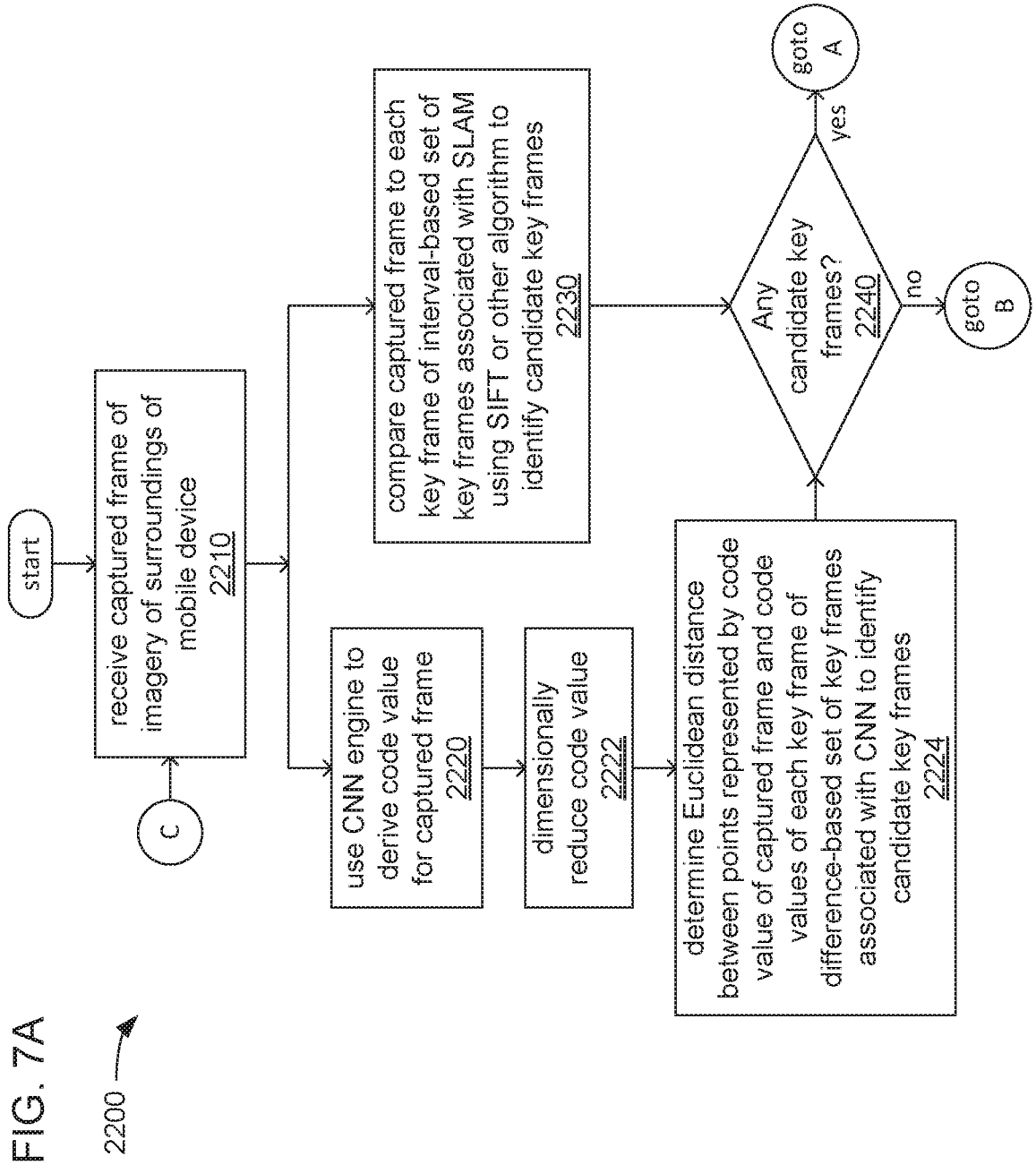
FIGS. 7A, 7B and 7C, together, illustrate another logic flow according to an embodiment.
Figure 7B:
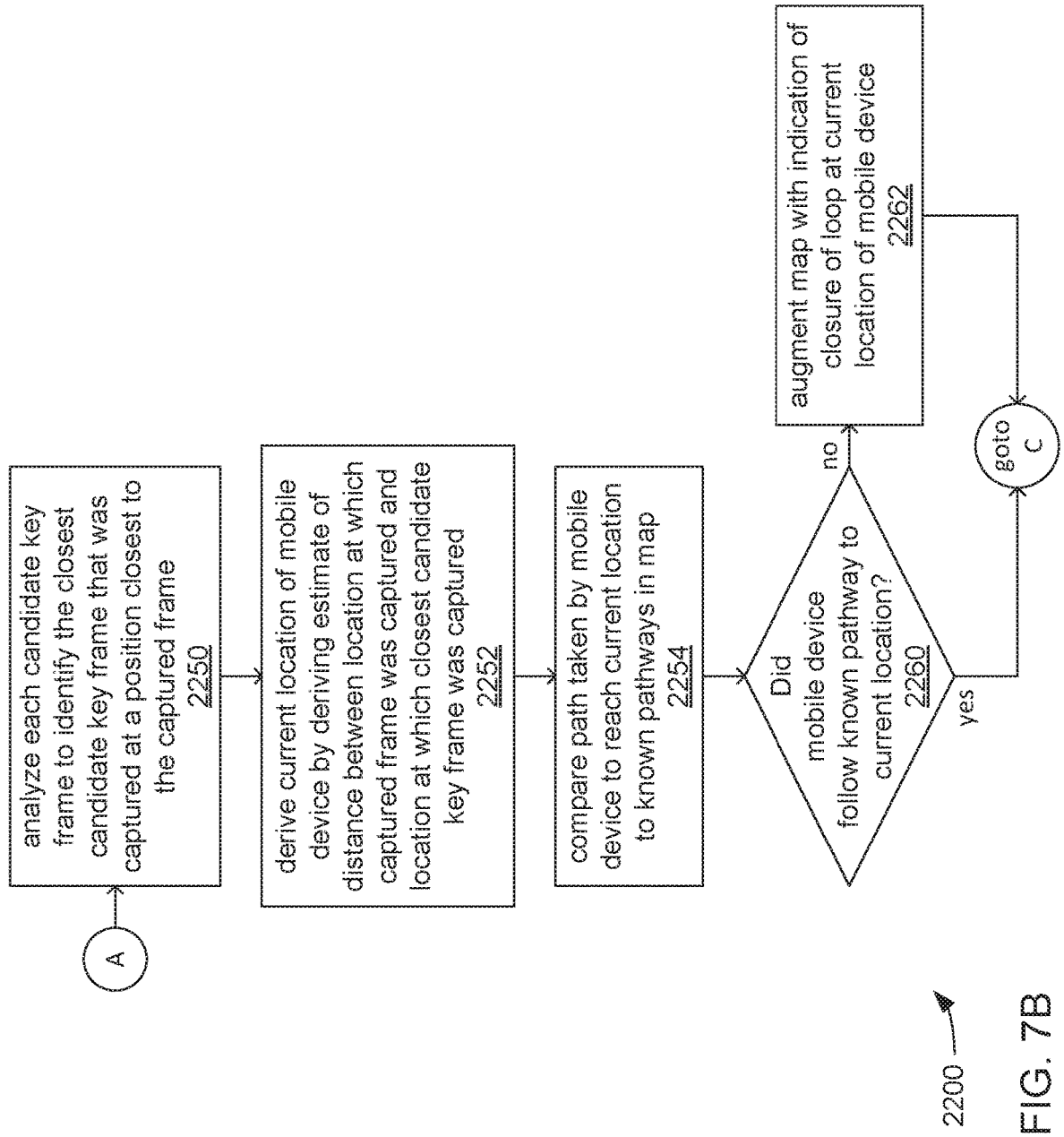
Figure 7C:
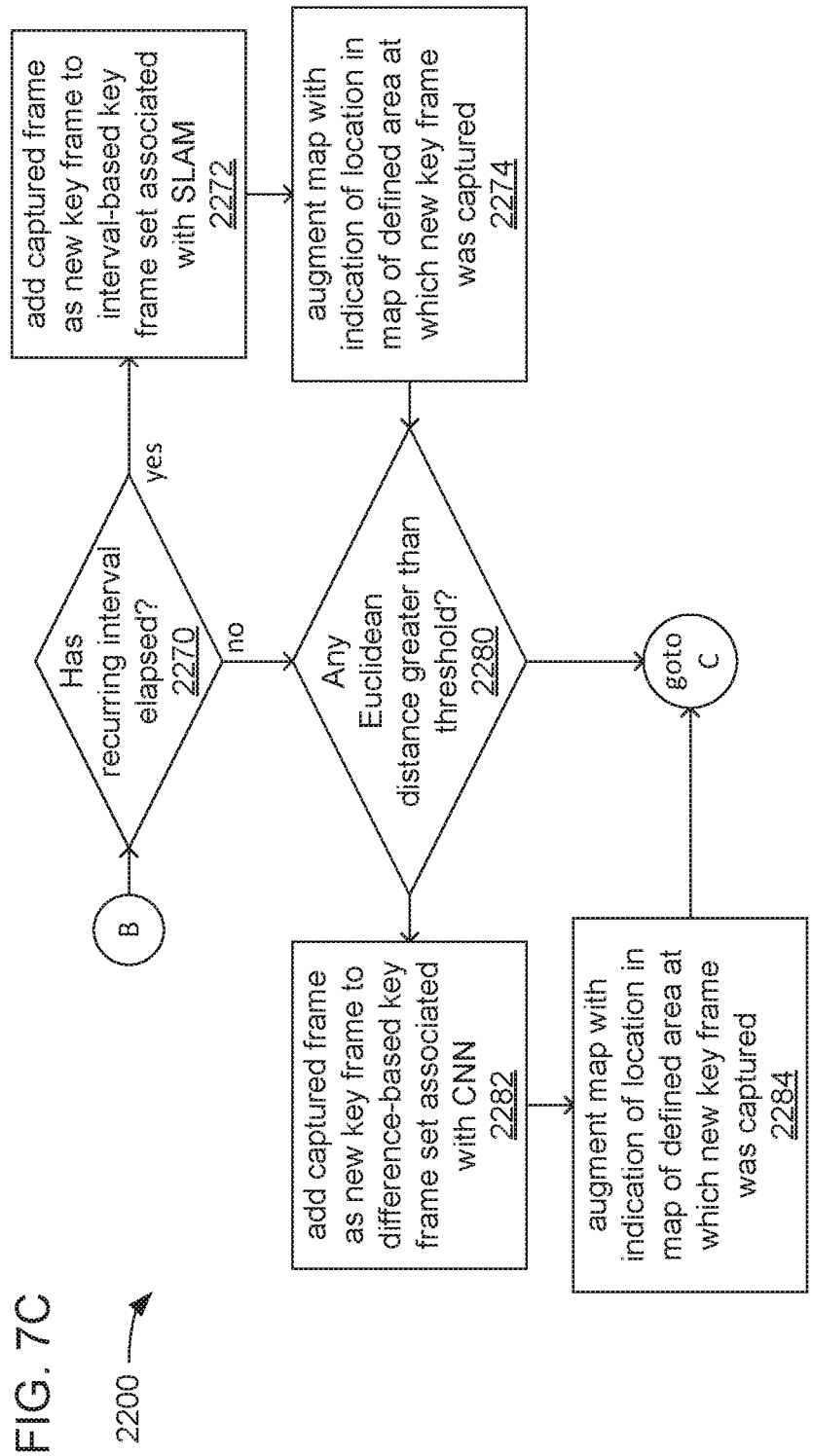

FIGS. 7A, 7B and 7C, together, illustrate an embodiment of a logic flow 2200. The logic flow 2200 may be representative of some or all of the operations executed by one or more embodiments described herein. More specifically, the logic flow 2200 may illustrate operations performed by one or both of the processor circuits 150 and 550 in executing one or more of the control routine 140, the image routine 310, the map routine 370 and the control routine 540, and/or performed by other component(s) of the mobile device 100 or the control device 500. In particular, the logic flow 2200 is focused on operations to use two separate sets of key frames correlated to locations along pathways of the map to determine a current location of a mobile device.

At 2210, a processor circuit of either a mobile device or a control device (e.g., the processor circuit 150 of the mobile device 100 or the processor circuit 550 of the control device 500) receives a captured frame of imagery of the surroundings of the mobile device within a defined area (e.g., a frame of imagery captured of a location within the defined area 300 and stored as a portion of the captured image data 131). As has been discussed, the captured frame may be captured as the mobile device is moved through the defined area, either under its own power or as a result of being carried.

At 2220, the processor circuit may use a CNN engine (e.g., the CNN engine 312) to derive a code value associated with and indicative of the contents of the captured frame. As previously discussed, the CNN engine may be implemented either as instructions executable by the processor circuit or as hardware-based digital logic. At 2222, either a fully connected layer of the CNN engine or other logic may be used by the processor circuit to dimensionally reduce the code value (e.g., from a value representing coordinates of a point in three dimensions to a value representing coordinates of a point in only one or two dimensions). At 2224, the processor circuit may determine the Euclidean distances between the coordinates of the point represented by the code value associated with the captured frame and the coordinates of the points represented by the code values associated with each key frame in a difference-based key frame set associated with use of an implementation of CNN (such as, the CNN engine 312) to identify candidate key frames that are sufficiently similar to the captured frame that the Euclidean distance between the points thereof is less than a predetermined threshold.

Occurring at least partially in parallel with 2220, 2222 and/or 2224, at 2230, the processor circuit compare the captured frame to each key frame in an interval-based key frame set associated with use of an implementation of SLAM to identify candidate key frames that have at least a predetermined threshold degree of similarity to the captured frame. In so doing, the processor circuit may use any of a variety of algorithms to quantifiably perform the comparisons, such as the SIFT algorithm. At 2240, the processor circuit may make a check of whether there are any candidate key frames, at all, either from the CNN-based approach at 2220 through 2224 or from the SIFT (or other approach) at 2230.

If there are any candidate key frames at 2240, then at 2250, the processor circuit may analyze the contents of each candidate key frame in comparison to the contents of the captured frame to identify the one of the candidate key frames that was captured at a location closer to the location at which the captured frame was captured than any of the other candidate key frames. At 2252, the processor circuit may then derive the current location of the mobile device by deriving an estimate of the distance between the location at which that closest candidate key frame was captured and the location at which the captured frame was captured. At 2254, the processor circuit may then compare the path taken by the mobile device to reach its current location to known pathways in the map. At 2260, if the mobile device did not follow a pathway in the map that was known to lead to the current location of the mobile device, then at 2262, the processor circuit may augment the map with an indication that a loop in a pathway of the map closes at the current location of the mobile device such that there may be an intersection at the current location of the mobile device. Regardless of whether it is determined at 2260 that the mobile device did or did not follow a pathway of the map that was known to lead to its current location, the processor circuit may then receive another captured frame at 2210.

However, if there are no candidate key frames at 2240, then as has been discussed, a presumption may be made that the captured frame is of a portion of the defined area for which no key frame has yet been captured and stored in one of the two sets of key frames. At 2270, the processor circuit may make a check of whether a recurring interval of time, distance traveled by the mobile device, quantity of frames captured, etc. has elapsed. If so, then at 2272, the captured frame may be selected by the processor circuit to become a new key frame added to the interval-based key frame set associated with the use of an implementation of SLAM. Then, at 2274, the processor circuit may augment the map with an indication of the location in the map at which the new key frame was captured. Again, in embodiments in which location data indicative of the current location of the mobile device within the defined area is also captured (e.g., the captured location data 137), then such captured location data may be used to additionally correlate the location in the map at which the new key frame was captured to a physical location within the defined area. At 2280, the processor circuit may make a check of whether any of the Euclidean distances earlier determined at 2224 are greater than a threshold Euclidean distance for selecting captured frames to become key frames. If, at 2280, any of those Euclidean distances exceed that threshold, then the captured frame may be selected by the processor circuit to become a new key frame added to the difference-based key frame set associated with the use of CNN. Then, at 2284, the processor circuit may augment the map with an indication of the location in the map at which the new key frame was captured. The processor circuit may then receive another captured frame at 2210.

Figure 8:
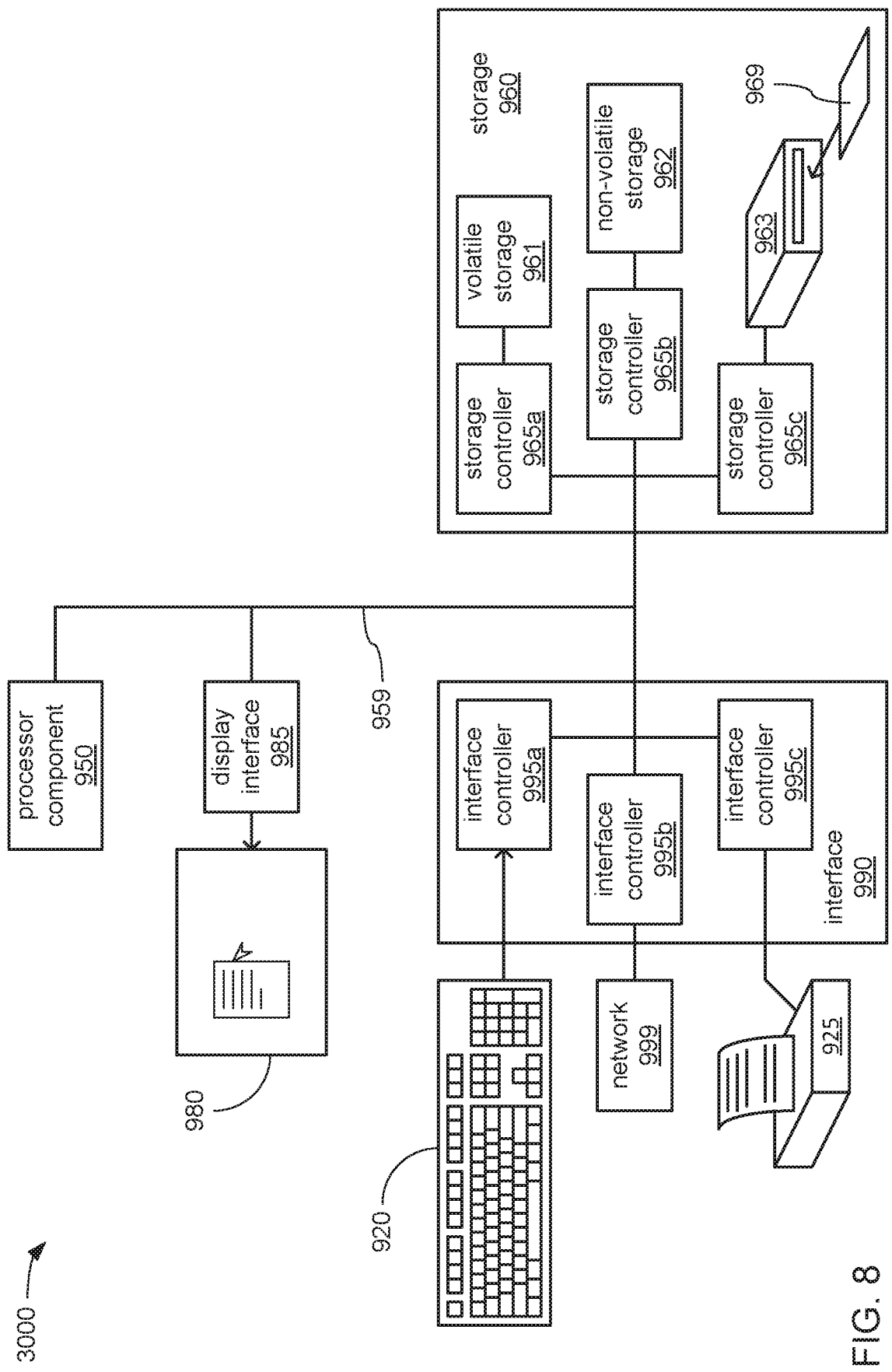
FIG. 8 illustrates a processing architecture according to an embodiment.

FIG. 8 illustrates an embodiment of an exemplary processing architecture 3000 suitable for implementing various embodiments as previously described. More specifically, the processing architecture 3000 (or variants thereof) may be implemented as part of one or more of the devices 100, 200, 304, 305 or 500, and/or the controller 400. It should be noted that components of the processing architecture 3000 are given reference numbers in which the last two digits correspond to the last two digits of reference numbers of at least some of the components earlier depicted and described as part of these devices and/or controllers. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, a software object, an executable sequence of instructions, a thread of execution, a program, and/or an entire device (e.g., an entire computer). By way of illustration, both an application running on a server and the server can be a component. One or more components can reside within a process and/or thread of execution, and a component can be localized on one device and/or distributed between two or more devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a device includes at least a processor circuit 950, a storage 960, an interface 990 to other devices, and a coupling 959. As will be explained, depending on various aspects of a device implementing the processing architecture 3000, including its intended use and/or conditions of use, such a device may further include additional components, such as without limitation, a display interface 985.

The coupling 959 includes one or more buses, point-to-point interconnects, transceivers, buffers, crosspoint switches, and/or other conductors and/or logic that communicatively couples at least the processor circuit 950 to the storage 960. Coupling 959 may further couple the processor circuit 950 to one or more of the interface 990, the audio subsystem 970 and the display interface 985 (depending on which of these and/or other components are also present). With the processor circuit 950 being so coupled by couplings 959, the processor circuit 950 is able to perform the various ones of the tasks described at length, above, for whichever one(s) of the aforedescribed devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (which may correspond to the processor circuit 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between devices). This depiction of the storage 960 as possibly including multiple distinct types of storage is in recognition of the commonplace use of more than one type of storage device in devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor circuit 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a device at different times to store executable routines and/or data. Thus, a routine including a sequence of instructions to be executed by the processor circuit 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor circuit 950 as that routine is executed.

As previously discussed, the interface 990 (which may correspond to the interface(s) 490) may employ any of a variety of signaling technologies corresponding to any of a variety of communications technologies that may be employed to communicatively couple a device to one or more other devices. Again, one or both of various forms of wired or wireless signaling may be employed to enable the processor circuit 950 to interact with input/output devices (e.g., the depicted example keyboard 920 or printer 925) and/or other devices, possibly through a network (e.g., the network 999) or an interconnected set of networks. In recognition of the often greatly different character of multiple types of signaling and/or protocols that must often be supported by any one device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface controller 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a device is communicatively coupled to (or perhaps, actually incorporates) a display (e.g., the depicted example display 980), such a device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 9A:
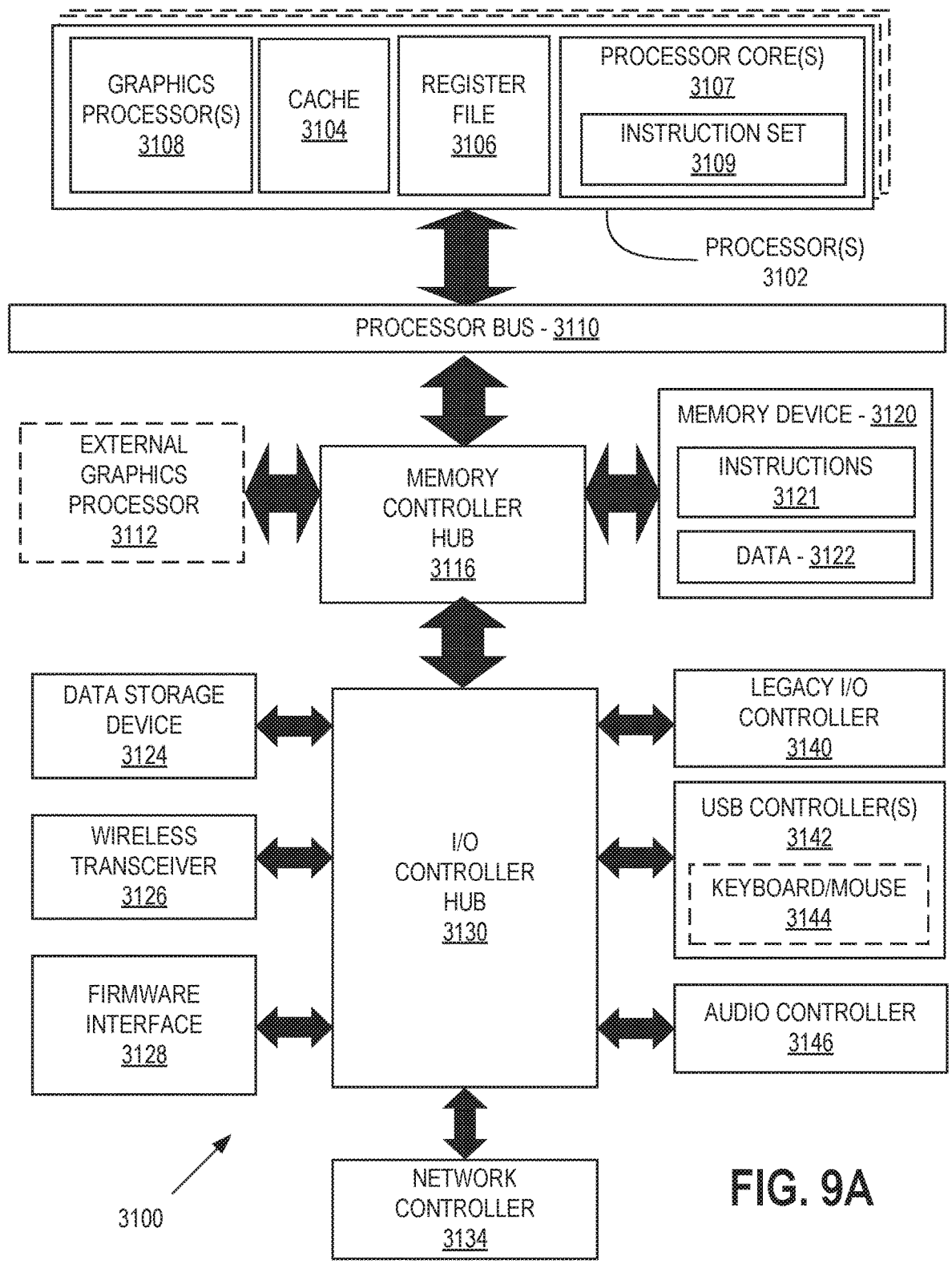
FIG. 9A illustrates a block diagram of a processing system, according to an embodiment.
Figure 9B:
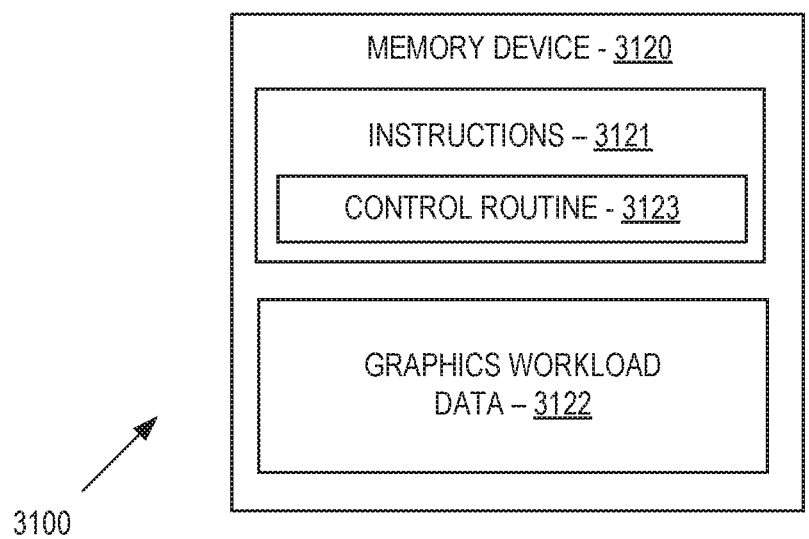
FIG. 9B illustrates a block diagram of a portion of the processing system of FIG. 1A, according to an embodiment.

FIGS. 9A and 9B are block diagrams of a processing system 3100 to identify performance bottlenecks in a graphics workload, according to an embodiment. In various embodiments the system 3100 includes one or more processors 3102 and one or more graphics processors 3108, and may be a single processor desktop system, a multiprocessor workstation system, or a server system having a large number of processors 3102 or processor cores 3107. In one embodiment, the system 3100 is a processing platform incorporated within a system-on-a-chip (SoC) integrated circuit for use in mobile, handheld, or embedded devices.

An embodiment of system 3100 can include (or be incorporated within) a server-based gaming platform, a game console, including a game and media console, a mobile gaming console, a handheld game console, or an online game console. In some embodiments system 3100 is a mobile phone, smart phone, tablet computing device or mobile Internet device. Data processing system 3100 can also include, couple with, or be integrated within a wearable device, such as a smart watch wearable device, smart eyewear device, augmented reality device, or virtual reality device. In some embodiments, system 3100 is a television or set top box device having one or more processors 3102 and a graphical interface generated by one or more graphics processors 3108.

In some embodiments, the one or more processors 3102 each include one or more processor cores 3107 to process instructions which, when executed, perform operations for system and user software. In some embodiments, each of the one or more processor cores 3107 is configured to process a specific instruction set 3109. In some embodiments, instruction set 3109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 3107 may also include other processing devices, such as a Digital Signal Processor (DSP).

In some embodiments, the processor 3102 includes cache memory 3104. Depending on the architecture, the processor 3102 can have a single internal cache or multiple levels of internal cache. In some embodiments, the cache memory is shared among various components of the processor 3102. In some embodiments, the processor 3102 also uses an external cache (e.g., a Level-3 (L3) cache or Last Level Cache (LLC)) (not shown), which may be shared among processor cores 3107 using known cache coherency techniques. A register file 3106 is additionally included in processor 3102 which may include different types of registers for storing different types of data (e.g., integer registers, floating point registers, status registers, and an instruction pointer register). Some registers may be general-purpose registers, while other registers may be specific to the design of the processor 3102. The different registers in the register file 3106 are identified by a register address. For example, the register file 3106 is depicted including register addresses 3141-1, 3141-2, 3141-3, to 3141-N.

In some embodiments, processor 3102 is coupled to a processor bus 3110 to transmit communication signals such as address, data, or control signals between processor 3102 and other components in system 3100. In one embodiment the system 3100 uses exemplary 'hub' system architecture, including a memory controller hub 3116 and an Input Output (I/O) controller hub 3130. Memory controller hub 3116 may facilitate communication between a memory device and other components of system 3100, while I/O Controller Hub (ICH) 3130 may provide connections to I/O devices via a local I/O bus. In one embodiment, the logic of the memory controller hub 3116 is integrated within the processor.

Memory device 3120 can be a dynamic random access memory (DRAM) device, a static random access memory (SRAM) device, flash memory device, phase-change memory device, or some other memory device having suitable performance to serve as process memory. In one embodiment the memory device 3120 can operate as system memory for the system 3100, to store graphics workload data 3122 and instructions 3121 for use when the one or more processors 3102 executes an application or process. Memory controller hub 3116 also couples with an optional external graphics processor 3112, which may communicate with the one or more graphics processors 3108 in processors 3102 to perform graphics and media operations.

In some embodiments, ICH 3130 enables peripherals to connect to memory device 3120 and processor 3102 via a high-speed I/O bus. The I/O peripherals include, but are not limited to, an audio controller 3146, a firmware interface 3128, a wireless transceiver 3126 (e.g., Wi-Fi, Bluetooth), a data storage device 3124 (e.g., hard disk drive, flash memory, etc.), and a legacy I/O controller 3140 for coupling legacy (e.g., Personal System 2 (PS/2)) devices to the system. One or more Universal Serial Bus (USB) controllers 3142 connect input devices, such as keyboard and mouse 3144 combinations. A network controller 3134 may also couple to ICH 3130. In some embodiments, a high-performance network controller (not shown) couples to processor bus 3110. It will be appreciated that the system 3100 shown is exemplary and not limiting, as other types of data processing systems that are differently configured may also be used. For example, the ICH 3130 may be integrated within the one or more processor 3102, or the memory controller hub 3116 and ICH 3130 may be integrated into a discreet external graphics processor, such as the external graphics processor 3112.

Figure 18:
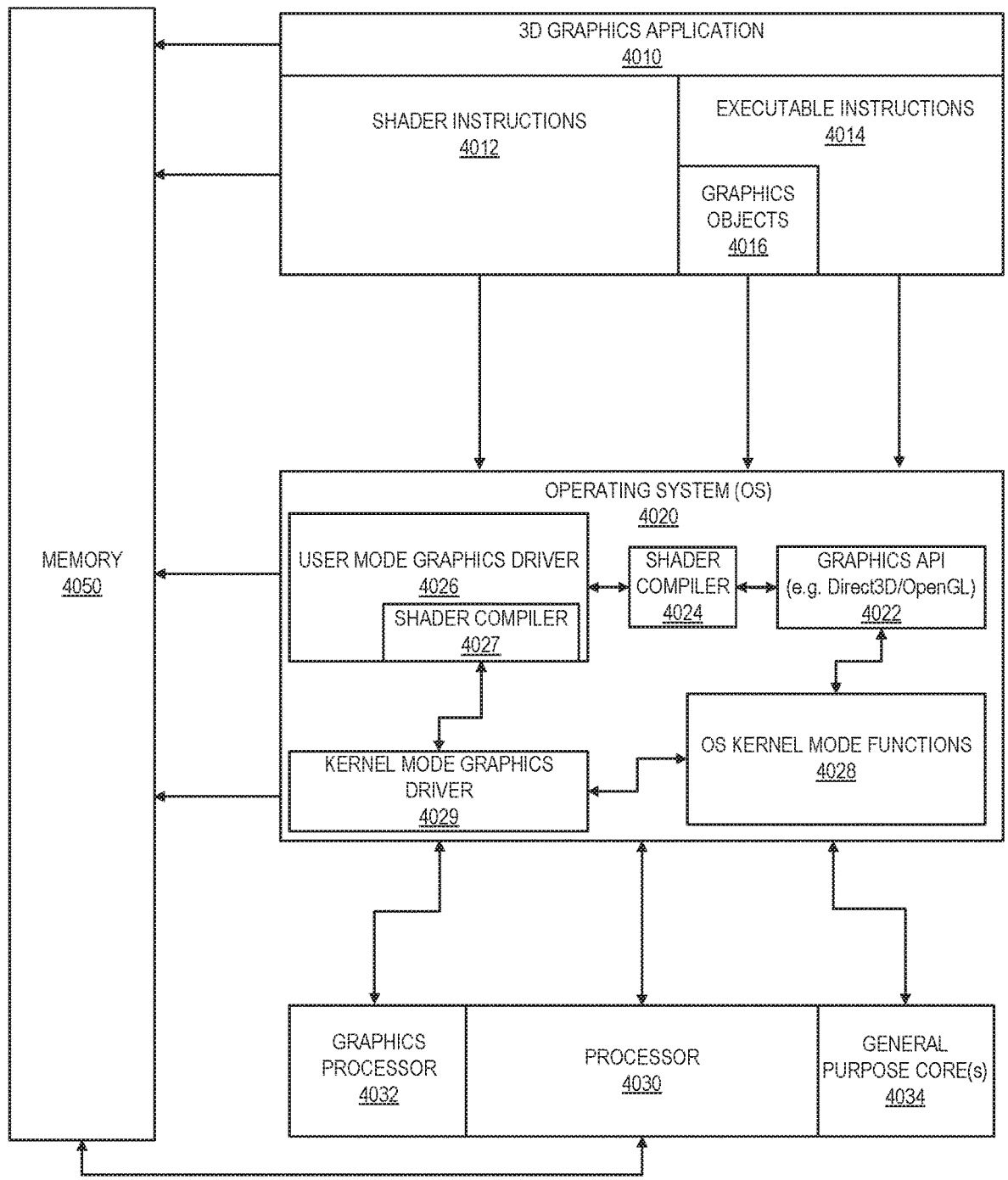
FIG. 18 illustrates a block diagram of graphics software architecture, according to an embodiment.

During operation, the processor cores 3107 may execute instructions to identify performance bottlenecks in execution of a graphics workload (e.g., refer to 3D graphics application 4010 and/or graphics objects 4016 of FIG. 18, or the like) by the graphics processor(s) 3108 and/or external graphics processor 3112. In particular, processor cores 3107 may execute instructions 3121 including control routine 3123 to generate an event priority tree 3125 based on a number of events. Each of the events can include a signature and a weight. In some examples, the signature includes an indication of a behavior of the event during execution on the graphics processor(s) 3108 and/or the external graphics processor 3112. For example, the signatures can include an indication of area, or architectural blocks (e.g., refer to FIG. 16, or the like) in which bottlenecks are occurring. In some examples, the event priority tree 3125 comprises parent nodes and leaf nodes, where the parent nodes correspond to leaf nodes of events sharing a particular architectural element (e.g., shader, or the like). Parent and leaf nodes can be sorted based on weight (or combined weight) of the events.

Additionally, the present disclosure can be implemented to identify performance bottlenecks across frames of a video to be rendered. In particular, the events discussed above may correspond to multiple frames. The frames can be sorted based on a combined weight of the events corresponding to each frame.

Accordingly, performance bottlenecks can be identified and analysis of such bottlenecks can be increased based on the event priority tree and/or sorted frames. As the present disclosure is applicable to graphics workloads and graphics processors, FIGS. 10-20 are given to provide clarity and breadth to the disclosure.

Figure 10:
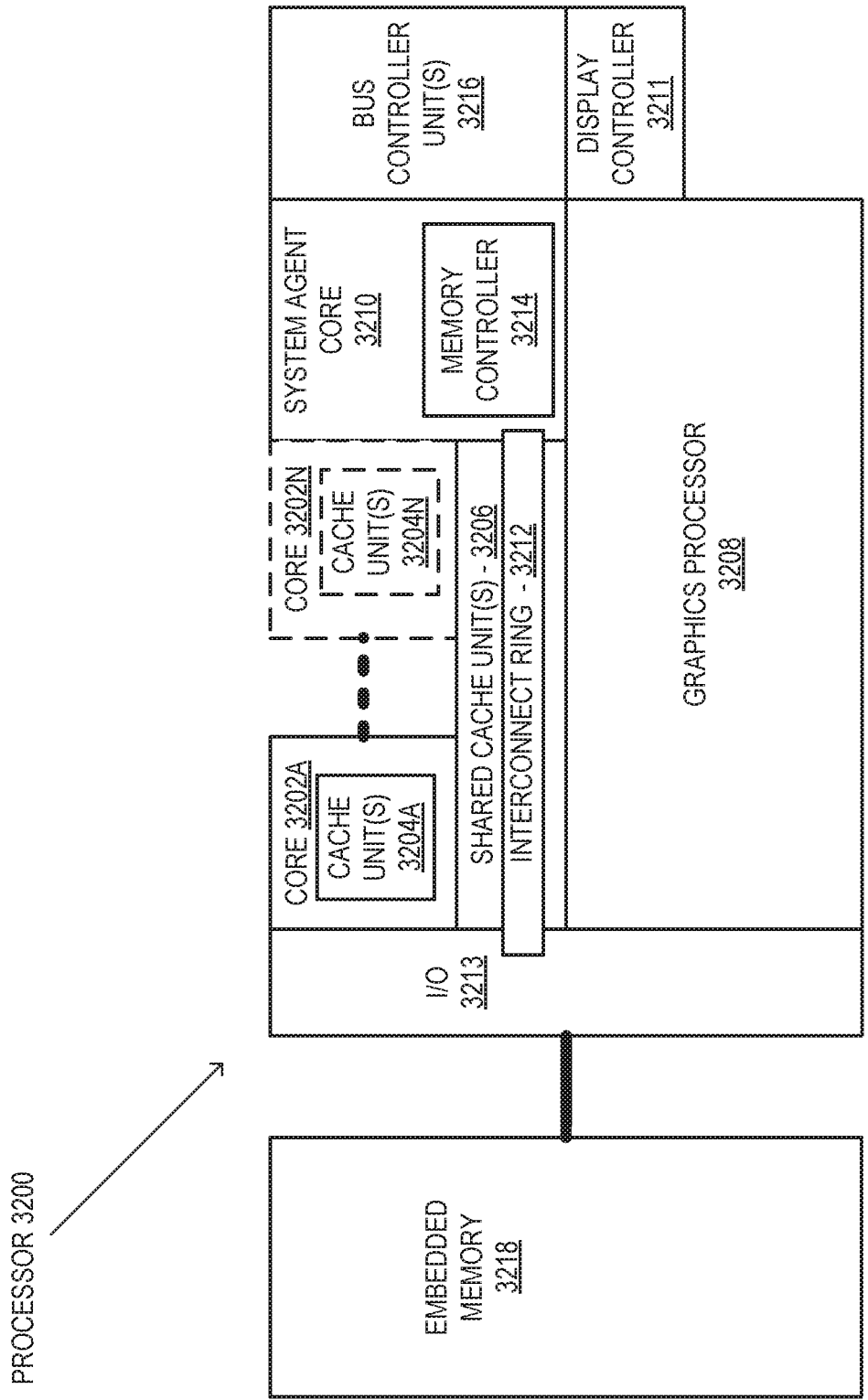
FIG. 10 illustrates a block diagram of a processor, according to an embodiment.

FIG. 10 is a block diagram of an embodiment of a processor 3200 to suppress redundant source operand reads and replicate read data for operands where the read requests were suppressed. In some examples, the processor 3200 may have one or more processor cores 3202A-3202N, an integrated memory controller 3214, and an integrated graphics processor 3208. Those elements of FIG. 10 having the same reference numbers (or names) as the elements of any other figure herein can operate or function in any manner similar to that described elsewhere herein, but are not limited to such. Processor 3200 can include additional cores up to and including additional core 3202N represented by the dashed lined boxes. Each of processor cores 3202A-3202N includes one or more internal cache units 3204A-3204N. In some embodiments each processor core also has access to one or more shared cached units 3206.

The internal cache units 3204A-3204N and shared cache units 3206 represent a cache memory hierarchy within the processor 3200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 3206 and 3204A-3204N.

In some embodiments, processor 3200 may also include a set of one or more bus controller units 3216 and a system agent core 3210. The one or more bus controller units 3216 manage a set of peripheral buses, such as one or more Peripheral Component Interconnect buses (e.g., PCI, PCI Express). System agent core 3210 provides management functionality for the various processor components. In some embodiments, system agent core 3210 includes one or more integrated memory controllers 3214 to manage access to various external memory devices (not shown).

In some embodiments, one or more of the processor cores 3202A-3202N include support for simultaneous multi-threading. In such embodiment, the system agent core 3210 includes components for coordinating and operating cores 3202A-3202N during multi-threaded processing. System agent core 3210 may additionally include a power control unit (PCU), which includes logic and components to regulate the power state of processor cores 3202A-3202N and graphics processor 3208.

In some embodiments, processor 3200 additionally includes graphics processor 3208 to execute graphics processing operations. In some embodiments, the graphics processor 3208 couples with the set of shared cache units 3206, and the system agent core 3210, including the one or more integrated memory controllers 3214. In some embodiments, a display controller 3211 is coupled with the graphics processor 3208 to drive graphics processor output to one or more coupled displays. In some embodiments, display controller 3211 may be a separate module coupled with the graphics processor via at least one interconnect, or may be integrated within the graphics processor 3208 or system agent core 3210.

In some embodiments, a ring based interconnect unit 3212 (ring interconnect) is used to couple the internal components of the processor 3200. However, an alternative interconnect unit may be used, such as a point-to-point interconnect, a switched interconnect, or other techniques, including techniques well known in the art. In some embodiments, graphics processor 3208 couples with the ring interconnect 3212 via an I/O link 3213.

The exemplary I/O link 3213 represents at least one of multiple varieties of I/O interconnects, including an on package I/O interconnect that facilitates communication between various processor components and a high-performance embedded memory 3218, such as an eDRAM module. In some embodiments, each of the processor cores 3202A-3202N and graphics processor 3208 use embedded memory 3218 as a shared Last Level Cache.

In some embodiments, processor cores 3202A-3202N are homogenous cores executing the same instruction set architecture. In another embodiment, processor cores 3202A-3202N are heterogeneous in terms of instruction set architecture (ISA), where one or more of processor cores 3202A-3202N execute a first instruction set and at least one of the other cores executes a subset of the first instruction set or a different instruction set. In one embodiment processor cores 3202A-3202N are heterogeneous in terms of microarchitecture, where one or more cores having relatively higher power consumption coupled with one or more power cores having lower power consumption. Additionally, processor 3200 can be implemented on one or more chips or as an SoC integrated circuit having the illustrated components, in addition to other components.

Figure 11:
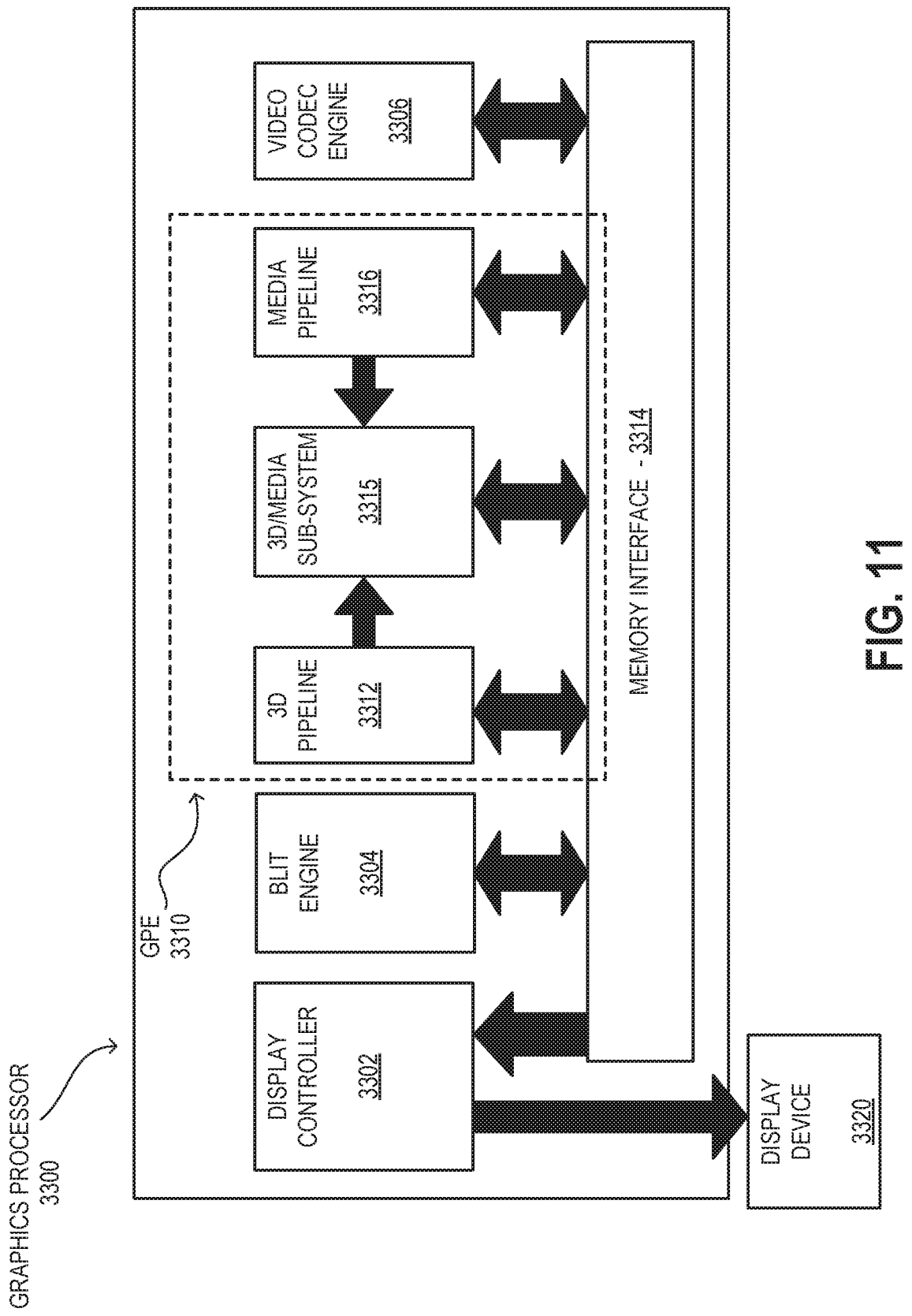
FIG. 11 illustrates a block diagram of a graphics processor, according to an embodiment.

FIG. 11 is a block diagram of a graphics processor 3300 to suppress redundant source operand reads and replicate read operands. In some examples, the processor 3300 may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 3300 includes a memory interface 3314 to access memory. Memory interface 3314 can be an interface to local memory, one or more internal caches, one or more shared external caches, and/or to system memory.

In some embodiments, graphics processor 3300 also includes a display controller 3302 to drive display output data to a display device 3320. Display controller 3302 includes hardware for one or more overlay planes for the display and composition of multiple layers of video or user interface elements. In some embodiments, graphics processor 3300 includes a video codec engine 3306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 3300 includes a block image transfer (BLIT) engine 3304 to perform two-dimensional (2D) rasterizer operations including, for example, bit-boundary block transfers. However, in one embodiment, 2D graphics operations are performed using one or more components of graphics processing engine (GPE) 3310. In some embodiments, GPE engine 3310 is a compute engine for performing graphics operations, including three-dimensional (3D) graphics operations and media operations.

In some embodiments, GPE 3310 includes a 3D pipeline 3312 for performing 3D operations, such as rendering three-dimensional images and scenes using processing functions that act upon 3D primitive shapes (e.g., rectangle, triangle, etc.). The 3D pipeline 3312 includes programmable and fixed function elements that perform various tasks within the element and/or spawn execution threads to a 3D/Media sub-system 3315. While 3D pipeline 3312 can be used to perform media operations, an embodiment of GPE 3310 also includes a media pipeline 3316 that is specifically used to perform media operations, such as video post-processing and image enhancement.

In some embodiments, media pipeline 3316 includes fixed function or programmable logic units to perform one or more specialized media operations, such as video decode acceleration, video de-interlacing, and video encode acceleration in place of, or on behalf of video codec engine 3306. In some embodiments, media pipeline 3316 additionally includes a thread spawning unit to spawn threads for execution on 3D/Media sub-system 3315. The spawned threads perform computations for the media operations on one or more graphics execution units included in 3D/Media sub-system 3315.

In some embodiments, 3D/Media subsystem 3315 includes logic for executing threads spawned by 3D pipeline 3312 and media pipeline 3316. In one embodiment, the pipelines send thread execution requests to 3D/Media subsystem 3315, which includes thread dispatch logic for arbitrating and dispatching the various requests to available thread execution resources. The execution resources include an array of graphics execution units to process the 3D and media threads. In some embodiments, 3D/Media subsystem 3315 includes one or more internal caches for thread instructions and data. In some embodiments, the subsystem also includes shared memory, including registers and addressable memory, to share data between threads and to store output data.

Figure 12:
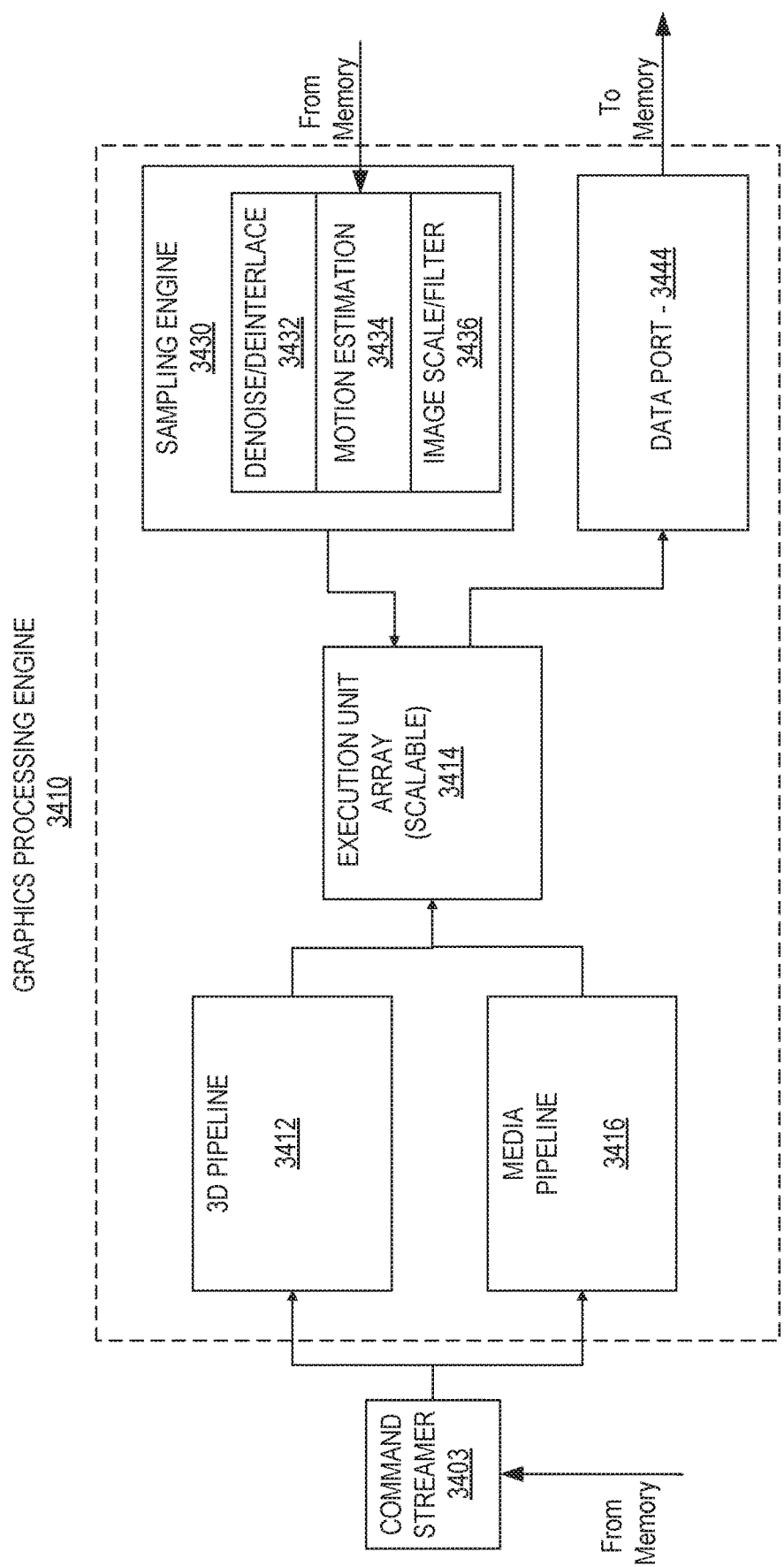
FIG. 12 illustrates a block diagram of a graphics processing engine, according to an embodiment.

FIG. 12 is a block diagram of a graphics processing engine 3410 of a graphics processor in accordance with some embodiments. In one embodiment, the GPE 3410 is a version of the GPE 3310 shown in FIG. 11. Elements of FIG. 12 having the same reference numbers (or names) as the elements of any other figure herein can operate or function in any manner similar to that described elsewhere herein, but are not limited to such.

In some embodiments, GPE 3410 couples with a command streamer 3403, which provides a command stream to the GPE 3D and media pipelines 3412, 3416. In some embodiments, command streamer 3403 is coupled to memory, which can be system memory, or one or more of internal cache memory and shared cache memory. In some embodiments, command streamer 3403 receives commands from the memory and sends the commands to 3D pipeline 3412 and/or media pipeline 3416. The commands are directives fetched from a ring buffer, which stores commands for the 3D and media pipelines 3412, 3416. In one embodiment, the ring buffer can additionally include batch command buffers storing batches of multiple commands. The 3D and media pipelines 3412, 3416 process the commands by performing operations via logic within the respective pipelines or by dispatching one or more execution threads to an execution unit array 3414. In some embodiments, execution unit array 3414 is scalable, such that the array includes a variable number of execution units based on the target power and performance level of GPE 3410.

In some embodiments, a sampling engine 3430 couples with memory (e.g., cache memory or system memory) and execution unit array 3414. In some embodiments, sampling engine 3430 provides a memory access mechanism for execution unit array 3414 that allows execution array 3414 to read graphics and media data from memory. In some embodiments, sampling engine 3430 includes logic to perform specialized image sampling operations for media.

In some embodiments, the specialized media sampling logic in sampling engine 3430 includes a de-noise/de-interlace module 3432, a motion estimation module 3434, and an image scaling and filtering module 3436. In some embodiments, de-noise/de-interlace module 3432 includes logic to perform one or more of a de-noise or a de-interlace algorithm on decoded video data. The de-interlace logic combines alternating fields of interlaced video content into a single frame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 3432 includes dedicated motion detection logic (e.g., within the motion estimation engine 3434).

In some embodiments, motion estimation engine 3434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 3434 to perform operations on video at the macro-block level that may otherwise be too computationally intensive to perform with a general-purpose processor. In some embodiments, motion estimation engine 3434 is generally available to graphics processor components to assist with video decode and processing functions that are sensitive or adaptive to the direction or magnitude of the motion within video data.

In some embodiments, image scaling and filtering module 3436 performs image-processing operations to enhance the visual quality of generated images and video. In some embodiments, scaling and filtering module 3436 processes image and video data during the sampling operation before providing the data to execution unit array 3414.

In some embodiments, the GPE 3410 includes a data port 3444, which provides an additional mechanism for graphics subsystems to access memory. In some embodiments, data port 3444 facilitates memory access for operations including render target writes, constant buffer reads, scratch memory space reads/writes, and media surface accesses. In some embodiments, data port 3444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 3414 communicate with the data port by exchanging messages via a data distribution interconnect that couples each of the sub-systems of GPE 3410.

Figure 13:
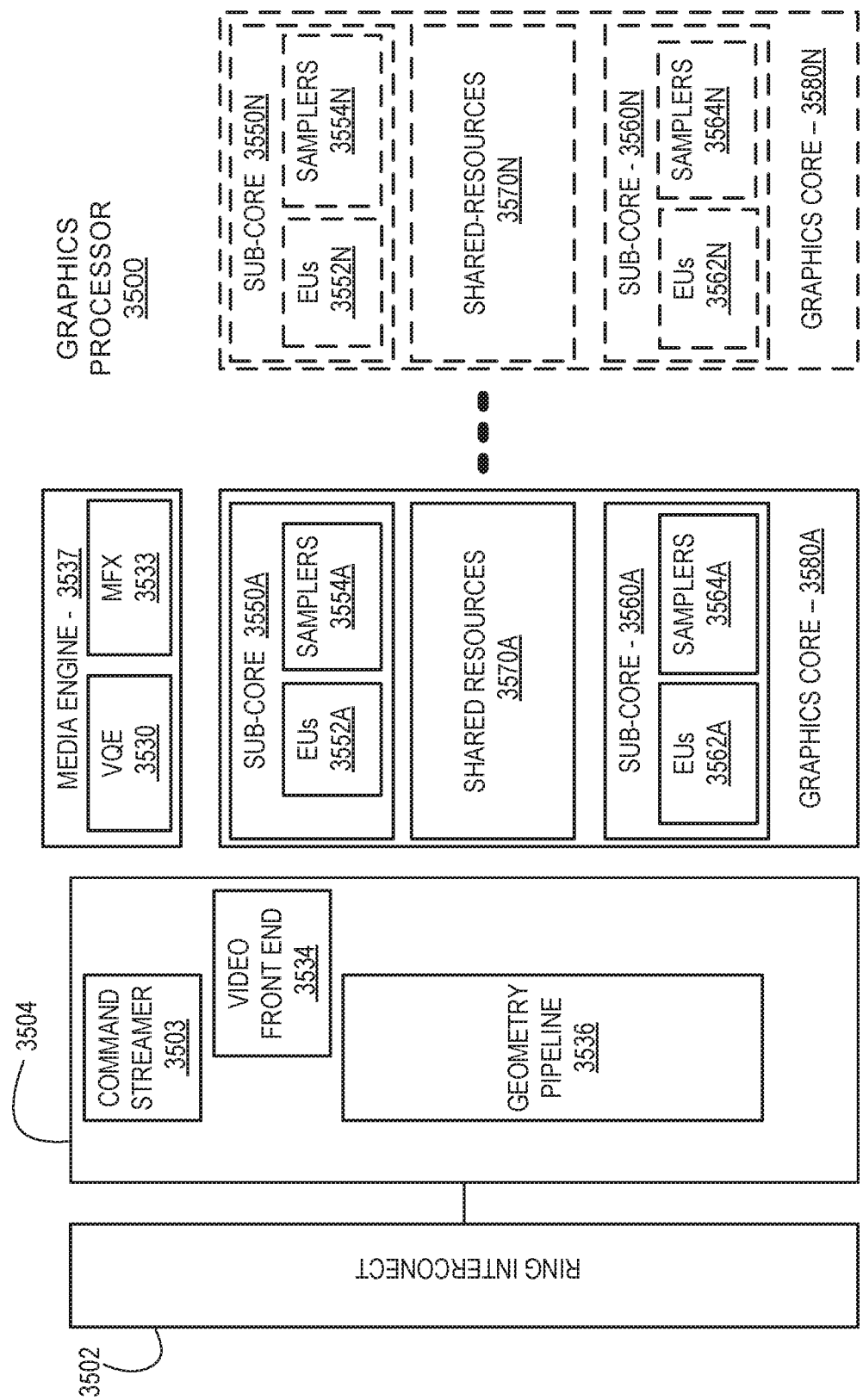
FIG. 13 illustrates a block diagram of a graphics processor, according to another embodiment.

FIG. 13 is a block diagram of another embodiment of a graphics processor 3500 to suppress redundant source operand reads and replicate read data. Elements of FIG. 13 having the same reference numbers (or names) as the elements of any other figure herein can operate or function in any manner similar to that described elsewhere herein, but are not limited to such.

In some embodiments, graphics processor 3500 includes a ring interconnect 3502, a pipeline front-end 3504, a media engine 3537, and graphics cores 3580A-3580N. In some embodiments, ring interconnect 3502 couples the graphics processor to other processing units, including other graphics processors or one or more general-purpose processor cores. In some embodiments, the graphics processor is one of many processors integrated within a multi-core processing system.

In some embodiments, graphics processor 3500 receives batches of commands via ring interconnect 3502. A command streamer 3503 in pipeline front-end 3504 may interpret the incoming commands. In some embodiments, graphics processor 3500 includes scalable execution logic to perform 3D geometry processing and media processing via the graphics core(s) 3580A-3580N. For 3D geometry processing commands, command streamer 3503 supplies commands to geometry pipeline 3536. For at least some media processing commands, command streamer 3503 supplies the commands to a video front end 3534, which couples with a media engine 3537. In some embodiments, media engine 3537 includes a Video Quality Engine (VQE) 3530 for video and image post-processing and a multi-format encode/decode (MFX) 3533 engine to provide hardware-accelerated media data encode and decode. In some embodiments, geometry pipeline 3536 and media engine 3537 each generate execution threads for the thread execution resources provided by at least one graphics core 3580A.

In some embodiments, graphics processor 3500 includes scalable thread execution resources featuring modular cores 3580A-3580N (sometimes referred to as core slices), each having multiple sub-cores 3550A-3550N, 3560A-3560N (sometimes referred to as core sub-slices). In some embodiments, graphics processor 3500 can have any number of graphics cores 3580A through 3580N. In some embodiments, graphics processor 3500 includes a graphics core 3580A having at least a first sub-core 3550A and a second core sub-core 3560A. In other embodiments, the graphics processor is a low power processor with a single sub-core (e.g., 3550A). In some embodiments, graphics processor 3500 includes multiple graphics cores 3580A-3580N, each including a set of first sub-cores 3550A-3550N and a set of second sub-cores 3560A-3560N. Each sub-core in the set of first sub-cores 3550A-3550N includes at least a first set of execution units 3552A-3552N and media/texture samplers 3554A-3554N. Each sub-core in the set of second sub-cores 3560A-3560N includes at least a second set of execution units 3562A-3562N and samplers 3564A-3564N. In some embodiments, each sub-core 3550A-3550N, 3560A-3560N shares a set of shared resources 3570A-3570N. In some embodiments, the shared resources include shared cache memory and pixel operation logic. Other shared resources may also be included in the various embodiments of the graphics processor.

Figure 14:
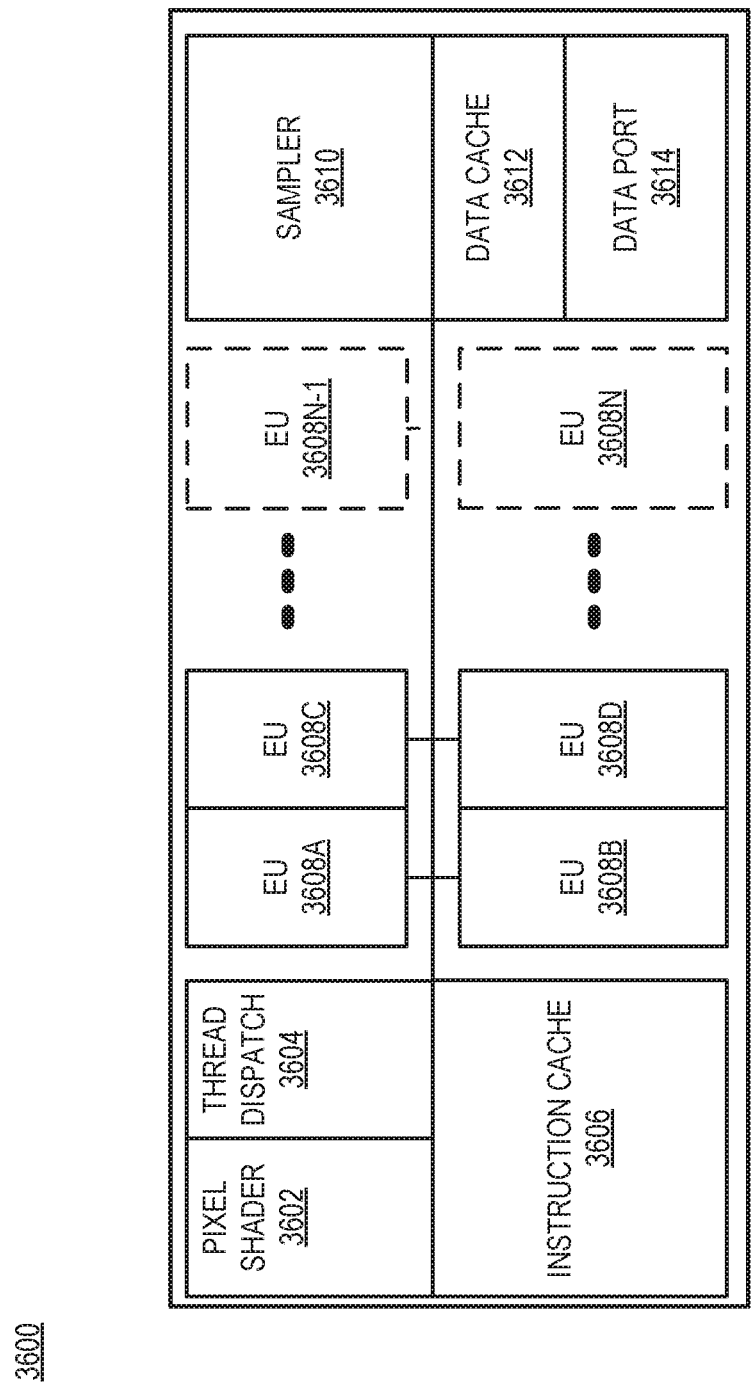
FIG. 14 illustrates thread execution logic, according to an embodiment.

FIG. 14 illustrates thread execution logic 3600 including an array of processing elements employed in some embodiments of a GPE. Elements of FIG. 14 having the same reference numbers (or names) as the elements of any other figure herein can operate or function in any manner similar to that described elsewhere herein, but are not limited to such.

In some embodiments, thread execution logic 3600 includes a pixel shader 3602, a thread dispatcher 3604, instruction cache 3606, a scalable execution unit array including a plurality of execution units 3608A-3608N, a sampler 3610, a data cache 3612, and a data port 3614. In one embodiment the included components are interconnected via an interconnect fabric that links to each of the components. In some embodiments, thread execution logic 3600 includes one or more connections to memory, such as system memory or cache memory, through one or more of instruction cache 3606, data port 3614, sampler 3610, and execution unit array 3608A-3608N. In some embodiments, each execution unit (e.g. 3608A) is an individual vector processor capable of executing multiple simultaneous threads and processing multiple data elements in parallel for each thread. In some embodiments, execution unit array 3608A-3608N includes any number individual execution units.

In some embodiments, execution unit array 3608A-3608N is primarily used to execute "shader" programs. In some embodiments, the execution units in array 3608A-3608N execute an instruction set that includes native support for many standard 3D graphics shader instructions, such that shader programs from graphics libraries (e.g., Direct 3D and OpenGL) are executed with minimal translation. The execution units may support vertex and geometry processing (e.g., vertex programs, geometry programs, vertex shaders), pixel processing (e.g., pixel shaders, fragment shaders) and general-purpose processing (e.g., compute, media, hull, and/or domain shaders).

Each execution unit in execution unit array 3608A-3608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 3606) are included in the thread execution logic 3600 to cache thread instructions for the execution units. In some embodiments, one or more data caches (e.g., 3612) are included to cache thread data during thread execution. In some embodiments, sampler 3610 is included to provide texture sampling for 3D operations and media sampling for media operations. In some embodiments, sampler 3610 includes specialized texture or media sampling functionality to process texture or media data during the sampling process before providing the sampled data to an execution unit.

During execution, the graphics and media pipelines send thread initiation requests to thread execution logic 3600 via thread spawning and dispatch logic. In some embodiments, thread execution logic 3600 includes a local thread dispatcher 3604 that arbitrates thread initiation requests from the graphics and media pipelines and instantiates the requested threads on one or more execution units 3608A-3608N. For example, the geometry pipeline (e.g., 3536 of FIG. 13) dispatches vertex processing, tessellation, or geometry processing threads to thread execution logic 3600 (FIG. 14). In some embodiments, thread dispatcher 3604 can also process runtime thread spawning requests from the executing shader programs.

Once a group of geometric objects has been processed and rasterized into pixel data, pixel shader 3602 is invoked to further compute output information and cause results to be written to output surfaces (e.g., color buffers, depth buffers, stencil buffers, etc.). In some embodiments, pixel shader 3602 calculates the values of the various vertex attributes that are to be interpolated across the rasterized object. In some embodiments, pixel shader 3602 then executes an application programming interface (API)-supplied pixel shader program. To execute the pixel shader program, pixel shader 3602 dispatches threads to an execution unit (e.g., 3608A) via thread dispatcher 3604. In some embodiments, pixel shader 3602 uses texture sampling logic in sampler 3610 to access texture data in texture maps stored in memory. Arithmetic operations on the texture data and the input geometry data compute pixel color data for each geometric fragment, or discards one or more pixels from further processing.

In some embodiments, the data port 3614 provides a memory access mechanism for the thread execution logic 3600 output processed data to memory for processing on a graphics processor output pipeline. In some embodiments, the data port 3614 includes or couples to one or more cache memories (e.g., data cache 3612) to cache data for memory access via the data port.

Figure 15:
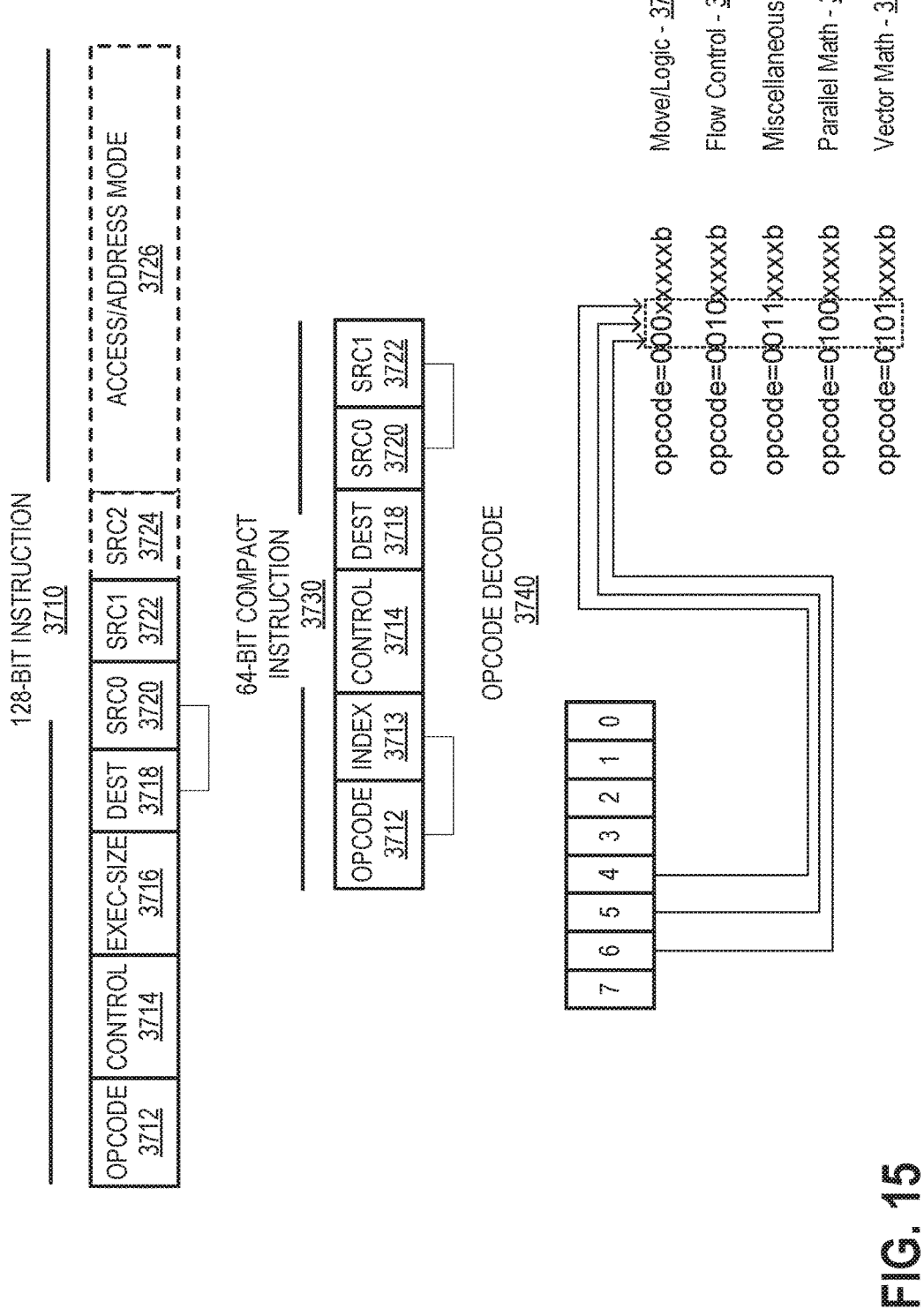
FIG. 15 illustrates a block diagram of graphics processor instruction formats, according to an embodiment.

FIG. 15 is a block diagram illustrating a graphics processor instruction formats 3700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 3700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 3710. A 64-bit compacted instruction format 3730 is available for some instructions based on the selected instruction, instruction options, and number of operands. The native 128-bit format 3710 provides access to all instruction options, while some options and operations are restricted in the 64-bit format 3730. The native instructions available in the 64-bit format 3730 vary by embodiment. In some embodiments, the instruction is compacted in part using a set of index values in an index field 3713. The execution unit hardware references a set of compaction tables based on the index values and uses the compaction table outputs to reconstruct a native instruction in the 128-bit format 3710. For each format, instruction opcode 3712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 3714 enables control over certain execution options, such as channels selection (e.g., predication) and data channel order (e.g., swizzle). For 128-bit instructions 3710 an exec-size field 3716 limits the number of data channels that will be executed in parallel. In some embodiments, exec-size field 3716 is not available for use in the 64-bit compact instruction format 3730.

Some execution unit instructions have up to three operands including two source operands, SRC0 3722, SRC1 3722, and one destination 3718. In some embodiments, the execution units support dual destination instructions, where one of the destinations is implied. Data manipulation instructions can have a third source operand (e.g., SRC2 3724), where the instruction opcode 3712 determines the number of source operands. An instruction's last source operand can be an immediate (e.g., hard-coded) value passed with the instruction.

In some embodiments, the 128-bit instruction format 3710 includes an access/address mode information 3726 specifying, for example, whether direct register addressing mode or indirect register addressing mode is used. When direct register addressing mode is used, bits in the instruction 3710 directly provide the register address of one or more operands.

In some embodiments, the 128-bit instruction format 3710 includes an access/address mode field 3726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 3710 may use 16-byte-aligned addressing for all source and destination operands.

In one embodiment, the address mode portion of the access/address mode field 3726 determines whether the instruction is to use direct or indirect addressing. When direct register addressing mode is used bits in the instruction 3710 directly provide the register address of one or more operands. When indirect register addressing mode is used, the register address of one or more operands may be computed based on an address register value and an address immediate field in the instruction.

In some embodiments instructions are grouped based on opcode 3712 bit-fields to simplify Opcode decode 3740. For an 8-bit opcode, bits 4, 5, and 6 allow the execution unit to determine the type of opcode. The precise opcode grouping shown is merely an example. In some embodiments, a move and logic opcode group 3742 includes data movement and logic instructions (e.g., move (mov), compare (cmp)). In some embodiments, move and logic group 3742 shares the five most significant bits (MSB), where move (mov) instructions are in the form of 0000xxxxb and logic instructions are in the form of 0001xxxxb. A flow control instruction group 3744 (e.g., call, jump (jmp)) includes instructions in the form of 0010xxxxb (e.g., 0x20). A miscellaneous instruction group 3746 includes a mix of instructions, including synchronization instructions (e.g., wait, send) in the form of 0011xxxxb (e.g., 0x30). A parallel math instruction group 3748 includes component-wise arithmetic instructions (e.g., add, multiply (mul)) in the form of 0100xxxxb (e.g., 0x40). The parallel math group 3748 performs the arithmetic operations in parallel across data channels. The vector math group 3750 includes arithmetic instructions (e.g., dp4) in the form of 0101xxxxb (e.g., 0x50). The vector math group performs arithmetic such as dot product calculations on vector operands.

Figure 16:
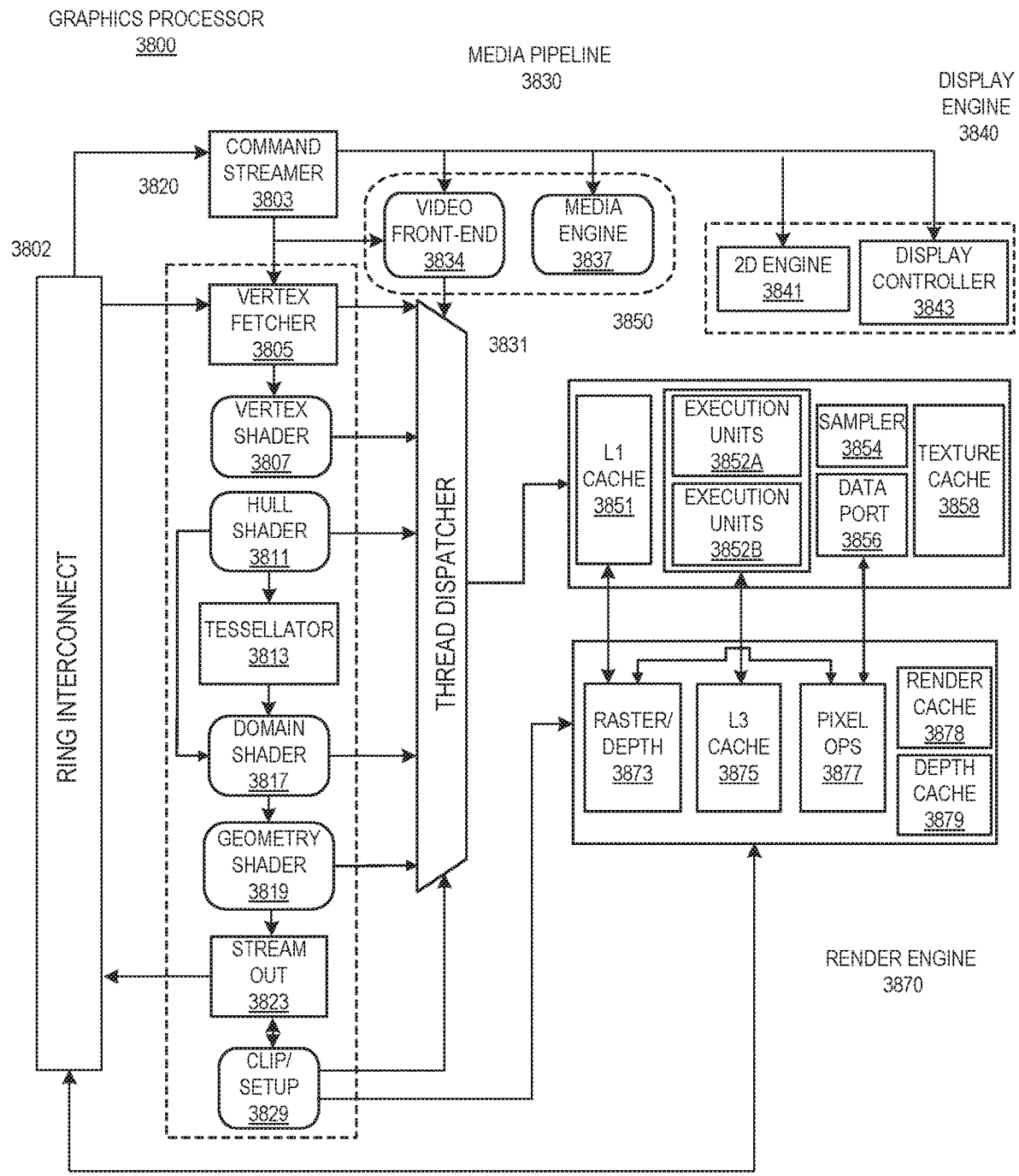
FIG. 16 illustrates a block diagram of a graphics processor, according to another embodiment.

FIG. 16 is a block diagram of another embodiment of a graphics processor 3800. Elements of FIG. 16 having the same reference numbers (or names) as the elements of any other figure herein can operate or function in any manner similar to that described elsewhere herein, but are not limited to such.

In some embodiments, graphics processor 3800 includes a graphics pipeline 3820, a media pipeline 3830, a display engine 3840, thread execution logic 3850, and a render output pipeline 3870. In some embodiments, graphics processor 3800 is a graphics processor within a multi-core processing system that includes one or more general purpose processing cores. The graphics processor is controlled by register writes to one or more control registers (not shown) or via commands issued to graphics processor 3800 via a ring interconnect 3802. In some embodiments, ring interconnect 3802 couples graphics processor 3800 to other processing components, such as other graphics processors or general-purpose processors. Commands from ring interconnect 3802 are interpreted by a command streamer 3803, which supplies instructions to individual components of graphics pipeline 3820 or media pipeline 3830.

In some embodiments, command streamer 3803 directs the operation of a vertex fetcher 3805 that reads vertex data from memory and executes vertex-processing commands provided by command streamer 3803. In some embodiments, vertex fetcher 3805 provides vertex data to a vertex shader 3807, which performs coordinate space transformation and lighting operations to each vertex. In some embodiments, vertex fetcher 3805 and vertex shader 3807 execute vertex-processing instructions by dispatching execution threads to execution units 3852A, 3852B via a thread dispatcher 3831.

In some embodiments, execution units 3852A, 3852B are an array of vector processors having an instruction set for performing graphics and media operations. In some embodiments, execution units 3852A, 3852B have an attached L1 cache 3851 that is specific for each array or shared between the arrays. The cache can be configured as a data cache, an instruction cache, or a single cache that is partitioned to contain data and instructions in different partitions.

In some embodiments, graphics pipeline 3820 includes tessellation components to perform hardware-accelerated tessellation of 3D objects. In some embodiments, a programmable hull shader 3811 configures the tessellation operations. A programmable domain shader 3817 provides back-end evaluation of tessellation output. A tessellator 3813 operates at the direction of hull shader 3811 and contains special purpose logic to generate a set of detailed geometric objects based on a coarse geometric model that is provided as input to graphics pipeline 3820. In some embodiments, if tessellation is not used, tessellation components 3811, 3813, and 3817 can be bypassed.

In some embodiments, complete geometric objects can be processed by a geometry shader 3819 via one or more threads dispatched to execution units 3852A, 3852B, or can proceed directly to the clipper 3829. In some embodiments, the geometry shader operates on entire geometric objects, rather than vertices or patches of vertices as in previous stages of the graphics pipeline. If the tessellation is disabled the geometry shader 3819 receives input from the vertex shader 3807. In some embodiments, geometry shader 3819 is programmable by a geometry shader program to perform geometry tessellation if the tessellation units are disabled.

Before rasterization, a clipper 3829 processes vertex data. The clipper 3829 may be a fixed function clipper or a programmable clipper having clipping and geometry shader functions. In some embodiments, a rasterizer and depth test component 3873 in the render output pipeline 3870 dispatches pixel shaders to convert the geometric objects into their per pixel representations. In some embodiments, pixel shader logic is included in thread execution logic 3850. In some embodiments, an application can bypass the rasterizer and depth test component 3873 and access un-rasterized vertex data via a stream out unit 3823.

The graphics processor 3800 has an interconnect bus, interconnect fabric, or some other interconnect mechanism that allows data and message passing amongst the major components of the processor. In some embodiments, execution units 3852A, 3852B and associated cache(s) 3851, texture and media sampler 3854, and texture/sampler cache 3858 interconnect via a data port 3856 to perform memory access and communicate with render output pipeline components of the processor. In some embodiments, sampler 3854, caches 3851, 3858 and execution units 3852A, 3852B each have separate memory access paths.

In some embodiments, render output pipeline 3870 contains a rasterizer and depth test component 3873 that converts vertex-based objects into an associated pixel-based representation. In some embodiments, the rasterizer logic includes a windower/masker unit to perform fixed function triangle and line rasterization. An associated render cache 3878 and depth cache 3879 are also available in some embodiments. A pixel operations component 3877 performs pixel-based operations on the data, though in some instances, pixel operations associated with 2D operations (e.g. bit block image transfers with blending) are performed by the 2D engine 3841, or substituted at display time by the display controller 3843 using overlay display planes. In some embodiments, a shared L3 cache 3875 is available to all graphics components, allowing the sharing of data without the use of main system memory.

In some embodiments, graphics processor media pipeline 3830 includes a media engine 3837 and a video front end 3834. In some embodiments, video front end 3834 receives pipeline commands from the command streamer 3803. In some embodiments, media pipeline 3830 includes a separate command streamer. In some embodiments, video front-end 3834 processes media commands before sending the command to the media engine 3837. In some embodiments, media engine 3837 includes thread spawning functionality to spawn threads for dispatch to thread execution logic 3850 via thread dispatcher 3831.

In some embodiments, graphics processor 3800 includes a display engine 3840. In some embodiments, display engine 3840 is external to processor 3800 and couples with the graphics processor via the ring interconnect 3802, or some other interconnect bus or fabric. In some embodiments, display engine 3840 includes a 2D engine 3841 and a display controller 3843. In some embodiments, display engine 3840 contains special purpose logic capable of operating independently of the 3D pipeline. In some embodiments, display controller 3843 couples with a display device (not shown), which may be a system integrated display device, as in a laptop computer, or an external display device attached via a display device connector.

In some embodiments, graphics pipeline 3820 and media pipeline 3830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

FIG. 17A is a block diagram illustrating a graphics processor command format 3900 according to some embodiments. FIG. 17B is a block diagram illustrating a graphics processor command sequence 3910 according to an embodiment. The solid lined boxes in FIG. 17A illustrate the components that are generally included in a graphics command while the dashed lines include components that are optional or that are only included in a sub-set of the graphics commands. The exemplary graphics processor command format 3900 of FIG. 17A includes data fields to identify a target client 3902 of the command, a command operation code (opcode) 3904, and the relevant data 3906 for the command. A sub-opcode 3905 and a command size 3908 are also included in some commands.

In some embodiments, client 3902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 3904 and, if present, sub-opcode 3905 to determine the operation to perform. The client unit performs the command using information in data field 3906. For some commands an explicit command size 3908 is expected to specify the size of the command. In some embodiments, the command parser automatically determines the size of at least some of the commands based on the command opcode. In some embodiments commands are aligned via multiples of a double word.

The flow diagram in FIG. 17B shows an exemplary graphics processor command sequence 3910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 3910 may begin with a pipeline flush command 3912 to cause any active graphics pipeline to complete the currently pending commands for the pipeline. In some embodiments, the 3D pipeline 3922 and the media pipeline 3924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 3912 can be used for pipeline synchronization or before placing the graphics processor into a low power state.

In some embodiments, a pipeline select command 3913 is used when a command sequence requires the graphics processor to explicitly switch between pipelines. In some embodiments, a pipeline select command 3913 is required only once within an execution context before issuing pipeline commands unless the context is to issue commands for both pipelines. In some embodiments, a pipeline flush command is 3912 is required immediately before a pipeline switch via the pipeline select command 3913.

In some embodiments, a pipeline control command 3914 configures a graphics pipeline for operation and is used to program the 3D pipeline 3922 and the media pipeline 3924. In some embodiments, pipeline control command 3914 configures the pipeline state for the active pipeline. In one embodiment, the pipeline control command 3914 is used for pipeline synchronization and to clear data from one or more cache memories within the active pipeline before processing a batch of commands.

In some embodiments, return buffer state commands 3916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 3916 includes selecting the size and number of return buffers to use for a set of pipeline operations.

The remaining commands in the command sequence differ based on the active pipeline for operations. Based on a pipeline determination 3920, the command sequence is tailored to the 3D pipeline 3922 beginning with the 3D pipeline state 3930, or the media pipeline 3924 beginning at the media pipeline state 3940.

The commands for the 3D pipeline state 3930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 3930 commands are also able to selectively disable or bypass certain pipeline elements if those elements will not be used.

In some embodiments, 3D primitive 3932 command is used to submit 3D primitives to be processed by the 3D pipeline. Commands and associated parameters that are passed to the graphics processor via the 3D primitive 3932 command are forwarded to the vertex fetch function in the graphics pipeline. The vertex fetch function uses the 3D primitive 3932 command data to generate vertex data structures. The vertex data structures are stored in one or more return buffers. In some embodiments, 3D primitive 3932 command is used to perform vertex operations on 3D primitives via vertex shaders. To process vertex shaders, 3D pipeline 3922 dispatches shader execution threads to graphics processor execution units.

In some embodiments, 3D pipeline 3922 is triggered via an execute 3934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 3910 follows the media pipeline 3924 path when performing media operations. In general, the specific use and manner of programming for the media pipeline 3924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 3924 is configured in a similar manner as the 3D pipeline 3922. A set of media pipeline state commands 3940 are dispatched or placed into in a command queue before the media object commands 3942. In some embodiments, media pipeline state commands 3940 include data to configure the media pipeline elements that will be used to process the media objects. This includes data to configure the video decode and video encode logic within the media pipeline, such as encode or decode format. In some embodiments, media pipeline state commands 3940 also support the use one or more pointers to "indirect" state elements that contain a batch of state settings.

In some embodiments, media object commands 3942 supply pointers to media objects for processing by the media pipeline. The media objects include memory buffers containing video data to be processed. In some embodiments, all media pipeline states must be valid before issuing a media object command 3942. Once the pipeline state is configured and media object commands 3942 are queued, the media pipeline 3924 is triggered via an execute command 944 or an equivalent execute event (e.g., register write). Output from media pipeline 3924 may then be post processed by operations provided by the 3D pipeline 3922 or the media pipeline 3924. In some embodiments, GPGPU operations are configured and executed in a similar manner as media operations.

FIG. 18 illustrates exemplary graphics software architecture for a data processing system 4000 according to some embodiments. In some embodiments, software architecture includes a 3D graphics application 4010, an operating system 4020, and at least one processor 4030. In some embodiments, processor 4030 includes a graphics processor 4032 and one or more general-purpose processor core(s) 4034. The graphics application 4010 and operating system 1020 each execute in the system memory 4050 of the data processing system.

In some embodiments, 3D graphics application 4010 contains one or more shader programs including shader instructions 4012. The shader language instructions may be in a high-level shader language, such as the High Level Shader Language (HLSL) or the OpenGL Shader Language (GLSL). The application also includes executable instructions 4014 in a machine language suitable for execution by the general-purpose processor core 4034. The application also includes graphics objects 4016 defined by vertex data.

In some embodiments, operating system 4020 is a Microsoft® Windows® operating system from the Microsoft Corporation, a proprietary UNIX-like operating system, or an open source UNIX-like operating system using a variant of the Linux kernel. When the Direct3D API is in use, the operating system 4020 uses a front-end shader compiler 4024 to compile any shader instructions 4012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 4010.

In some embodiments, user mode graphics driver 4026 contains a back-end shader compiler 1027 to convert the shader instructions 4012 into a hardware specific representation. When the OpenGL API is in use, shader instructions 4012 in the GLSL high-level language are passed to a user mode graphics driver 4026 for compilation. In some embodiments, user mode graphics driver 4026 uses operating system kernel mode functions 4028 to communicate with a kernel mode graphics driver 4029. In some embodiments, kernel mode graphics driver 4029 communicates with graphics processor 4032 to dispatch commands and instructions.

One or more aspects of at least one embodiment may be implemented by representative code stored on a machine-readable medium, which represents and/or defines logic within an integrated circuit such as a processor. For example, the machine-readable medium may include instructions, which represent logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 19:
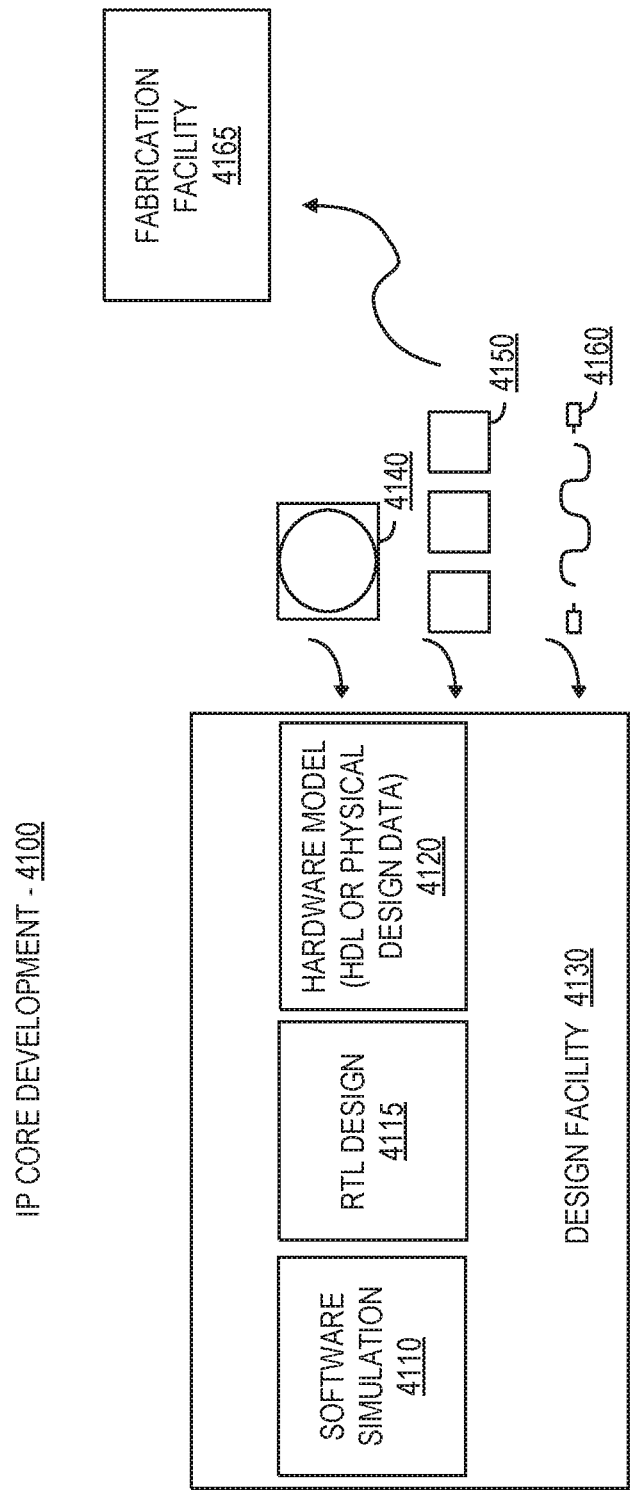
FIG. 19 illustrates a block diagram of an IP core development system, according to an embodiment.

FIG. 19 is a block diagram illustrating an IP core development system 4100 that may be used to manufacture an integrated circuit to perform operations according to an embodiment. The IP core development system 4100 may be used to generate modular, re-usable designs that can be incorporated into a larger design or used to construct an entire integrated circuit (e.g., an SOC integrated circuit). A design facility 4130 can generate a software simulation 4110 of an IP core design in a high level programming language (e.g., C/C++). The software simulation 4110 can be used to design, test, and verify the behavior of the IP core. A register transfer level (RTL) design can then be created or synthesized from the simulation model 4100. The RTL design 4115 is an abstraction of the behavior of the integrated circuit that models the flow of digital signals between hardware registers, including the associated logic performed using the modeled digital signals. In addition to an RTL design 4115, lower-level designs at the logic level or transistor level may also be created, designed, or synthesized. Thus, the particular details of the initial design and simulation may vary.

The RTL design 4115 or equivalent may be further synthesized by the design facility into a hardware model 4120, which may be in a hardware description language (HDL), or some other representation of physical design data. The HDL may be further simulated or tested to verify the IP core design. The IP core design can be stored for delivery to a $3^{rd}$ party fabrication facility 4165 using non-volatile memory 4140 (e.g., hard disk, flash memory, or any non-volatile storage medium). Alternatively, the IP core design may be transmitted (e.g., via the Internet) over a wired connection 4150 or wireless connection 4160. The fabrication facility 4165 may then fabricate an integrated circuit that is based at least in part on the IP core design. The fabricated integrated circuit can be configured to perform operations in accordance with at least one embodiment described herein.

Figure 20:
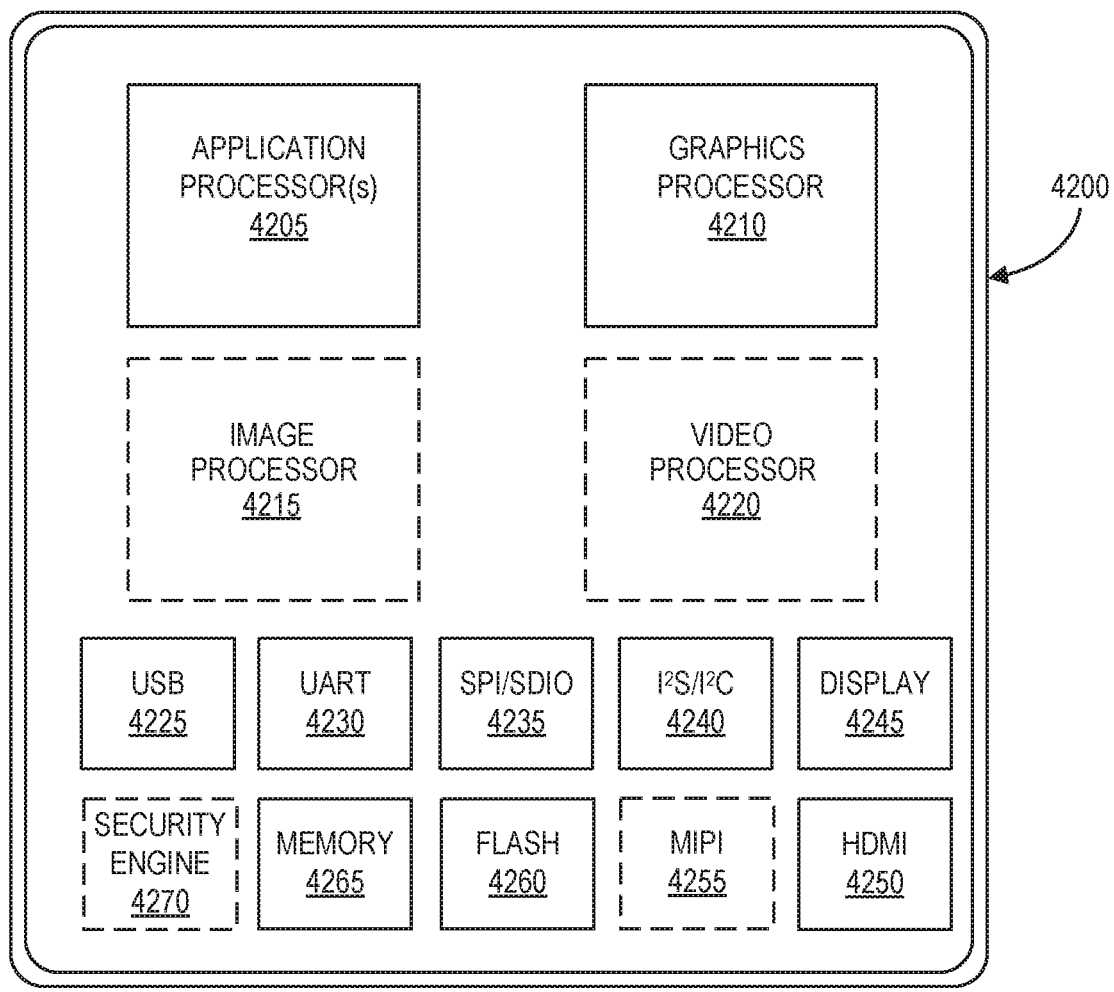
FIG. 20 illustrates a block diagram of a system-on-a-chip (SoC) integrated circuit, according to an embodiment.

FIG. 20 is a block diagram illustrating an exemplary system on a chip integrated circuit 4200 that may be fabricated using one or more IP cores, according to an embodiment. The exemplary integrated circuit includes one or more application processors 4205 (e.g., CPUs), at least one graphics processor 4210, and may additionally include an image processor 4215 and/or a video processor 4220, any of which may be a modular IP core from the same or multiple different design facilities. The integrated circuit includes peripheral or bus logic including a USB controller 4225, UART controller 4230, an SPI/SDIO controller 4235, and an $I^2S/I^2C$ controller 4240. Additionally, the integrated circuit can include a display device 4245 coupled to one or more of a high-definition multimedia interface (HDMI) controller 4250 and a mobile industry processor interface (MIPI) display interface 4255. Storage may be provided by a flash memory subsystem 4260 including flash memory and a flash memory controller. Memory interface may be provided via a memory controller 4265 for access to SDRAM or SRAM memory devices. Some integrated circuits additionally include an embedded security engine 4270.

Additionally, other logic and circuits may be included in the processor of integrated circuit 4200, including additional graphics processors/cores, peripheral interface controllers, or general purpose processor cores.

More generally, the various elements of the devices described and depicted herein may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a processor circuit; a simultaneous location and mapping (SLAM) candidate component to identify a first candidate key frame that matches a current captured frame to at least a first degree from an interval-based key frame set, the current captured frame captured by a camera of a mobile device of surroundings within a defined area, and the interval-based key frame set comprising key frames selected based on a recurring interval from multiple earlier captured frames captured by the camera during generation of a map of the defined area; a convolution neural network (CNN) candidate component to identify a second candidate key frame that matches the current captured frame to at least a second degree from a difference-based key frame set, each key frame of the difference-based key frame set selected from the multiple earlier captured frames based on a degree of difference from all other key frames already included in the difference-based key frame set; and a position estimation component to determine a current location of the mobile device on the map from estimates of differences between the current location and locations of the first and second candidate key frames on the map.

In Example 2, which includes the subject matter of Example 1, the apparatus may include a SLAM selection component to select each of the key frames of the interval-based key frame set from the multiple earlier captured frames based on the recurring interval, the recurring interval comprising at least one of an interval of time that recurringly elapses as the mobile device is moved about the defined area to generate the map, an interval of distance traveled by the mobile device as the mobile device is moved about the defined area to generate the map, or an interval quantity of the earlier captured frames captured by the camera as the mobile device is moved about the defined area to generate the map.

In Example 3, which includes the subject matter of any of Examples 1-2, the apparatus may include a CNN selection component to select each of the key frames of the difference-based key frame set from the multiple earlier captured frames based on the degree of difference from all other key frames already included in the difference-based key frame set.

In Example 4, which includes the subject matter of any of Examples 1-3, the CNN selection component may include a CNN engine to generate, for each earlier captured frame of the multiple earlier captured frames, a code value indicative of which of multiple predetermined visual features are present within the earlier captured frame. The CNN engine may include multiple convolution layers, each convolution layer of the multiple convolution layers to implement multiple instances of a filter operated at least partly in parallel, each instance of the filter to determine whether a predetermined visual feature of the multiple predetermined visual features is present within each of multiple overlapping locations of multiple pixels within one of the earlier captured frames; and multiple pool layers interspersed among the multiple convolution layers, each pool layer of the multiple pool layers to implement multiple instances of subsampling of indications generated by different ones of the multiple instances of the filter of a corresponding convolution layer of whether a predetermined visual feature of the multiple predetermined visual features is present within the one of the earlier captured frames.

In Example 5, which includes the subject matter of any of Examples 1-4, the CNN selection component may include a first comparator component to determine whether to select an earlier captured frame to include in the difference-based key frame set based on a comparison of the code value of the earlier captured frame to all of the code values generated by the CNN engine for all of the key frames already included in the difference-based key frame set.

In Example 6, which includes the subject matter of any of Examples 1-5, the CNN engine may generate a code value indicative of which of multiple predetermined visual features are present within the current captured frame, and the apparatus may include a second comparator component to identify the second candidate key frame based on a comparison of the code value of the current captured frame to all of the code values generated by the CNN engine for all of the key frames included in the difference-based key frame set.

In Example 7, which includes the subject matter of any of Examples 1-6, the apparatus may include a generation component to correlate each key frame of the interval-based key frame set and each key frame of the difference based key frame set to a corresponding location along a corresponding pathway of the map.

In Example 8, which includes the subject matter of any of Examples 1-7, the generation component may correlate at least one location correlated to a key frame of at least one of the interval-based key frame set or the difference-based key frame set on the map to a physical location within the defined area based on captured location data received from at least one location sensor of the mobile device, the at least one location sensor comprising at least one of a receiver of signals from multiple satellites, a receiver of signals from multiple wireless access points associated with the defined area, a gyroscope, an accelerometer, an odometer, a proximity detector, a barcode reader to read a barcode within the defined area, or a radio frequency identification (RFID) tag within the defined area.

In Example 9, which includes the subject matter of any of Examples 1-8, the generation component may augment the map with an indication of a closure of a loop of a pathway of the map in response to at least one of the identification of the first candidate key frame among the interval-based key frame set by the SLAM candidate component or the identification of the second candidate key frame among the difference-based key frame set by the CNN candidate component.

In Example 10, which includes the subject matter of any of Examples 1-9, the generation component may augment the map with an indication of a new location along a pathway of the map correlated to a location of a next captured frame in response to a lack of identification of a candidate key frame that matches the next captured frame among the interval-based key frame set by the SLAM candidate component and a lack of identification of a candidate key frame that matches the next captured frame among the difference-based key frame set by the CNN candidate component.

In Example 11, which includes the subject matter of any of Examples 1-10, the defined area may include at least one of a room, a floor of a building, a campus comprising multiple buildings, or a predetermined geographic region.

In Example 12, which includes the subject matter of any of Examples 1-11, the apparatus may include the mobile device, the mobile device comprising at least one motor to enable the mobile device to be self-propelled about the defined area to generate the map.

In Example 13, a computing-implemented method includes identifying, by a processor circuit, a first candidate key frame that matches a current captured frame to at least a first degree from an interval-based key frame set, the current captured frame captured by a camera of a mobile device of surroundings within a defined area, and the interval-based key frame set comprising key frames selected based on a recurring interval from multiple earlier captured frames captured by the camera during generation of a map of the defined area; identifying a second candidate key frame that matches the current captured frame to at least a second degree from a difference-based key frame set, each key frame of the difference-based key frame set selected from the multiple earlier captured frames based on a degree of difference from all other key frames already included in the difference-based key frame set; and determining, by the processor circuit, a current location of the mobile device on the map from estimates of differences between the current location and locations of the first and second candidate key frames on the map.

In Example 14, which includes the subject matter of Example 13, the method may include selecting, by the processor circuit, each of the key frames of the interval-based key frame set from the multiple earlier captured frames based on the recurring interval, the recurring interval comprising at least one of an interval of time that recurringly elapses as the mobile device is moved about the defined area to generate the map, an interval of distance traveled by the mobile device as the mobile device is moved about the defined area to generate the map, or an interval quantity of the earlier captured frames captured by the camera as the mobile device is moved about the defined area to generate the map.

In Example 15, which includes the subject matter of any of Examples 13-14, the method may include selecting each of the key frames of the difference-based key frame set from the multiple earlier captured frames based on the degree of difference from all other key frames already included in the difference-based key frame set.

In Example 16, which includes the subject matter of any of Examples 13-15, the method may include generating, for each earlier captured frame of the multiple earlier captured frames, a code value indicative of which of multiple predetermined visual features are present within the earlier captured frame by operating a convolution neural network (CNN) engine. The CNN engine may include multiple convolution layers, each convolution layer of the multiple convolution layers to implement multiple instances of a filter operated at least partly in parallel, each instance of the filter to determine whether a predetermined visual feature of the multiple predetermined visual features is present within each of multiple overlapping locations of multiple pixels within one of the earlier captured frames; and multiple pool layers interspersed among the multiple convolution layers, each pool layer of the multiple pool layers to implement multiple instances of subsampling of indications generated by different ones of the multiple instances of the filter of a corresponding convolution layer of whether a predetermined visual feature of the multiple predetermined visual features is present within the one of the earlier captured frames.

In Example 17, which includes the subject matter of any of Examples 13-16, the CNN engine may be implemented with hardware-based digital logic coupled to the processor circuit.

In Example 18, which includes the subject matter of any of Examples 13-17, the method may include determining whether to select an earlier captured frame to include in the difference-based key frame set based on a comparison of the code value of the earlier captured frame to all of the code values generated using the CNN engine for all of the key frames already included in the difference-based key frame set.

In Example 19, which includes the subject matter of any of Examples 13-18, the method may include generating a code value indicative of which of multiple predetermined visual features are present within the current captured frame, and identifying the second candidate key frame based on a comparison of the code value of the current captured frame to all of the code values generated using the CNN engine for all of the key frames included in the difference-based key frame set.

In Example 20, which includes the subject matter of any of Examples 13-19, the method may include correlating each key frame of the interval-based key frame set and each key frame of the difference based key frame set to a corresponding location along a corresponding pathway of the map.

In Example 21, which includes the subject matter of any of Examples 13-20, the method may include receiving, from at least one location sensor of the mobile device, captured location data, the captured location data comprising at least one of an indication of signals received from multiple positioning satellites, an indication of triangulation of signals received from multiple wireless access points associated with the defined area, an indication of a change in direction captured by a gyroscope, an indication of a change in velocity captured by an accelerometer, an indication of distance traveled captured by an odometer, an indication of a distance to an object associated with the defined area captured by a proximity detector, an indication of a barcode read within the defined area by a barcode reader, or an indication of a radio frequency identification (RFID) tag read by a RFID reader within the defined area; and correlating at least one location correlated to a key frame of at least one of the interval-based key frame set or the difference-based key frame set on the map to a physical location within the defined area based on captured location data.

In Example 22, which includes the subject matter of any of Examples 13-21, the method may include augmenting the map with an indication of a closure of a loop of a pathway of the map in response to at least one of the identification of the first candidate key frame among the interval-based key frame set or the identification of the second candidate key frame among the difference-based key frame set.

In Example 23, which includes the subject matter of any of Examples 13-22, the method may include augmenting the map with an indication of a new location along a pathway of the map correlated to a location of a another captured frame in response to a lack of identification of a candidate key frame that matches the next captured frame among the interval-based key frame set and a lack of identification of a candidate key frame that matches the next captured frame among the difference-based key frame set.

In Example 24, which includes the subject matter of any of Examples 13-23, the defined area comprising at least one of a room, a floor of a building, a campus comprising multiple buildings, or a predetermined geographic region.

In Example 25, at least one tangible machine-readable storage medium includes instructions that when executed by a processor circuit, may cause the processor circuit to identify a first candidate key frame that matches a current captured frame to at least a first degree from an interval-based key frame set, the current captured frame captured by a camera of a mobile device of surroundings within a defined area, and the interval-based key frame set comprising key frames selected based on a recurring interval from multiple earlier captured frames captured by the camera during generation of a map of the defined area; identify a second candidate key frame that matches the current captured frame to at least a second degree from a difference-based key frame set, each key frame of the difference-based key frame set selected from the multiple earlier captured frames based on a degree of difference from all other key frames already included in the difference-based key frame set; and determine a current location of the mobile device on the map from estimates of differences between the current location and locations of the first and second candidate key frames on the map.

In Example 26, which includes the subject matter of Example 25, the processor circuit may be coupled to a convolution neural network (CNN) engine implemented with hardware-based logic, and the processor circuit to operate the CNN engine to identify the second candidate.

In Example 27, which includes the subject matter of any of Examples 25-26, the processor circuit may be caused to select each of the key frames of the interval-based key frame set from the multiple earlier captured frames based on the recurring interval, the recurring interval comprising at least one of an interval of time that recurringly elapses as the mobile device is moved about the defined area to generate the map, an interval of distance traveled by the mobile device as the mobile device is moved about the defined area to generate the map, or an interval quantity of the earlier captured frames captured by the camera as the mobile device is moved about the defined area to generate the map.

In Example 28, which includes the subject matter of any of Examples 25-27, the processor circuit may be caused to select each of the key frames of the difference-based key frame set from the multiple earlier captured frames based on the degree of difference from all other key frames already included in the difference-based key frame set.

In Example 29, which includes the subject matter of any of Examples 25-28, the processor circuit may be caused to generate for each earlier captured frame of the multiple earlier captured frames, a code value indicative of which of multiple predetermined visual features are present within the earlier captured frame by using a convolution neural network (CNN) engine. The CNN may include multiple convolution layers, each convolution layer of the multiple convolution layers to implement multiple instances of a filter operated at least partly in parallel, each instance of the filter to determine whether a predetermined visual feature of the multiple predetermined visual features is present within each of multiple overlapping locations of multiple pixels within one of the earlier captured frames; and multiple pool layers interspersed among the multiple convolution layers, each pool layer of the multiple pool layers to implement multiple instances of subsampling of indications generated by different ones of multiple instances of the filter of a corresponding convolution layer of whether a predetermined visual feature of the multiple predetermined visual features is present within the one of the earlier captured frames.

In Example 30, which includes the subject matter of any of Examples 25-29, the processor circuit may be caused to determine whether to select an earlier captured frame to include in the difference-based key frame set based on a comparison of the code value of the earlier captured frame to all of the code values generated using the CNN engine for all of the key frames already included in the difference-based key frame set.

In Example 31, which includes the subject matter of any of Examples 25-30, the processor circuit may be caused to generate a code value indicative of which of multiple predetermined visual features are present within the current captured frame, and identify the second candidate key frame based on a comparison of the code value of the current captured frame to all of the code values generated using the CNN engine for all of the key frames included in the difference-based key frame set.

In Example 32, which includes the subject matter of any of Examples 25-31, the processor circuit may be caused to correlate each key frame of the interval-based key frame set and each key frame of the difference based key frame set to a corresponding location along a corresponding pathway of the map.

In Example 33, which includes the subject matter of any of Examples 25-26, the processor circuit may be caused to receive, from at least one location sensor of the mobile device, captured location data, the captured location data comprising at least one of an indication of signals received from multiple positioning satellites, an indication of triangulation of signals received from multiple wireless access points associated with the defined area, an indication of a change in direction captured by a gyroscope, an indication of a change in velocity captured by an accelerometer, an indication of distance traveled captured by an odometer, an indication of a distance to an object associated with the defined area captured by a proximity detector, an indication of a barcode read within the defined area by a barcode reader, or an indication of a radio frequency identification (RFID) tag read by a RFID reader within the defined area; and correlate at least one location correlated to a key frame of at least one of the interval-based key frame set or the difference-based key frame set on the map to a physical location within the defined area based on captured location data.

In Example 34, which includes the subject matter of any of Examples 25-26, the processor circuit may be caused to augment the map with an indication of a closure of a loop of a pathway of the map in response to at least one of the identification of the first candidate key frame among the interval-based key frame set or the identification of the second candidate key frame among the difference-based key frame set.

In Example 35, which includes the subject matter of any of Examples 25-34, the processor circuit may be caused to augment the map with an indication of a new location along a pathway of the map correlated to a location of a another captured frame in response to a lack of identification of a candidate key frame that matches the next captured frame among the interval-based key frame set and a lack of identification of a candidate key frame that matches the next captured frame among the difference-based key frame set.

In Example 36, which includes the subject matter of any of Examples 25-35, the defined area may include at least one of a room, a floor of a building, a campus comprising multiple buildings, or a predetermined geographic region.

In Example 37, an apparatus includes a processor circuit; a simultaneous location and mapping (SLAM) selection component to select each key frame of a interval-based key frame set from multiple earlier captured frames based on a recurring interval, the key frames of the interval-based key frame set captured by a camera of a mobile device of surroundings within a defined area as the mobile device is moved about the defined area to generate a map of the defined area; a convolution neural network (CNN) selection component to select each of the key frames of a difference-based key frame set from the multiple earlier captured frames based on a degree of difference from all other key frames already included in the difference-based key frame set; and a generation component to correlate each key frame of the interval-based key frame set and each key frame of the difference-based key frame set to a corresponding location along a corresponding pathway of the map.

In Example 38, which includes the subject matter of Example 37, the CNN selection component may include a CNN engine to generate, for each earlier captured frame of the multiple earlier captured frames, a code value indicative of which of multiple predetermined visual features are present within the earlier captured frame. The CNN engine may include multiple convolution layers, each convolution layer of the multiple convolution layers to implement multiple instances of a filter operated at least partly in parallel, each instance of the filter to determine whether a predetermined visual feature of the multiple predetermined visual features is present within each of multiple overlapping locations of multiple pixels within one of the earlier captured frames; and multiple pool layers interspersed among the multiple convolution layers, each pool layer of the multiple pool layers to implement multiple instances of subsampling of indications generated by different ones of the multiple instances of the filter of a corresponding convolution layer of whether a predetermined visual feature of the multiple predetermined visual features is present within the one of the earlier captured frames.

In Example 39, which includes the subject matter of any of Examples 37-38, the CNN selection component may include a first comparator component to determine whether to select an earlier captured frame to include in the difference-based key frame set based on a comparison of the code value of the earlier captured frame to all of the code values generated by the CNN engine for all of the key frames already included in the difference-based key frame set.

In Example 40, which includes the subject matter of any of Examples 37-39, the apparatus may include a SLAM candidate component to identify a first candidate key frame that matches a current captured frame to at least a first degree from the interval-based key frame set, and the current captured frame captured by the camera of surroundings within the defined area; a CNN candidate component to identify a second candidate key frame that matches the current captured frame to at least a second degree from a difference-based key frame set; and a position estimation component to determine a current location of the mobile device on the map from estimates of differences between the current location and locations of the first and second candidate key frames on the map.

In Example 41, which includes the subject matter of any of Examples 37-40, the CNN engine may generate a code value indicative of which of multiple predetermined visual features are present within the current captured frame, and the apparatus may include a second comparator component to identify the second candidate key frame based on a comparison of the code value of the current captured frame to all of the code values generated by the CNN engine for all of the key frames included in the difference-based key frame set.

In Example 42, which includes the subject matter of any of Examples 37-41, the generation component may augment the map with an indication of a closure of a loop of a pathway of the map in response to at least one of the identification of the first candidate key frame among the interval-based key frame set by the SLAM candidate component or the identification of the second candidate key frame among the difference-based key frame set by the CNN candidate component.

In Example 43, which includes the subject matter of any of Examples 37-42, the generation component may augment the map with an indication of a new location along a pathway of the map correlated to a location of a next captured frame in response to a lack of identification of a candidate key frame that matches the next captured frame among the interval-based key frame set by the SLAM candidate component and a lack of identification of a candidate key frame that matches the next captured frame among the difference-based key frame set by the CNN candidate component.

In Example 44, which includes the subject matter of any of Examples 37-43, the generation component may correlate at least one location correlated to a key frame of at least one of the interval-based key frame set or the difference-based key frame set on the map to a physical location within the defined area based on captured location data received from at least one location sensor of the mobile device, the at least one location sensor comprising at least one of a receiver of signals from multiple satellites, a receiver of signals from multiple wireless access points associated with the defined area, a gyroscope, an accelerometer, an odometer, a proximity detector, a barcode reader to read a barcode within the defined area, or a radio frequency identification (RFID) tag within the defined area.

In Example 45, which includes the subject matter of any of Examples 37-44, the recurring interval may include at least one of an interval of time that recurringly elapses as the mobile device is moved about the defined area to generate the map, an interval of distance traveled by the mobile device as the mobile device is moved about the defined area to generate the map, or an interval quantity of the earlier captured frames captured by the camera as the mobile device is moved about the defined area to generate the map.

In Example 46, which includes the subject matter of any of Examples 37-45, the defined area may include at least one of a room, a floor of a building, a campus comprising multiple buildings, or a predetermined geographic region.

In Example 47, which includes the subject matter of any of Examples 37-46, the apparatus may include the mobile device, the mobile device comprising at least one motor to enable the mobile device to be self-propelled about the defined area to generate the map.

In Example 48, at least one tangible machine-readable storage medium may include instructions that when executed by a processor circuit, cause the processor circuit to perform any of the above.

In Example 49, an apparatus may include means for performing any of the above.

The invention claimed is:
1. An apparatus to identify locations comprising:
   at least one memory to store a current captured frame and a map of a defined area;
   a simultaneous location and mapping (SLAM) candidate component circuitry to identify a first candidate key frame that matches the current captured frame stored in the at least one memory to at least a first degree from an interval-based key frame set, the current captured frame captured by a camera of a mobile device of surroundings within the defined area, and the interval-based key frame set comprising key frames selected based on a recurring interval from multiple earlier captured frames captured by the camera during generation of the map of the defined area;
   a convolution neural network (CNN) candidate component circuitry to identify a second candidate key frame that matches the current captured frame stored in the at least one memory to at least a second degree from a difference-based key frame set, at least one key frame of the difference-based key frame set selected from the multiple earlier captured frames based on a degree of difference from other key frames included in the difference-based key frame set; and a position estimation component circuitry to determine a current location of the mobile device on the map stored in the at least one memory from estimates of differences between the current location and locations of the first and second candidate key frames on the map.

2. The apparatus of claim 1, comprising a SLAM selection component circuitry to select at least one of the key frames of the interval-based key frame set from the multiple earlier captured frames based on the recurring interval, the recurring interval comprising at least one of an interval of time that recurringly elapses as the mobile device is moved about the defined area to generate the map, an interval of distance traveled by the mobile device as the mobile device is moved about the defined area to generate the map, or an interval quantity of the earlier captured frames captured by the camera as the mobile device is moved about the defined area to generate the map.

3. The apparatus of claim 1, comprising a CNN selection component circuitry to select at least one of the key frames of the difference-based key frame set from the multiple earlier captured frames based on the degree of difference from other key frames already included in the difference-based key frame set.

4. The apparatus of claim 3, the CNN selection component circuitry comprising:
a CNN engine to generate, for at least one earlier captured frame of the multiple earlier captured frames, a code value indicative of which of multiple predetermined visual features are present within the earlier captured frame, the CNN engine comprising:
multiple convolution layers, at least one convolution layer of the multiple convolution layers to implement multiple instances of a filter operated at least partly in parallel, at least one instance of the filter to determine whether a predetermined visual feature of the multiple predetermined visual features is present within at least one of multiple overlapping locations of multiple pixels within one of the earlier captured frames; and
multiple pool layers interspersed among the multiple convolution layers, at least one pool layer of the multiple pool layers to implement multiple instances of subsampling of indications generated by different ones of the multiple instances of the filter of a corresponding convolution layer of whether a predetermined visual feature of the multiple predetermined visual features is present within the one of the earlier captured frames.

5. The apparatus of claim 1, comprising a generation component circuitry to correlate at least one key frame of the interval-based key frame set and at least one key frame of the difference-based key frame set to a corresponding location along a corresponding pathway of the map.

6. The apparatus of claim 5, the generation component circuitry to correlate at least one location correlated to a key frame of at least one of the interval-based key frame set or the difference-based key frame set on the map to a physical location within the defined area based on captured location data received from at least one location sensor of the mobile device, the at least one location sensor comprising at least one of a receiver of signals from multiple satellites, a receiver of signals from multiple wireless access points associated with the defined area, a gyroscope, an accelerometer, an odometer, a proximity detector, a barcode reader to read a barcode within the defined area, or a radio frequency identification (RFID) tag within the defined area.

7. The apparatus of claim 1, comprising the mobile device, the mobile device comprising at least one motor to enable the mobile device to be self-propelled about the defined area to generate the map.

8. A computer-implemented method for controlling communications comprising:
identifying, by a processor circuit, a first candidate key frame that matches a current captured frame to at least a first degree from an interval-based key frame set, the current captured frame captured by a camera of a mobile device of surroundings within a defined area, and the interval-based key frame set comprising key frames selected based on a recurring interval from multiple earlier captured frames captured by the camera during generation of a map of the defined area;
identifying a second candidate key frame that matches the current captured frame to at least a second degree from a difference-based key frame set, at least one key frame of the difference-based key frame set selected from the multiple earlier captured frames based on a degree of difference from at least one other key frames already included in the difference-based key frame set;
determining, by the processor circuit, a current location of the mobile device on the map from estimates of differences between the current location and locations of the first and second candidate key frames on the map; and
outputting the determined current location of the mobile device.

9. The computer-implemented method of claim 8, comprising selecting, by the processor circuit, at least one of the key frames of the interval-based key frame set from the multiple earlier captured frames based on the recurring interval, the recurring interval comprising at least one of an interval of time that recurringly elapses as the mobile device is moved about the defined area to generate the map, an interval of distance traveled by the mobile device as the mobile device is moved about the defined area to generate the map, or an interval quantity of the earlier captured frames captured by the camera as the mobile device is moved about the defined area to generate the map.

10. The computer-implemented method of claim 8, wherein at least one key frame of the difference-based key frame set selected from the multiple earlier captured frames based on a degree of difference from at least one other key frames already included in the difference-based key frame set is based on selecting at least one of the key frames of the difference-based key frame set from the multiple earlier captured frames based on the degree of difference from at least one other key frames already included in the difference-based key frame set.

11. The computer-implemented method of claim 10, comprising generating, for at least one each earlier captured frame of the multiple earlier captured frames, a code value indicative of which of multiple predetermined visual features are present within the earlier captured frame by operating a convolution neural network (CNN) engine comprising:
multiple convolution layers, at least one convolution layer of the multiple convolution layers to implement multiple instances of a filter operated at least partly in parallel, at least one instance of the filter to determine whether a predetermined visual feature of the multiple predetermined visual features is present within at least one each of multiple overlapping locations of multiple pixels within one of the earlier captured frames; and multiple pool layers interspersed among the multiple convolution layers, at least one pool layer of the multiple pool layers to implement multiple instances of subsampling of indications generated by different ones of the multiple instances of the filter of a corresponding convolution layer of whether a predetermined visual feature of the multiple predetermined visual features is present within the one of the earlier captured frames.

12. The computer-implemented method of claim 11, comprising determining whether to select an earlier captured frame to include in the difference-based key frame set based on a comparison of the code value of the earlier captured frame to at least one of the code values generated using the CNN engine for at least one of the key frames already included in the difference-based key frame set.

13. The computer-implemented method of claim 12, comprising:
   generating a code value indicative of which of multiple predetermined visual features are present within the current captured frame; and
   identifying the second candidate key frame based on a comparison of the code value of the current captured frame to at least one of the code values generated using the CNN engine for at least one of the key frames included in the difference-based key frame set.

14. The computer-implemented method of claim 8, comprising correlating at least one key frame of the interval-based key frame set and at least one key frame of the difference-based key frame set to a corresponding location along a corresponding pathway of the map.

15. An apparatus to identify locations comprising:
   at least one memory to store an interval-based key frame set, map of a defined area, and a difference-based key frame set;
   a simultaneous location and mapping (SLAM) selection component circuitry to select at least one key frame of the interval-based key frame set from multiple earlier captured frames based on a recurring interval, the key frames of the interval-based key frame set captured by a camera of a mobile device of surroundings within a defined area as the mobile device is moved about the defined area to generate the map of the defined area;
   a convolution neural network (CNN) selection component circuitry to select at least one of the key frames of the difference-based key frame set from the multiple earlier captured frames based on a degree of difference from at least one other key frame already included in the difference-based key frame set; and
   a generation component circuitry to correlate at least one key frame of the interval-based key frame set and at least one key frame of the difference-based key frame set to a corresponding location along a corresponding pathway of the map.

16. The apparatus of claim 15, the CNN selection component circuitry comprising:
   a CNN engine circuitry to generate, for at least one earlier captured frame of the multiple earlier captured frames, a code value indicative of which of multiple predetermined visual features are present within the earlier captured frame, the CNN engine circuitry comprising:
     multiple convolution layers, at least one convolution layer of the multiple convolution layers to implement multiple instances of a filter operated at least partly in parallel, at least one instance of the filter to determine whether a predetermined visual feature of the multiple predetermined visual features is present within at least one of multiple overlapping locations of multiple pixels within one of the earlier captured frames; and
     multiple pool layers interspersed among the multiple convolution layers, at least one pool layer of the multiple pool layers to implement multiple instances of subsampling of indications generated by different ones of the multiple instances of the filter of a corresponding convolution layer of whether a predetermined visual feature of the multiple predetermined visual features is present within the one of the earlier captured frames.

17. The apparatus of claim 16, the CNN selection component circuitry comprising a first comparator component circuitry to determine whether to select an earlier captured frame to include in the difference-based key frame set based on a comparison of the code value of the earlier captured frame to at least one of the code values generated by the CNN engine for at least one of the key frames already included in the difference-based key frame set.

18. The apparatus of claim 17, comprising:
   a SLAM candidate component circuitry to identify a first candidate key frame that matches a current captured frame to at least a first degree from the interval-based key frame set, and the current captured frame captured by the camera of surroundings within the defined area;
   a CNN candidate component circuitry to identify a second candidate key frame that matches the current captured frame to at least a second degree from a difference-based key frame set; and
   a position estimation component circuitry to determine a current location of the mobile device on the map from estimates of differences between the current location and locations of the first and second candidate key frames on the map.

19. The apparatus of claim 18, the CNN engine circuitry to generate a code value indicative of which of multiple predetermined visual features are present within the current captured frame, and the apparatus comprising:
   a second comparator component circuitry to identify the second candidate key frame based on a comparison of the code value of the current captured frame to at least one of the code values generated by the CNN engine for at least one of the key frames included in the difference-based key frame set.

20. The apparatus of claim 18, the generation component circuitry to augment the map with an indication of a closure of a loop of a pathway of the map in response to at least one of the identification of the first candidate key frame among the interval-based key frame set by the SLAM candidate component circuitry or the identification of the second candidate key frame among the difference-based key frame set by the CNN candidate component circuitry.

21. At least one tangible non-transitory machine-readable storage medium comprising instructions that when executed by a processor circuit, cause the processor circuit to:
   identify a first candidate key frame that matches a current captured frame to at least a first degree from an interval-based key frame set, the current captured frame captured by a camera of a mobile device of surroundings within a defined area, and the interval-based key frame set comprising key frames selected based on a recurring interval from multiple earlier captured frames captured by the camera during generation of a map of the defined area;
   identify a second candidate key frame that matches the current captured frame to at least a second degree from a difference-based key frame set, at least one key frame of the difference-based key frame set selected from the multiple earlier captured frames based on a degree of difference from at least one other key frames already included in the difference-based key frame set; and determine a current location of the mobile device on the map from estimates of differences between the current location and locations of the first and second candidate key frames on the map.

22. The at least one tangible machine-readable storage medium of claim 21, the processor circuit coupled to a convolution neural network (CNN) engine implemented with hardware-based logic, and the processor circuit to operate the CNN engine to identify the second candidate.

23. The at least one tangible machine-readable storage medium of claim 21, the processor circuit caused to select at least one of the key frames of the difference-based key frame set from the multiple earlier captured frames based on the degree of difference from at least one other key frames already included in the difference-based key frame set.

24. The at least one tangible machine-readable storage medium of claim 23, the processor circuit caused to generate, for at least one earlier captured frame of the multiple earlier captured frames, a code value indicative of which of multiple predetermined visual features are present within the earlier captured frame by using a convolution neural network (CNN) engine comprising:

multiple convolution layers, at least one convolution layer of the multiple convolution layers to implement multiple instances of a filter operated at least partly in parallel, at least one instance of the filter to determine whether a predetermined visual feature of the multiple predetermined visual features is present within at least one of multiple overlapping locations of multiple pixels within one of the earlier captured frames; and multiple pool layers interspersed among the multiple convolution layers, at least one pool layer of the multiple pool layers to implement multiple instances of subsampling of indications generated by different ones of multiple instances of the filter of a corresponding convolution layer of whether a predetermined visual feature of the multiple predetermined visual features is present within the one of the earlier captured frames.

25. The at least one tangible machine-readable storage medium of claim 24, the processor circuit caused to determine whether to select an earlier captured frame to include in the difference-based key frame set based on a comparison of the code value of the earlier captured frame to at least one of the code values generated using the CNN engine for at least one of the key frames already included in the difference-based key frame set.

* * * * *

UNITED STATES PATENT AND TRADEMARK OFFICE
CERTIFICATE OF CORRECTION

PATENT NO. : 11,402,213 B2
APPLICATION NO. : 16/081129
DATED : August 2, 2022
INVENTOR(S) : Xianchao Xu et al.

It is certified that error appears in the above-identified patent and that said Letters Patent is hereby corrected as shown below:

In the Claims

In Column 54, Line 1-2, in Claim 11 should read, comprising generating, for at least one earlier captured frame Signed and Sealed this
Sixth Day of December, 2022

Katherine Kelly Vidal
*Director of the United States Patent and Trademark Office*